(12) United States Patent
Shiota et al.

(10) Patent No.: US 9,363,082 B2
(45) Date of Patent: Jun. 7, 2016

(54) CRYPTOGRAPHIC COMMUNICATION SYSTEM AND CRYPTOGRAPHIC COMMUNICATION METHOD

(75) Inventors: Shigemasa Shiota, Kanagawa (JP);
Shigeru Furuta, Kanagawa (JP);
Masayuki Hirokawa, Kanagawa (JP);
Akira Yamazaki, Kanagawa (JP);
Daisuke Oshida, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 542 days.

(21) Appl. No.: 13/495,064

(22) Filed: Jun. 13, 2012

(65) Prior Publication Data

US 2012/0321077 A1 Dec. 20, 2012

(30) Foreign Application Priority Data

Jun. 20, 2011 (JP) ................. 2011-136131
Jun. 20, 2011 (JP) ................. 2011-136132
Mar. 29, 2012 (JP) ................. 2012-076387

(51) Int. Cl.
*H04L 29/06* (2006.01)
*H04L 9/30* (2006.01)
(Continued)

(52) U.S. Cl.
CPC ............. *H04L 9/30* (2013.01); *H04L 9/0866* (2013.01); *H04L 9/0869* (2013.01);
(Continued)

(58) Field of Classification Search
CPC ...... H04L 9/0866; H04L 9/3247; H04L 63/06
USPC ............ 380/44, 283, 285, 259, 264; 714/699, 714/746, 755
See application file for complete search history.

(56) References Cited

U.S. PATENT DOCUMENTS

2002/0023216 A1 2/2002 Noguchi et al.
2002/0199105 A1* 12/2002 Ishiguro et al. ............... 713/168
(Continued)

FOREIGN PATENT DOCUMENTS

JP 06-021939 A 1/1994
JP 2002-26899 A 1/2002
(Continued)

OTHER PUBLICATIONS

Guajardo et al., "FPGA Intrinsic PUFs and Their Use for IP Protection", Sep. 10, 2007, Cryptographic Hardware and Embedded Systems—CHES 2007 (Lecture notes in Computer Science), Springer Berlin, Heidelberg, Berlin, Heidelberg, pp. 63-80, XP019099274.
(Continued)

*Primary Examiner* — Sarah Su
(74) *Attorney, Agent, or Firm* — Shapiro, Gabor and Rosenberger, PLLC

(57) ABSTRACT

Provided is a cryptographic communication system including a first semiconductor device and a second semiconductor device. The first semiconductor device includes a common key generation unit that generates a common key CK(a) by using a unique code UC(a) and correction data CD(a), and an encryption unit that encrypts the common key CK(a) generated in the common key generation unit by using a public key PK(b) of the second semiconductor device. The second semiconductor device includes a secret key generation unit that generates a secret key SK(b) by using a unique code UC(b) and correction data CD(b), and a decryption unit that decrypts the common key CK(a) encrypted in the encryption unit by using the secret key SK(b).

18 Claims, 33 Drawing Sheets

(51) Int. Cl.
  *H04L 9/08* (2006.01)
  *H04L 9/32* (2006.01)

(52) U.S. Cl.
  CPC ........... *H04L 9/3247* (2013.01); *H04L 9/3278* (2013.01); *H04L 2209/04* (2013.01); *H04L 2209/24* (2013.01); *H04L 2209/34* (2013.01); *H04L 2209/80* (2013.01); *H04L 2209/84* (2013.01)

(56) References Cited

U.S. PATENT DOCUMENTS

| | | | |
|---|---|---|---|
| 2004/0064573 A1* | 4/2004 | Leaning et al. | 709/231 |
| 2004/0221209 A1* | 11/2004 | Kupferschmidt et al. | 714/713 |
| 2005/0286805 A1* | 12/2005 | Yoshida | 382/305 |
| 2006/0115085 A1 | 6/2006 | Iwamura | |
| 2006/0209584 A1 | 9/2006 | Devadas et al. | |
| 2006/0210082 A1 | 9/2006 | Devadas et al. | |
| 2006/0262925 A1* | 11/2006 | Matsumoto et al. | 380/28 |
| 2008/0279373 A1 | 11/2008 | Erhart et al. | |
| 2009/0180619 A1* | 7/2009 | Furukawa et al. | 380/277 |
| 2009/0185601 A1* | 7/2009 | Felbecker et al. | 375/133 |
| 2009/0254981 A1 | 10/2009 | Devadas et al. | |
| 2010/0197362 A1* | 8/2010 | Saitoh et al. | 455/569.2 |
| 2010/0250936 A1 | 9/2010 | Kusakawa et al. | |
| 2010/0272255 A1 | 10/2010 | Devadas et al. | |
| 2011/0144854 A1* | 6/2011 | Cramer et al. | 701/31 |
| 2011/0219197 A1* | 9/2011 | Perego et al. | 711/154 |
| 2012/0221916 A1* | 8/2012 | Schreck et al. | 714/752 |
| 2012/0324241 A1* | 12/2012 | Oshida et al. | 713/189 |
| 2012/0324310 A1* | 12/2012 | Oshida et al. | 714/755 |
| 2013/0163754 A1* | 6/2013 | Ogawa | 380/44 |
| 2014/0133652 A1* | 5/2014 | Oshida et al. | 380/255 |
| 2014/0161251 A1* | 6/2014 | Yoshida et al. | 380/44 |

FOREIGN PATENT DOCUMENTS

| | | |
|---|---|---|
| JP | 2003-273863 A | 9/2003 |
| JP | 2005-341528 A | 12/2005 |
| JP | 2010-527219 A | 8/2010 |
| JP | 2010-226603 A | 10/2010 |
| WO | WO 2006/053304 A2 | 5/2006 |
| WO | 2010/134192 A1 | 11/2010 |

OTHER PUBLICATIONS

Extended European Search Report for European Patent Application No. 12171635.1, Jun. 19, 2013.

Office Action for related Japanese Application No. 2012-076387, mailed Jun. 23, 2015 (partial English translation).

* cited by examiner

| BIT POSITION | 0 | 1 | 2 | 3 | 4 | 5 | 6 | 7 | | |
|---|---|---|---|---|---|---|---|---|---|---|
| (1) UNIQUE CODE UC(a) (UNCORRECTED) | 1 | 1 | 0 | 0 | 0 | 1 | 1 | 1 | | |
| (2) MASK DATA | 1 | 0 | 1 | 1 | 1 | 1 | 0 | 1 | | |
| (3) DATA AFTER MASKING | 1 | X | 0 | 0 | 0 | 1 | X | X | | |
| (4) LEFT-JUSTIFIED AFTER ELIMINATING X | 1 | 0 | 0 | 0 | 1 | 1 | ... | | CORRECTION DATA CD(a) | |
| (5) AFTER ECC CORRECTION (FIRST BIT CORRECTED) | 1 | 1 | 0 | 0 | 1 | 1 | ... | | | COMMON KEY CK(a) |
| (6) NOT OPERATION | 0 | 0 | 1 | 1 | 0 | 0 | ... | | | |

Fig. 4

|  | CK(1) | CK(2) | CK(3) | · · · | CK(n) |
|---|---|---|---|---|---|
| ICa | CD(1, a) | CD(2, a) | CD(3, a) | · · · | CD(n, a) |
| ICb | CD(1, b) | CD(2, b) | CD(3, b) | · · · | CD(n, b) |
| ICc | CD(1, c) | CD(2, c) | CD(3, c) | · · · | CD(n, c) |
| · · · | · · · | · · · | · · · | · · · | · · · |
| ICz | CD(1, z) | CD(2, z) | CD(3, z) | · · · | CD(n, z) |

Fig. 10

| BIT POSITION | 0 | 1 | 2 | 3 | 4 | 5 | 6 | 7 | ... | | |
|---|---|---|---|---|---|---|---|---|---|---|---|
| (1) UNIQUE CODE UC(a) (UNCORRECTED) | 1 | 1 | 0 | 0 | 0 | 1 | 1 | 1 | ... | | |
| (2) MASK DATA | 1 | 0 | 1 | 1 | 1 | 1 | 0 | 1 | ... | | |
| (3) DATA AFTER MASKING | 1 | X | 0 | 0 | 0 | 1 | X | 1 | ... | | |
| (4) LEFT-JUSTIFIED AFTER ELIMINATING X | 1 | 0 | 0 | 0 | 1 | 1 | | | | ... | |
| (5) AFTER ECC CORRECTION (FIRST BIT CORRECTED) | 1 | 1 | 0 | 1 | 1 | 1 | | | | ... | |
| (6) NOT OPERATION | 0 | 0 | 1 | 0 | 0 | 0 | | | | | ... |

Columns at right: CORRECTION DATA CD(a) | COMMON KEY CK(a)

CRYPTOGRAPHIC COMMUNICATION SYSTEM AND CRYPTOGRAPHIC COMMUNICATION METHOD

CROSS-REFERENCE TO RELATED APPLICATIONS

This application is based upon and claims the benefit of priority from Japanese Patent Applications Nos. 2011-136131 filed on Jun. 20, 2011, 2011-136132 filed on Jun. 20, 2011, and 2012-076387 filed on Mar. 29, 2012, the disclosures of which are incorporated herein in its entirety by reference.

BACKGROUND

The present invention relates to a cryptographic communication system and a cryptographic communication method and, particularly, to a cryptographic communication system and a cryptographic communication method that enhance security.

In a communication system, communication data is encrypted to prevent wiretapping, falsification and the like of the communication data. One of techniques for the encryption is common key cryptosystem in which both ends of communication use a common encryption key (which is referred to hereinafter as a common key). In the common key cryptosystem, it is necessary for both ends of communication to share the common key without a third party knowing. One of techniques to achieve that is public key cryptosystem using RSA (registered trademark), elliptic curve cryptography and the like.

A technique to provide an integrated circuit that can prevent use of an illegally copied IC is disclosed in Japanese Unexamined Patent Application Publication No. 2010-226603. A technique to generate a security word such as RSA public key or secret key using a circuit for generating unique data that is physically uncopyable or another element to thereby ensure security of an integrated circuit used in electronic equipment is disclosed in Japanese Unexamined Patent Application Publication (Translation of PCT Application) No. 2010-527219.

Further, a technique to reduce time for key exchange in a communication system to perform cryptographic communication using a common encryption key through a local area network is disclosed in Japanese Unexamined Patent Application Publication No. 2005-341528. A technique to easily verify completeness of data in data transmission/reception by ad-hoc wireless connection is disclosed in Japanese Unexamined Patent Application Publication No. 2002-26899.

SUMMARY

For example, in the case of performing cryptographic communication using a common key CK(x) between a semiconductor device ICx and a semiconductor device ICy, the common key CK(x) needs to be shared between ICx and ICy. When ICx has the common key CK(x), ICx encrypts the common key CK(x) using a public key PK(y) of ICy acquired in advance and transmits the encrypted common key CK(x)' to ICy. Then, ICy decrypts the encrypted common key CK(x)' using a secret key SK(y) of ICy and thereby acquires the common key CK(x). In this manner, by transmitting the common key CK(x) from ICx to ICy using the public key cryptosystem, it is possible to share the common key CK(x) between ICx and ICy without a third party knowing. Thus, cryptographic communication can be performed between ICx and ICy using the common key cryptosystem.

At the time of transmitting the common key CK(x) from ICx to ICy, information of the common key CK(x) is not leaked to a third party because the common key CK(x) is encrypted. However, because important data such as the common key CK(x) and the secret key SK(y) are stored in a nonvolatile memory of the semiconductor devices (semiconductor chips) ICx and ICy. Therefore, if unauthorized analysis of the semiconductor device is made, leakage of the important data such as the common key CK(x) and the secret key SK(y) occurs.

Further, in the case of adding a semiconductor device ICz to the cryptographic communication system in which secure communication is established such as the semiconductor device ICx and the semiconductor device ICy described above, it is necessary to verify whether the semiconductor device ICz to be added is a proper semiconductor device. However, in order to verify whether the semiconductor device ICz to be added is a proper semiconductor device, it is necessary to incorporate an expensive secure server, for example, into the cryptographic communication system. This causes an increase in costs of the cryptographic communication system.

A cryptographic communication system according to an aspect of the present invention includes a first semiconductor device and a second semiconductor device. The first semiconductor device generates a common key by using a first unique code that is a unique code arising from process variation or the like of the first semiconductor device and first correction data for correcting the first unique code, encrypts the common key by using a public key, and transmits the encrypted common key to the second semiconductor device. The second semiconductor device generates a secret key of the second semiconductor device by using a second unique code that is a unique code arising from process variation or the like of the second semiconductor device and second correction data for correcting the second unique code, and decrypts the encrypted common key transmitted from the first semiconductor device by using the secret key. By this operation, the first semiconductor device and the second semiconductor device have the same common key, thus achieving highly secure communication with the common key.

A cryptographic communication system according to an aspect of the present invention includes a first semiconductor device and a second semiconductor device. The first semiconductor device generates a secret key of the first semiconductor device by using a first unique code that is a unique code arising from process variation or the like of the first semiconductor device and first correction data for correcting the first unique code, generates signature data by using the secret key and a plain text, and transmits the signature data to the second semiconductor device. The second semiconductor device generates verification data by using the transmitted signature data and a public key of the first semiconductor device and compares the verification data with the plain text to determine whether the first semiconductor device has a secret key. By this operation, the first semiconductor device does not need to directly store the secret key, which is important data, thereby improving security for digital signature between the first semiconductor device and the second semiconductor device.

In the above aspect, the public key of the first semiconductor device may be generated using a second unique code that is a unique code arising from process variation or the like of the second semiconductor device and second correction data for correcting the second unique code.

A cryptographic communication system according to an aspect of the present invention includes first to third semiconductor devices. The third semiconductor device supplies first correction data for correcting a first unique code to the first semiconductor device, and the first semiconductor device generates a common key by using a first unique code that is a unique code arising from process variation or the like of the first semiconductor device and the first correction data supplied from the third semiconductor device. Further, the third semiconductor device supplies second correction data for correcting a second unique code to the second semiconductor device, and the second semiconductor device generates a common key by using a second unique code that is a unique code arising from process variation or the like of the second semiconductor device and the second correction data supplied from the third semiconductor device. By this operation, the first semiconductor device and the second semiconductor device have the same common key, thus achieving highly secure communication with the common key.

In the above aspect, the third semiconductor device may include a database that stores correction data associated with respective semiconductor devices and commons keys generated in the respective semiconductor device.

Further, the third semiconductor device may generate the first correction data by using a first unique code that is a unique code arising from process variation or the like of the first semiconductor device and a common key, and generate the second correction data by using a second unique code that is a unique code arising from process variation or the like of the second semiconductor and the common key.

Further, the third semiconductor device may generate the first correction data by using a first unique code first unique code that is a unique code arising from process variation or the like of the first semiconductor device and a first common key, and generate the second correction data by using a second unique code that is a unique code arising from process variation or the like of the second semiconductor and a second common key. In this case, the first semiconductor device may have the first common key, the second semiconductor device may have the second common key, and the third semiconductor device may have the first and second common keys. Thus, the first semiconductor device and the third semiconductor device can communicate using the first common key, the second semiconductor device and the third semiconductor device can communicate using the second common key, and the first semiconductor device and the second semiconductor device can communicate through the third semiconductor device.

A cryptographic communication system according to an aspect of the present invention includes a first semiconductor device and a second semiconductor device. The first semiconductor device generates a first common key by using a first unique code that is a unique code arising from process variation or the like of the first semiconductor device and first correction data for correcting the first unique code. Further, the first semiconductor device generates second correction data for correcting a second unique code by using a second unique code that is a unique code arising from process variation or the like of the second semiconductor and the first common key, and transmits the generated second correction data to the second semiconductor device. The second semiconductor device generates a first common key by using the second correction data generated in the first semiconductor device and the second unique code. By this operation, the first semiconductor device and the second semiconductor device have the same common key. Thus, the first semiconductor device and the second semiconductor device can perform highly secure communication using the first common key.

In the above aspect, the second semiconductor device may encrypt the second unique code by using a public key of the first semiconductor device and transmit the encrypted second unique code to the first semiconductor device, and the first semiconductor device may decrypt the encrypted second unique code by using a secret key of the first semiconductor device.

Further, a cryptographic communication system according to an aspect of the present invention may include a server including a database that stores public keys of respective semiconductor devices in association with the respective semiconductor devices. The second semiconductor device then generates signature data by using a secret key of the second semiconductor device and a plain text, and transmits the signature data to the first semiconductor device. The first semiconductor device generates verification data by using a public key of the second semiconductor device transmitted from the server and the signature data transmitted from the second semiconductor device and compares the verification data with the plain text to determine whether the second semiconductor device has a secret key.

Further, the second semiconductor device may encrypt a correction data generation program for generating second correction data using the first common key and the second unique code by using the public key of the first semiconductor device and transmit the encrypted correction data generation program to the first semiconductor device. The first semiconductor device decrypts the encrypted correction data generation program and executes the decrypted correction data generation program and thereby generates the second correction data by using the first common key and the second unique code.

Further, the first common key generation unit may generate a second common key by using a first unique code that is a unique code arising from process variation or the like of the first semiconductor device and third correction data for correcting the first unique code. The first semiconductor device can thereby communicate with the second semiconductor device using the first common key and communicate with the third semiconductor device using the second common key, and the second semiconductor device can communicate with the third semiconductor device through the first semiconductor device.

Further, a cryptographic communication system according to an aspect of the present invention may be applied to a vehicle-mounted semiconductor device.

According to the aspects of the present invention, it is possible to provide a cryptographic communication system and a cryptographic communication method that enhance security. Further, according to the aspects of the present invention, it is possible to provide a cryptographic communication system and a cryptographic communication method that can easily add a semiconductor device to the cryptographic communication system in which secure communication is performed.

BRIEF DESCRIPTION OF THE DRAWINGS

The above and other aspects, advantages and features will be more apparent from the following description of certain embodiments taken in conjunction with the accompanying drawings, in which:

FIG. 4 is a table showing an example of a unique code processed in the common key generation unit;

FIG. 10 is a table showing an example of data stored in a database of the cryptographic communication system according to the fourth embodiment;

FIG. 21 is a table showing an example of a unique code processed in the common key generation unit;

DETAILED DESCRIPTION

<First Embodiment>

Embodiments of the present invention are described hereinafter with reference to the drawings.

Figure 1:
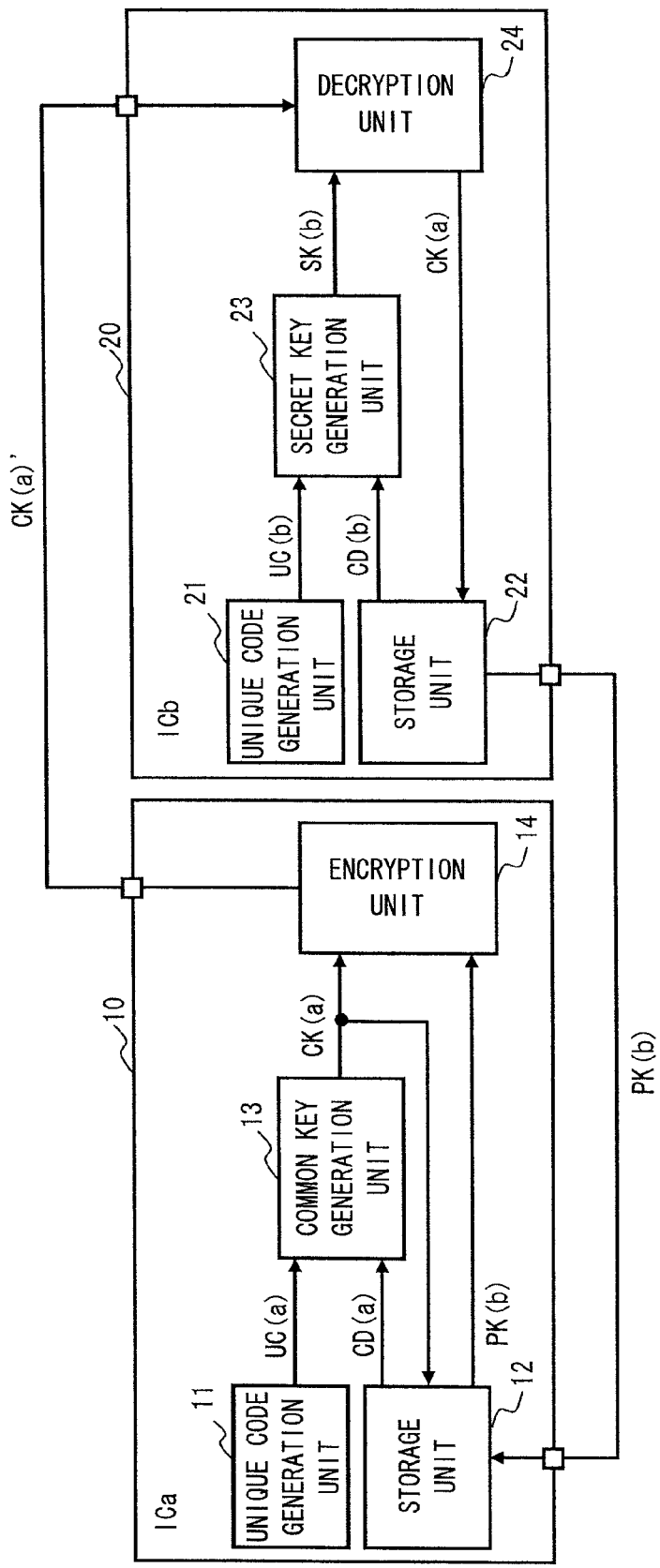
FIG. 1 is a block diagram showing a cryptographic communication system according to a first embodiment.

FIG. 1 is a block diagram showing a cryptographic communication system according to a first embodiment. The cryptographic communication system 1 according to this embodiment includes a semiconductor device ICa (first semiconductor device) 10 and a semiconductor device ICb (second semiconductor device) 20. The semiconductor device 10 includes a unique code generation unit 11, a storage unit 12, a common key generation unit 13, and an encryption unit 14.

The unique code generation unit 11 generates a unique code (first unique code) UC(a) having a value unique to the semiconductor device 10 and containing a random error and outputs it to the common key generation unit 13. The unique code UC(a) is a value determined by physical properties inherent to an element included in the semiconductor device 10. For example, the unique code generation unit 11 may generate the unique code UC(a) using a value at startup of a memory element included in the semiconductor device 10. The unique code is a code generated using the property that actually fabricated ICs vary despite that the design of the ICs is the same. This technique is called PUF (Physical Unclonable Function), and it is a technique that, even when a plurality of ICs having the same circuit are fabricated at a time on one semiconductor wafer by the same fabrication device, generates unique codes for the respective ICs and further makes the ICs unclonable. Use of this technique achieves effective concealment of data without a need for special hardware such as a tamper-resistant chip.

The storage unit 12 can store correction data (first correction data) CD(a), a common key CK(a) generated in the common key generation unit 13, and a public key PK(b) of the semiconductor device 20. The storage unit 12 includes a volatile memory (for example, SRAM) and a nonvolatile memory (for example, flash memory), for example, and the correction data CD(a) and the public key PK(b) are stored in the nonvolatile memory, and the common key CK(a) is stored in the volatile memory. Thus, although the storage unit 12 temporarily stores the common key CK(a), information of the common key CK(a) is erased when the semiconductor device 10 is powered off. Note that the common key CK(a) may be stored in the nonvolatile memory according to need after taking security measures such as encryption, and measures such as erasing data by writing at power-off of the semiconductor device 10 may be done on the common key CK(a) stored in the nonvolatile memory.

The common key generation unit 13 generates the common key CK(a) using the unique code UC(a) output from the unique code generation unit 11 and the correction data CD(a) stored in the storage unit 12.

The unique code UC(a) generated in the unique code generation unit 11 is data containing bit values that vary depending on external factors during generation of the unique code, such as temperature and voltage, for example. Therefore, the unique code UC(a) generated in the unique code generation unit 11 contains three types of bits: (1) bits with a stable value, (2) bits with high variability (i.e. bits with a relatively large variation in value) and (3) bits with low variability (i.e. bits with a relatively small variation in value). In this manner, the unique code UC(a) generated in the unique code generation unit 11 contains (2) bits with high variability and (3) bits with low variability. Accordingly, the unique code UC(a) has different values each time generated.

The bit with high variability can be found in the fabrication process. Thus, by making each bit decision during the fabrication process, mask data to mask the bit with high variability can be created. By masking the unique code UC(a) generated in the unique code generation unit 11 using the mask data, the bit with high variability contained in the unique code UC(a) can be eliminated. Because the position of the bit with high variability differs from device to device, the mask data is data unique to the semiconductor device.

On the other hand, the bit with low variability varies due to external factors, remaining charges and the like, and it is thus difficult to make estimation. Therefore, the bit with low variability is processed using an ECC code, such as BCH code or Reed-Solomon code, generated during fabrication. An operation of the common key generation unit 13 is specifically described hereinafter.

Figure 3:
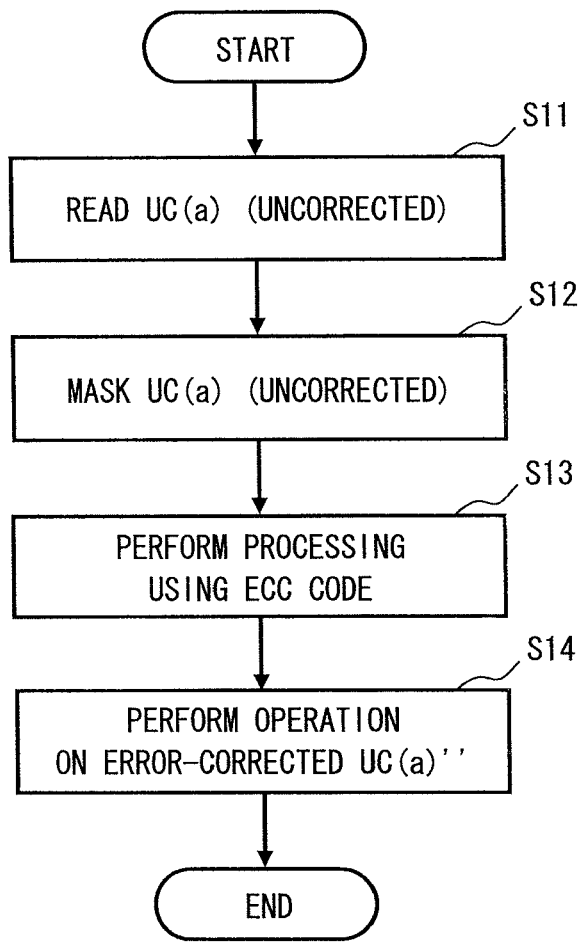
FIG. 3 is a flowchart to explain an operation of a common key generation unit.

FIG. 3 is a flowchart to explain an operation of the common key generation unit 13, and FIG. 4 is a table showing an example of a unique code processed in the common key generation unit 13. First, the common key generation unit 13 reads the unique code UC(a) from the unique code generation unit 11 (Step S11). The unique code UC(a) read in this step is a unique code on which error correction for eliminating a bit with a variable value is not made.

Next, the common key generation unit 13 masks the read unique code UC(a) using the mask data contained in the correction data CD(a) (Step S12). The mask data is data for masking a bit with a high error rate having a variable bit value among the bits of the unique code UC(a). In the example shown in FIG. 4, because the error rate of the first bit and the sixth bit of the unique code UC(a) is high, the mask data is "0". Because the other bits are bits with a low error rate or bits with a stable value, the mask data is "1". In other words, the mask data for the bit that needs to be masked is "0", and the mask data for the bit that does not need to be masked is "1". By masking the unique code UC(a) using the mask data, masked unique code UC(a)' in which the first bit and the sixth bit of the unique code UC(a) are eliminated can be obtained (the bits eliminated by masking are indicated by "X"). After that, the masked unique code UC(a)' is left-justified.

Then, using the ECC code (error correction code) contained in the correction data CD(a), the common key generation unit 13 makes a correction to remove the error of the bit with a low degree of variability contained in the masked unique code UC(a)', thereby obtaining a unique code UC(a)" (Step S13). In the example shown in FIG. 4, as a result that the masked unique code UC(a)' is processed using the ECC code, the first bit is corrected from "0" to "1".

Then, the common key generation unit 13 performs a specified operation on the error-corrected unique code UC(a)" using an operation parameter contained in the correction data CD(a) (Step S14). In the example shown in FIG. 4, NOT operation is performed on the error-corrected unique code UC(a)". The unique code UC(a) after this operation is the common key CK(a). Note that the NOT operation is just one example, and any operation may be performed on the error-corrected unique code UC(a)". By changing the operation parameter, it is possible to change the common key CK(a) according to need. Further, by performing a specified operation on the error-corrected unique code UC(a)" using the operation parameter, the common key CK(a) can be generated as a code that is not apparently similar to the unique code UC(a). This further enhances the security level. Furthermore, the operation performed on the error-corrected unique code UC(a)" may be skipped. In this case, the unique code UC(a)" processed using the mask data and the ECC code serves as the common key CK(a). The common key CK(a) generated in this manner is output to the storage unit 12 and the encryption unit 14.

Note that the mask code, the ECC code and the operation parameter contained in the correction data CD(a) are generated in advance as unique data of the semiconductor device 10 and stored in the storage unit 12. A method of generating the correction data CD(a) is described later (cf. fifth embodiment, FIG. 14). Further, in order to extract a bit with high variability contained in the unique code UC(a) read from the unique code generation unit 11, reading of the unique code UC(a) is performed a plurality of times and then the ECC code is generated on the basis of the masked unique code UC(a)'.

As described above, the common key generation unit 13 has the function of generating the common key CK(a) and also has the function of correcting the unique code UC(a) using the correction data CD(a). A secret key generation unit 23 shown in FIG. 1, a secret key generation unit 33 shown in FIG. 5, a secret key generation unit 53 and a public key generation unit shown in FIG. 7, common key generation units 73 and 83 shown in FIG. 9, common key generation units 113 and 123 shown in FIG. 12, and common key generation units 143 and 153 shown in FIG. 15 also function as a unique code correction unit that corrects the unique code UC using the correction data CD. Note that, although the key generation unit is referred to as a common key generation unit, a secret key generation unit or a public key generation unit according to the key to be generated in this specification for the sake of convenience, the configuration and operation of those units are basically the same.

The common key CK(a) is a single-use (one-time) key or a fixed key according to usage. For example, when the common key CK(a) is a fixed key for storing encrypted data in the nonvolatile memory, the correction data CD(a) is determined so as to obtain a bit pattern as the common key CK(a) from a bit pattern obtained as the unique code UC(a) of the semiconductor device 10, and therefore a plurality of correction data CD(a) can be easily generated. On the other hand, when the common key CK(a) is a single-use key to be used for each communication session between ICa and ICb, the correction data CD(a) is determined so as to obtain different bit patterns for a plurality of different correction data CD(a).

The encryption unit 14 in FIG. 1 encrypts the common key CK(a) generated in the common key generation unit 13 by using a public key PK(b) of the semiconductor device 20. The public key PK(b) to be used for encryption may be transmitted from the semiconductor device 20 to the semiconductor device 10 in advance and stored in the storage unit 12. Alternatively, the public key PK(b) to be used for encryption may be directly supplied from the semiconductor device 20 to the encryption unit 14 at the time when the encryption unit 14 encrypts the common key CK(a).

The semiconductor device 20 includes a unique code generation unit 21, a storage unit 22, a secret key generation unit 23, and a decryption unit 24. The unique code generation unit 21 generates a unique code (second unique code) UC(b) having a value unique to the semiconductor device 20 and containing a random error and outputs it to the secret key generation unit 23. The configuration and operation of the unique code generation unit 21 are basically the same as the unique code generation unit 11 described above.

The storage unit 22 can store correction data (second correction data) CD(b), a public key PK(b), and a common key CK(a) decrypted by the decryption unit. The storage unit 22 includes a volatile memory and a nonvolatile memory, for example, and the correction data CD(b) and the public key PK(b) are stored in the nonvolatile memory, and the common key CK(a) is stored in the volatile memory. Thus, although the storage unit 22 temporarily stores the common key CK(a), information of the common key CK(a) is erased when the semiconductor device 20 is powered off. Note that the common key CK(a) may be stored in the nonvolatile memory according to need after taking security measures such as encryption, and measures such as erasing data by writing at power-off of the semiconductor device 20 may be done on the common key CK(a) stored in the nonvolatile memory.

The secret key generation unit 23 generates a secret key SK(b) of the semiconductor device 20 using the unique code UC(b) and the correction data CD(b). Note that a method of generating the secret key SK(b) in the secret key generation unit 23 is basically the same as the method of generating the common key CK(a) in the common key generation unit 13 described above.

The decryption unit 24 decrypts the common key CK(a)' encrypted in the encryption unit 14 of the semiconductor device 10 by using the secret key SK(b) and thereby generates the common key CK(a).

Figure 2:
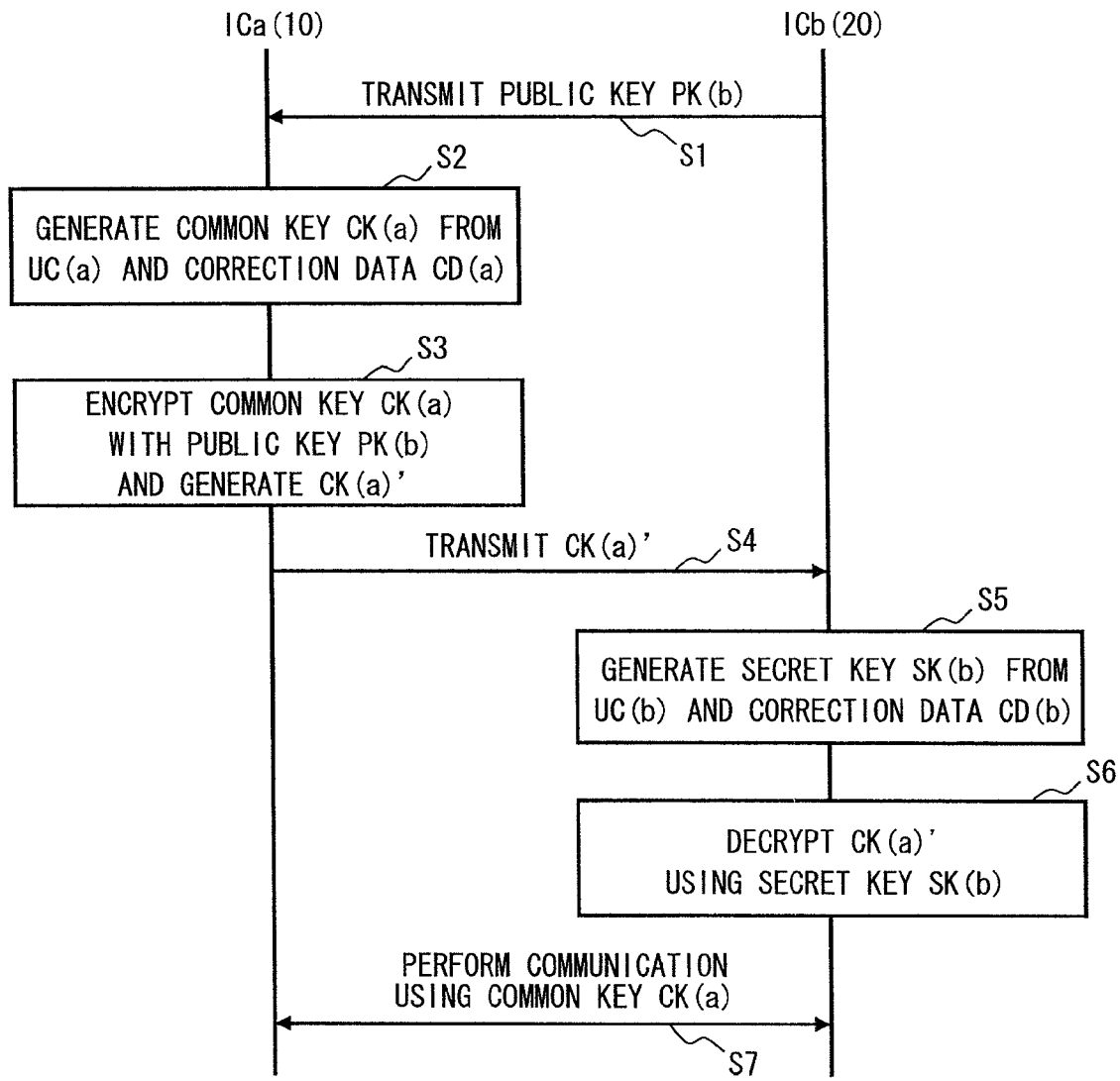
FIG. 2 is a flowchart to explain an operation of the cryptographic communication system according to the first embodiment.

An operation of the cryptographic communication system according to this embodiment is described hereinafter with reference to the flowchart of FIG. 2. First, the semiconductor device ICb (20) transmits the public key PK(b) of the semiconductor device ICb (20) to the semiconductor device ICa (10) (Step S1). The transmitted public key PK(b) is stored into the storage unit 12 of the semiconductor device 10. Next, the common key generation unit 13 of the semiconductor device 10 generates the common key CK(a) using the unique code UC(a) output from the unique code generation unit 11 and the correction data CD(a) stored in the storage unit 12 (Step S2). The encryption unit 14 encrypts the common key CK(a) generated in the common key generation unit 13 by using the public key PK(b) of the semiconductor device 20 and thereby generates the encrypted common key CK(a)' (Step S3). Then, the encrypted common key CK(a)' is transmitted from the semiconductor device 10 to the semiconductor device 20 (Step S4).

The secret key generation unit 23 of the semiconductor device 20 generates the secret key SK(b) of the semiconductor device 20 using the unique code UC(b) and the correction data CD(b) (Step S5). The decryption unit 24 decrypts the encrypted common key CK(a)' by using the secret key SK(b) and thereby generates the common key CK(a) (Step S6). By the above process, both of the semiconductor device 10 and the semiconductor device 20 can have the common key CK(a). Thus, the semiconductor device 10 and the semiconductor device 20 can perform cryptographic communication using the common key CK(a) (Step S7). Note that the sequence of the above steps can be changed as appropriate as long as it is consistent. For example, Step S5 may be performed in the semiconductor device in parallel with Steps S2 and S3 performed in the semiconductor device 10.

As described earlier, in the case of performing cryptographic communication using the common key CK(x) between the semiconductor device ICx and the semiconductor device ICy, the common key CK(x) needs to be shared between ICx and ICy. When ICx has the common key CK(x), ICx encrypts the common key CK(x) using the public key PK(y) of ICy acquired in advance and transmits the encrypted common key CK(x)' to ICy. Then, ICy decrypts the encrypted common key CK(x)' using the secret key SK(y) of ICy and thereby acquires the common key CK(x). In this manner, by transmitting the common key CK(x) from ICx to ICy using the public key cryptosystem, it is possible to share the common key CK(x) between ICx and ICy without a third party knowing. Thus, cryptographic communication can be performed between ICx and ICy using the common key cryptosystem.

At the time of transmitting the common key CK(x) from ICx to ICy, information of the common key CK(x) is not leaked because the common key CK(x) is encrypted. However, because important data such as the common key CK(x) and the secret key SK(y) are stored in the nonvolatile memory (storage unit) of the semiconductor devices (semiconductor chips) ICx and ICy. Therefore, if unauthorized analysis of the semiconductor device is made, leakage of the important data such as the common key CK(x) and the secret key SK(y) occurs.

On the other hand, in the cryptographic communication system according to this embodiment, the common key CK(a) is generated in the common key generation unit 13 of the semiconductor device 10 by using the unique code UC(a) containing an information component unique to the semiconductor device 10 and a variable information component, and the correction data CD(a) that corrects the unique code UC(a). Further, the secret key SK(b) of the semiconductor device 20 is generated in the secret key generation unit 23 of the semiconductor device 20 by using the unique code UC(b) containing an information component unique to the semiconductor device 20 and a variable information component, and the correction data CD(b) that corrects the unique code UC(b). Because important data such as the common key CK(a) and the secret key SK(b) are not directly stored in the storage units 12 and 22, leakage of the important data such as the common key CK(a) and the secret key SK(b) does not occur even if unauthorized analysis of the semiconductor device is made.

Further, although the secret key SK(b) needs to be a key corresponding to the public key PK(b), it is easy to generate a plurality of correction data CD(b) because the correction data CD(b) can be determined so as to obtain a bit pattern as the secret key SK(b) from a bit pattern obtained as the unique code UC(b) of the semiconductor device 20.

Methods of analyzing a semiconductor device for unauthorized acquisition of data are as follows.

(1) A method that makes modification to the semiconductor device using FIB (Focused Ion Beam) and physically analyzes the semiconductor device using a probe.

(2) Fault tree analysis that makes a CPU run away by applying an electromagnetic wave such as a laser beam to the semiconductor device or inserting noise to a power supply terminal and thereby acquires data in an unauthorized manner.

(3) Leakage analysis that observes the current consumption of the semiconductor device and analyzes key data.

In order to avoid the unauthorized analysis, in the field where a high security level is required, a microcomputer with a high security level (which is referred to hereinafter as a secure microcomputer) is used. The secure microcomputer has a shield to protect a wiring area, a function of detecting light or signal noise, a function of disrupting the current by combining a random number signal with a signal and the like. In the unauthorized analysis of key data by the leakage analysis described above, a characteristic pattern of power consumption arising from execution of a certain operation based on specific data is extracted. The characteristic pattern of power consumption can be disrupted by making random selection from a plurality of correction data CD(a) or CD(b) using a random number or the like.

In this manner, it is possible to prevent a third party's unauthorized analysis of the semiconductor device by using the secure microcomputer. However, in the case of using the secure microcomputer, although the unauthorized analysis can be prevented, semiconductor device manufacturers cannot carry out failure analysis and breakdown analysis because of its high tamper resistance. Particularly, in a vehicle-mounted microcomputer (ECU etc.) for automobile use, failure analysis and breakdown analysis of a semiconductor device are necessary because high reliability is required. For this reason, a general-purpose microcomputer having a lower security level than the secure microcomputer has been widely used as the vehicle-mounted microcomputer. Thus, a cryptographic communication system that increases the security level of a semiconductor device with use of a general-purpose microcomputer has been required for the vehicle-mounted microcomputer.

In the cryptographic communication system according to this embodiment, because important data such as the common key CK(a) and the secret key SK(b) are not directly stored in the storage units 12 and 22, leakage of the important data such as the common key CK(a) and the secret key SK(b) does not occur even if unauthorized analysis of the semiconductor device is made. Therefore, even when the semiconductor device 10 and the semiconductor device 20 are configured using a general-purpose microcomputer with a relatively low security level, a high security level can be achieved.

Note that the correction data CD(a) and CD(b) that are used to generate the common key CK(a) and the secret key SK(b) are information with a relatively high security level, though the security level is lower than that of the common key CK(a) and the secret key SK(b). Thus, the security microcomputer may be used for the semiconductor devices 10 and 20 in which the correction data CD(a) and CD(b) are stored in order to prevent leakage of the correction data CD(a) and CD(b) to a third party.

As described above, according to the embodiment of the present invention, it is possible to provide the cryptographic communication system and the cryptographic communication method that enhance security.

<Second Embodiment>

Figure 5:
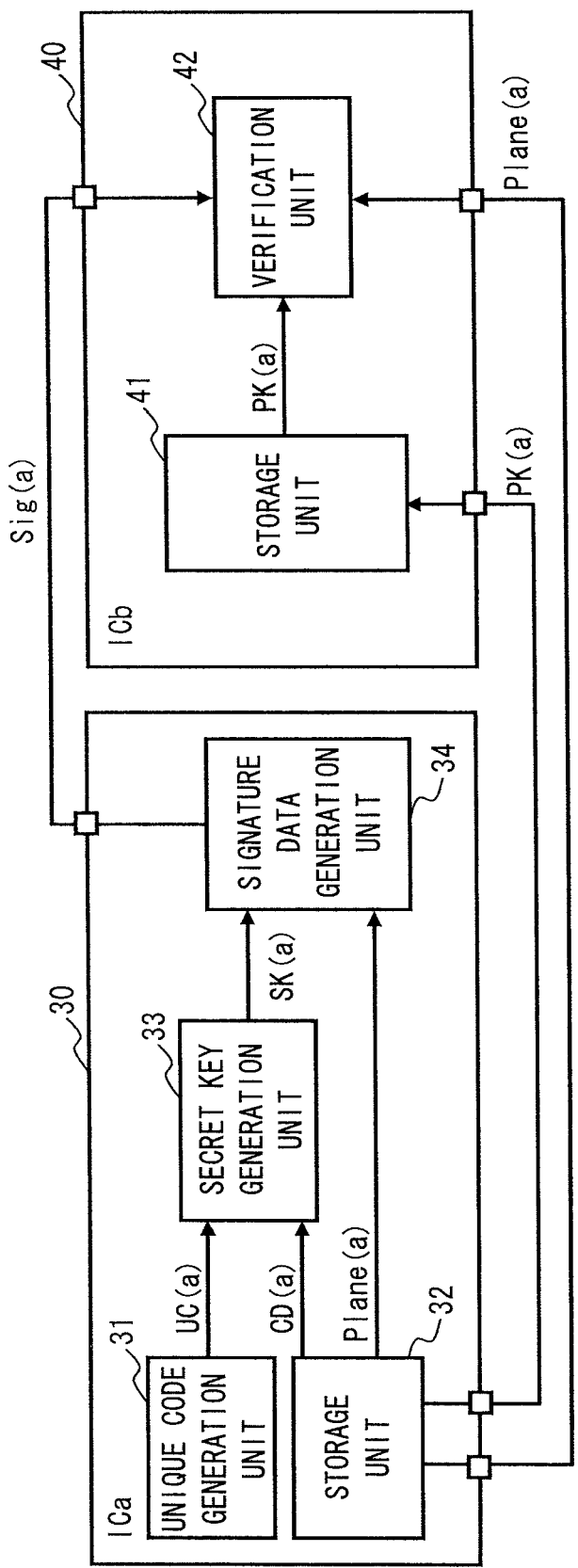
FIG. 5 is a block diagram showing a cryptographic communication system according to a second embodiment.

A second embodiment of the present invention is described hereinafter. FIG. 5 is a block diagram showing a cryptographic communication system 2 according to this embodiment. In this embodiment, the cryptographic communication system is applied to a digital signature system. The cryptographic communication system 2 according to this embodiment includes a semiconductor device ICa (30) and a semiconductor device ICb (40). The semiconductor device 30 includes a unique code generation unit 31, a storage unit 32, a secret key generation unit 33, and a signature data generation unit 34.

The unique code generation unit 31 generates a unique code UC(a) that is unique to the semiconductor device 30 and outputs it to the secret key generation unit 33. The basic configuration and operation of the unique code generation unit 31 are the same as those of the unique code generation unit 11 described in the first embodiment and redundant explanation thereof is omitted.

The storage unit 32 can store correction data CD(a), plain text Plane(a), and a public key PK(a) of the semiconductor device 30 in a nonvolatile memory.

The secret key generation unit 33 generates a secret key SK(a) of the semiconductor device 30 using the unique code UC(a) output from the unique code generation unit 31 and the correction data CD(a) stored in the storage unit 32. Note that the secret key generation unit 33 functions as a unique code correction unit. The basic configuration and operation of the secret key generation unit 33 are the same as those of the common key generation unit 13 described in the first embodiment and redundant explanation thereof is omitted.

The signature data generation unit 34 generates signature data Sig(a) using the secret key SK(a) generated in the secret key generation unit 33 and the plain text Plane(a) stored in the storage unit 32. In other words, the signature data generation unit 34 executes a signature generation algorithm in the digital signature scheme.

The semiconductor device 40 includes a storage unit 41 and a verification unit 42. The storage unit 41 can store the public key PK(a) of the semiconductor device 30. The verification unit 42 executes a verification algorithm in the digital signature scheme. Specifically, the verification unit 42 generates verification data using the signature data Sig(a) and the public key PK(a) of the semiconductor device 30. The signature data Sig(a) is data generated by encrypting the plain text Plane(a) using the secret key SK(a) of the semiconductor device 30. Thus, the verification data obtained by decrypting the signature data Sig(a) using the public key PK(a) of the semiconductor device 30 is data corresponding to the plain text Plane(a) transmitted from the semiconductor device 30. Therefore, the verification unit 42 compares the verification data with the plain text Plane(a) and, when the verification data and the plain text Plane(a) match, it can be determined that the semiconductor device 30 has the secret key SK(a). Note that the public key PK(a) supplied from the semiconductor device 30 may be directly supplied to the verification unit 42 of the semiconductor device 40.

Figure 6:
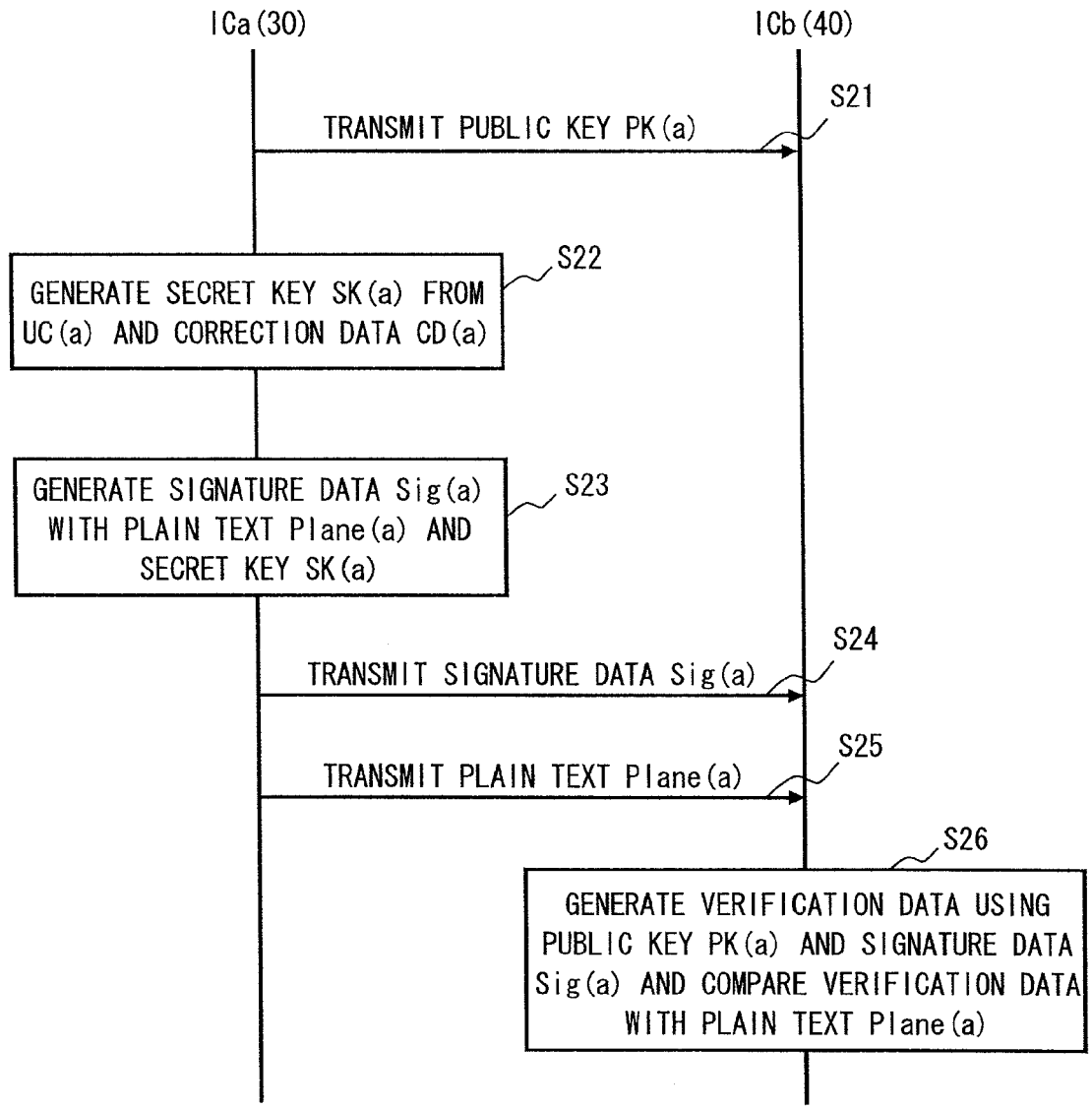
FIG. 6 is a flowchart to explain an operation of the cryptographic communication system according to the second embodiment.

An operation of the cryptographic communication system according to this embodiment is described hereinafter with reference to the flowchart of FIG. 6. First, the semiconductor device 30 (which corresponds to a signer) transmits the public key PK(a) of the semiconductor device 30 to the semiconductor device 40 (which corresponds to a verifier) (Step S21).

Then, the secret key generation unit 33 of the semiconductor device 30 generates the secret key SK(a) of the semiconductor device 30 using the unique code UC(a) output from the unique code generation unit 31 and the correction data CD(a) stored in the storage unit 32 (Step S22). After that, the signature data generation unit 34 of the semiconductor device 30 executes a signature generation algorithm in the digital signature scheme. Specifically, the signature data generation unit 34 generates the signature data Sig(a) using the secret key SK(a) generated in the secret key generation unit 33 and the plain text Plane(a) stored in the storage unit 32 (Step S23).

The signature data Sig(a) generated in the signature data generation unit 34 is transmitted to the verification unit 42 of the semiconductor device 40 (Step S24). Further, the plain text Plane(a) is transmitted to the verification unit 42 of the semiconductor device 40 (Step S25). Note that, although the case where the plain text Plane(a) is stored in the storage unit 32 is shown in FIG. 5, the plain text Plane(a) may be directly supplied from outside to the signature data generation unit 34 and the verification unit 42.

The verification unit 42 of the semiconductor device 40 executes a verification algorithm in the digital signature scheme. Specifically, the verification unit 42 generates verification data using the signature data Sig(a) and the public key PK(a) of the semiconductor device 30, and compares the verification data with the plain text Plane(a) (Step S26). When the verification data and the plain text Plane(a) match (when the verification algorithm accepts the signature data Sig(a)), the verification unit 42 determines that the signature data Sig(a) created by the semiconductor device 30 is valid. In other words, it is determined that the semiconductor device 30 has the secret key SK(a). On the other hand, when the verification data and the plain text Plane(a) do not match (when the verification algorithm rejects the signature data Sig(a)), the verification unit 42 determines that the signature data Sig(a) created by the semiconductor device 30 is invalid. In other words, it is determined that the semiconductor device 30 does not have the secret key SK(a). Note that the sequence of the above steps can be changed as appropriate as long as it is consistent.

Generally, in the case of performing verification using the digital signature scheme between the semiconductor device ICx (which corresponds to a signer) and the semiconductor device ICy (which corresponds to a verifier), ICx needs to have a secret key SK(x). The secret key SK(x) is stored in a nonvolatile memory (storage unit) of the semiconductor device ICx. Therefore, if unauthorized analysis of the semiconductor device is made, leakage of important data such as the secret key SK(x) occurs.

On the other hand, in the cryptographic communication system according to this embodiment, the secret key SK(a) of the semiconductor device 30 is generated in the secret key generation unit 33 of the semiconductor device 30 by using the unique code UC(a) unique to the semiconductor device 30 and the correction data CD(a) stored in the storage unit 32. Because the secret key SK(a), which is important data, is not directly stored in the storage unit 32, leakage of the secret key SK(a) does not occur even if unauthorized analysis of the semiconductor device is made. Therefore, even when the semiconductor device 30 and the semiconductor device 40 are configured using a general-purpose microcomputer with a relatively low security level, a high security level can be achieved. Note that the secure microcomputer may be used for the semiconductor devices 30 and 40 in order to further enhance the security level of the cryptographic communication system composed of the semiconductor device 30 and the semiconductor device 40.

As described above, according to the embodiment of the present invention, it is possible to provide the cryptographic communication system and the cryptographic communication method that enhance security.

<Third Embodiment>

Figure 7:
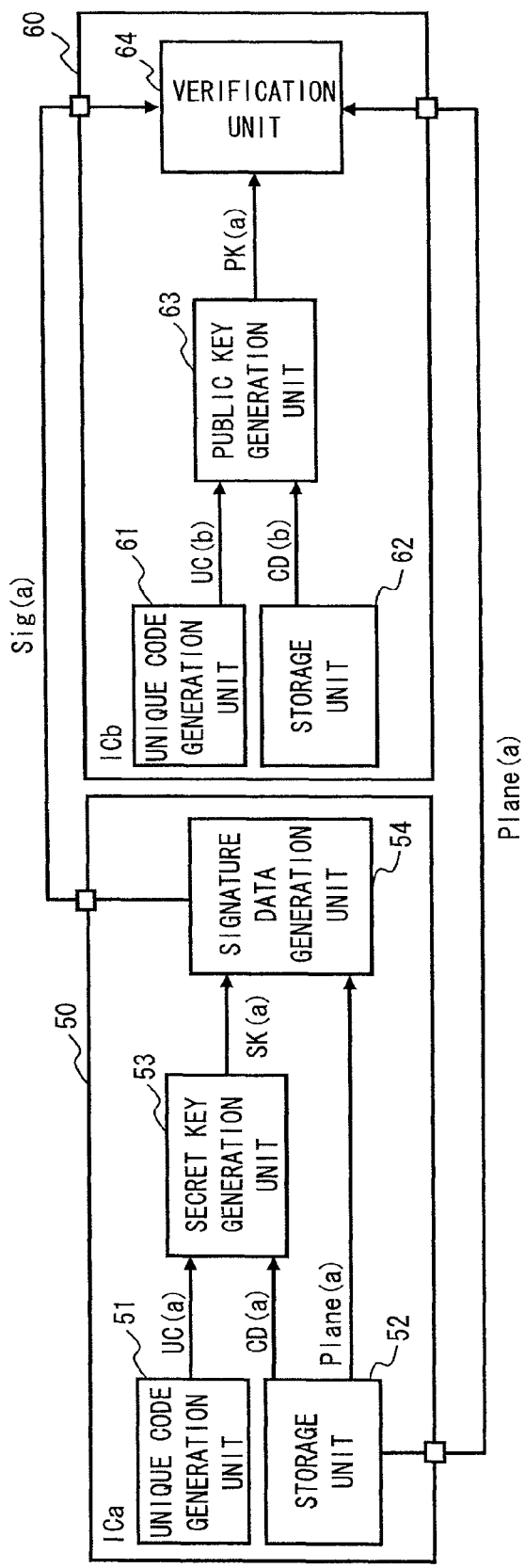
FIG. 7 is a block diagram showing a cryptographic communication system according to a third embodiment.

A third embodiment of the present invention is described hereinafter. FIG. 7 is a block diagram showing a cryptographic communication system 3 according to this embodiment. In this embodiment, the cryptographic communication system is applied to a digital signature system. Although the cryptographic communication system 2 according to the second embodiment transmits the public key PK(a) of the semiconductor device 30 to the semiconductor device 40 in Step S21, in the cryptographic communication system 3 according to this embodiment, a public key PK(a) of a semiconductor device 50 is generated using a public key generation unit 63.

The cryptographic communication system 3 according to this embodiment shown in FIG. 7 includes a semiconductor device ICa (50) and a semiconductor device ICb (60). The semiconductor device 50 includes a unique code generation unit 51, a storage unit 52, a secret key generation unit 53, and a signature data generation unit 54.

The unique code generation unit 51 generates a unique code UC(a) that is unique to the semiconductor device 50 and outputs it to the secret key generation unit 53. The basic configuration and operation of the unique code generation unit 51 are the same as those of the unique code generation unit 11 described in the first embodiment and redundant explanation thereof is omitted.

The storage unit 52 can store correction data CD(a) and plain text Plane(a) in a nonvolatile memory.

The secret key generation unit 53 generates a secret key SK(a) of the semiconductor device 50 using the unique code UC(a) output from the unique code generation unit 51 and the correction data CD(a) stored in the storage unit 52. Note that the secret key generation unit 53 functions as a unique code correction unit. The basic configuration and operation of the secret key generation unit 53 are the same as those of the common key generation unit 13 described in the first embodiment and redundant explanation thereof is omitted.

The signature data generation unit 54 generates signature data Sig(a) using the secret key SK(a) generated in the secret key generation unit 53 and the plain text Plane(a) stored in the storage unit 52. In other words, the signature data generation unit 54 executes a signature generation algorithm in the digital signature scheme.

The semiconductor device 60 includes a unique code generation unit 61, a storage unit 62, a public key generation unit 63, and a verification unit 64. The unique code generation unit 61 generates a unique code UC(b) that is unique to the semiconductor device 60 and outputs it to the public key generation unit 63. The basic configuration and operation of the unique code generation unit 61 are the same as those of the unique code generation unit 11 described in the first embodiment and redundant explanation thereof is omitted.

The storage unit 62 can store correction data CD(b) in a nonvolatile memory.

The public key generation unit 63 generates a public key PK(a) of the semiconductor device 50 using the unique code UC(b) output from the unique code generation unit 61 and the correction data CD(b) stored in the storage unit 62. Note that the public key generation unit 63 functions as a unique code correction unit. The basic configuration and operation of the public key generation unit 63 are the same as those of the common key generation unit 13 described in the first embodiment and redundant explanation thereof is omitted.

The verification unit 64 executes a verification algorithm in the digital signature scheme. Specifically, the verification unit 64 generates verification data using the signature data Sig(a) and the public key PK(a) of the semiconductor device 50. The signature data Sig(a) is data generated by encrypting the plain text Plane(a) using the secret key SK(a) of the semiconductor device 50. Thus, the verification data obtained by decrypting the signature data Sig(a) using the public key PK(a) of the semiconductor device is data corresponding to the plain text Plane(a) transmitted from the semiconductor device 50. Therefore, the verification unit 64 compares the verification data with the plain text Plane(a) and, when the verification data and the plain text Plane(a) match, it can be determined that the semiconductor device 50 has the secret key SK(a).

Figure 8:
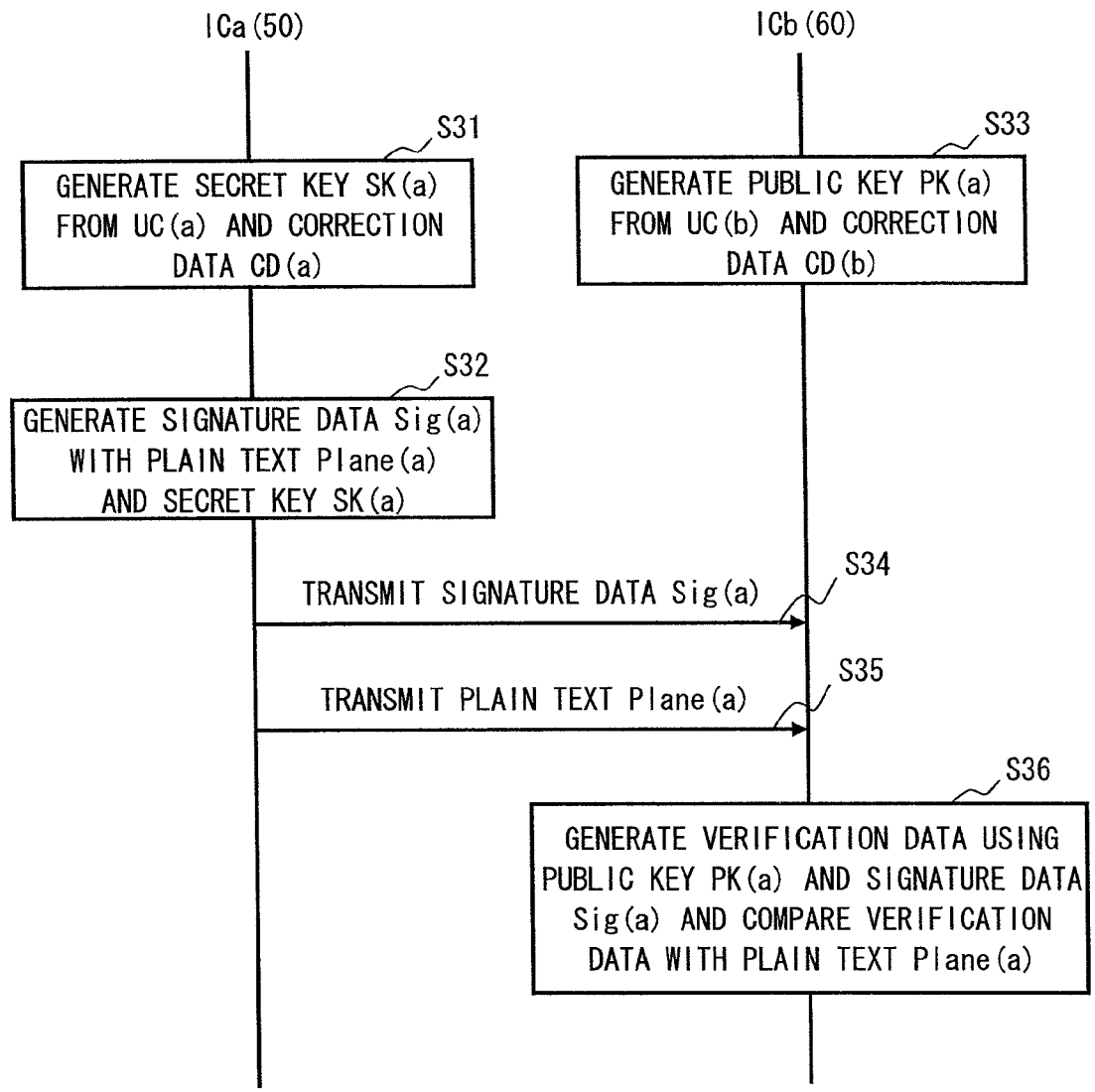
FIG. 8 is a flowchart to explain an operation of the cryptographic communication system according to the third embodiment.

An operation of the cryptographic communication system according to this embodiment is described hereinafter with reference to the flowchart of FIG. 8. First, the secret key generation unit 53 of the semiconductor device 50 (which corresponds to a signer) generates the secret key SK(a) of the semiconductor device 50 using the unique code UC(a) output from the unique code generation unit 51 and the correction data CD(a) stored in the storage unit 52 (Step S31). Then, the signature data generation unit 54 of the semiconductor device executes a signature generation algorithm in the digital signature scheme. Specifically, the signature data generation unit 54 generates the signature data Sig(a) using the secret key SK(a) generated in the secret key generation unit 53 and the plain text Plane(a) stored in the storage unit 52 (Step S32).

On the other hand, the public key generation unit 63 of the semiconductor device 60 (which corresponds to a verifier) generates the public key PK(a) of the semiconductor device 50 using the unique code UC(b) output from the unique code generation unit 61 and the correction data CD(b) stored in the storage unit 62 (Step S33).

The signature data Sig(a) generated in the signature data generation unit 54 is transmitted to the verification unit 64 of the semiconductor device 60 (Step S34). Further, the plain text Plane(a) is transmitted to the verification unit 64 of the semiconductor device 60 (Step S35). Note that, although the case where the plain text Plane(a) is stored in the storage unit 52 is shown in FIG. 7, the plain text Plane(a) may be directly supplied from outside to the signature data generation unit 54 and the verification unit 64.

The verification unit 64 of the semiconductor device 60 executes a verification algorithm in the digital signature scheme. Specifically, the verification unit 64 generates verification data using the signature data Sig(a) and the public key PK(a) of the semiconductor device 50, and compares the verification data with the plain text Plane(a) (Step S36). When the verification data and the plain text Plane(a) match (when the verification algorithm accepts the signature data Sig(a)), the verification unit 64 determines that the signature data Sig(a) created by the semiconductor device 50 is valid. In other words, it is determined that the semiconductor device 50 has the secret key SK(a). On the other hand, when the verification data and the plain text Plane(a) do not match (when the verification algorithm rejects the signature data Sig(a)), the verification unit 64 determines that the signature data Sig(a) created by the semiconductor device 50 is invalid. In other words, it is determined that the semiconductor device 50 does not have the secret key SK(a). Note that the sequence of the above steps can be changed as appropriate as long as it is consistent.

In the cryptographic communication system according to this embodiment, the secret key SK(a) of the semiconductor device 50 is generated in the secret key generation unit 53 of the semiconductor device 50 by using the unique code UC(a) unique to the semiconductor device 50 and the correction data CD(a). Because the secret key SK(a), which is important data, is not directly stored in the storage unit 52, leakage of the secret key SK(a) being important data does not occur even if unauthorized analysis of the semiconductor device is made. Therefore, even when the semiconductor device 50 and the semiconductor device 60 are configured using a general-purpose microcomputer with a relatively low security level, a high security level can be achieved.

Further, in the cryptographic communication system according to this embodiment, the public key PK(a) of the semiconductor device 50 is generated in the public key generation unit 63 of the semiconductor device 60 by using the unique code UC(b) and the correction data CD(b). Because there is no need to transmit the public key PK(a) from the semiconductor device 50 to the semiconductor device 60, it is possible to prevent leakage of the cryptographic method in use to a third party, which further enhances the security of the cryptographic communication system. Note that the secure microcomputer may be used for the semiconductor devices 50 and in order to further enhance the security level of the cryptographic communication system composed of the semiconductor device 50 and the semiconductor device 60.

<Fourth Embodiment>

A fourth embodiment of the present invention is described hereinafter. In the first to third embodiments described above, the correction data CD(a) and CD(b) that are used for generating the common key and the secret key are stored in the semiconductor device. However, the correction data CD(a) and CD(b) that are used for generating the common key and the secret key are also information with a high security level. It is thus preferred to construct a cryptographic communication system in which the correction data CD(a) and CD(b) are not leaked to a third party.

Figure 9:
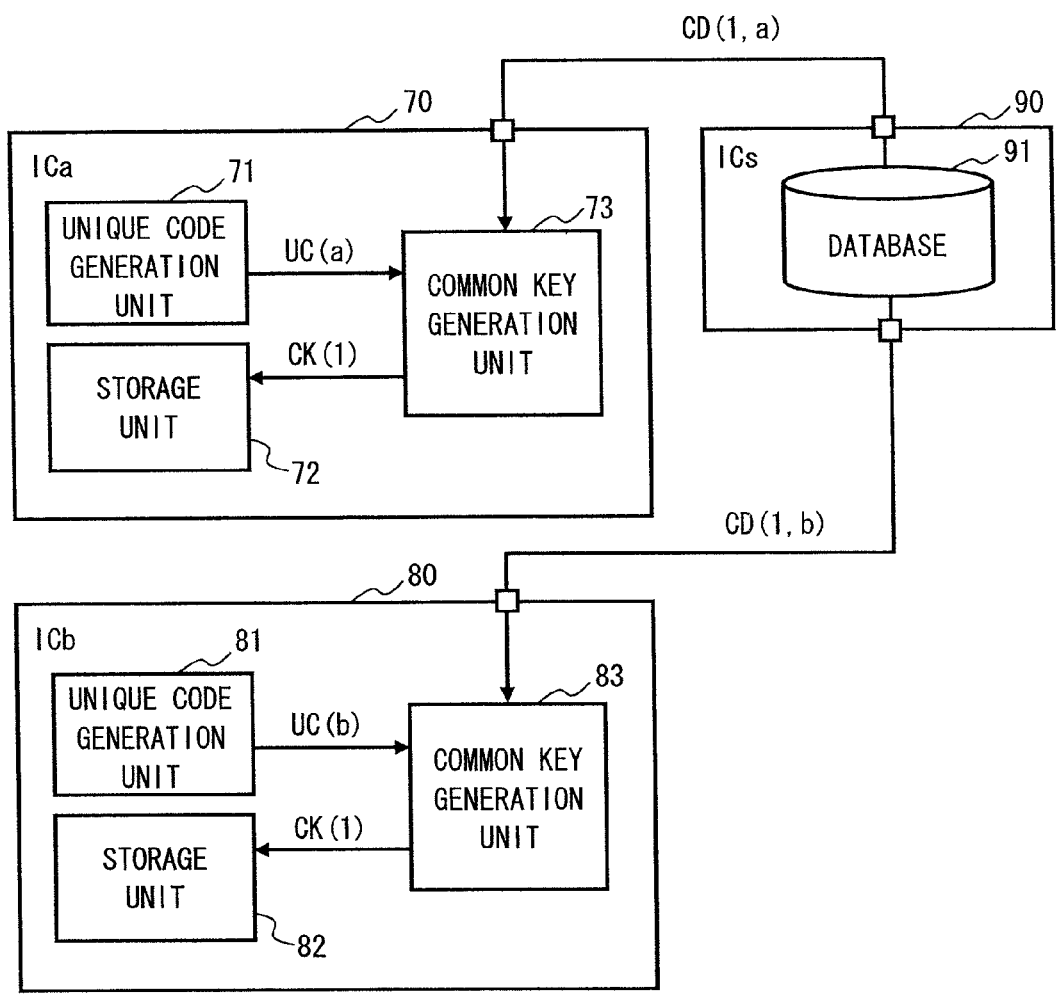
FIG. 9 is a block diagram showing a cryptographic communication system according to a fourth embodiment.

In a cryptographic communication system 4 according to this embodiment shown in FIG. 9, the correction data to be used for generating the common key is not stored in semiconductor devices 70 and 80, and a semiconductor device 90 including a database 91 that collectively manages the correction data is placed. Because the correction data with a high security level is stored in the database 91 of the semiconductor device 90, it is preferred to configure the semiconductor device 90 using the secure microcomputer. On the other hand, information of a common key CK(1) with a high security level is not stored in a nonvolatile memory in the semiconductor devices 70 and 80, the semiconductor devices 70 and 80 can be configured using general-purpose microcomputers. Specifically, although the common key CK(1) is temporarily stored in storage units 72 and 82, because the common key CK(1) is stored in a volatile memory, information of the common key CK(1) is erased when the semiconductor devices 70 and 80 are powered off. Accordingly, the common key CK(1) with a high security level is not stored in the semiconductor devices 70 and 80. The cryptographic communication system according to this embodiment is described in detail hereinbelow.

The cryptographic communication system 4 shown in FIG. 9 includes semiconductor devices 70, 80 and 90. The semiconductor device (first semiconductor device) 70 includes a unique code generation unit 71, a storage unit 72, and a common key generation unit (first common key generation unit) 73.

The unique code generation unit 71 generates a unique code UC(a) that is unique to the semiconductor device 70 and outputs it to the common key generation unit 73. The basic configuration and operation of the unique code generation unit 71 are the same as those of the unique code generation unit 11 described in the first embodiment and redundant explanation thereof is omitted.

The storage unit 72 stores the common key CK(1) generated in the common key generation unit 73 in a volatile memory. The common key CK(1) is erased when the semiconductor device 70 is powered off. Note that the common key CK(1) may be stored in a nonvolatile memory according to need after taking security measures such as encryption, and measures such as erasing data by writing at power-off of the semiconductor device 70 may be done on the common key CK(1) stored in the nonvolatile memory.

The common key generation unit 73 generates the common key CK(1) using the unique code UC(a) output from the unique code generation unit 71 and correction data (first correction data) CD(1,a) supplied from the semiconductor device 90. The common key generation unit 73 functions as a unique code correction unit. The basic configuration and operation of the common key generation unit 73 are the same as those of the common key generation unit 13 described in the first embodiment and redundant explanation thereof is omitted.

The semiconductor device (second semiconductor device) 80 includes a unique code generation unit 81, a storage unit 82, and a common key generation unit (second common key generation unit) 83.

The unique code generation unit 81 generates a unique code UC(b) that is unique to the semiconductor device 80 and outputs it to the common key generation unit 83. The basic configuration and operation of the unique code generation unit 81 are the same as those of the unique code generation unit 11 described in the first embodiment and redundant explanation thereof is omitted.

The storage unit 82 stores the common key CK(1) generated in the common key generation unit 83 in a volatile memory. The common key CK(1) is erased when the semiconductor device 80 is powered off. Note that the common key CK(1) may be stored in a nonvolatile memory according to need after taking security measures such as encryption, and measures such as erasing data by writing at power-off of the semiconductor device 80 may be done on the common key CK(1) stored in the nonvolatile memory.

The common key generation unit 83 generates the common key CK(1) using the unique code UC(b) output from the unique code generation unit 81 and correction data (second correction data) CD(1,b) supplied from the semiconductor device 90. The common key generation unit 83 functions as a unique code correction unit. The basic configuration and operation of the common key generation unit 83 are the same as those of the common key generation unit 13 described in the first embodiment and redundant explanation thereof is omitted. The semiconductor device (third semiconductor device) 90 includes the database 91 that stores the correction data. FIG. 10 is a table showing an example of data stored in the database 91. As shown in FIG. 10, correction data CD(1, a), CD(1, b), . . . ) associated with information of the semiconductor devices (ICa, ICb, ICc, . . . , ICz) and public keys generated in the semiconductor devices (CK(1), CK(2), CK(3), . . . , CK(n)) are stored in the database 91.

For example, in the case of generating the common key CK(1) in the semiconductor device ICa, the correction data CD(1,a) is transmitted to the semiconductor device ICa. Further, in the case of generating the common key CK(1) in the semiconductor device ICb, the correction data CD(1,b) is transmitted to the semiconductor device ICb. Likewise, in the case of generating the common key CK(3) in the semiconductor device ICa, for example, the correction data CD(3,a) is transmitted to the semiconductor device ICa. Further, in the case of generating the common key CK(3) in the semiconductor device ICb, for example, the correction data CD(3,b) is transmitted to the semiconductor device ICb.

In the cryptographic communication system according to this embodiment, even when the unique codes UC(a) and UC(b) are different, the same common key CK(1) can be generated by performing different operations on the error-corrected unique codes UC(a)'' and UC(b)'' using the operation parameter (see the first embodiment).

Further, the common key CK can be changed by changing the operation parameter of the correction data CD. Thus, a plurality of common keys can be generated like the common keys CK(1), CK(2), CK(3), . . . , CK(n) shown in FIG. 10 by changing the operation parameter of the correction data CD. Thus, in the cryptographic communication system according to this embodiment, by changing the correction data CD that is transmitted from the semiconductor device 90 to the semiconductor devices 70 and 80 at regular intervals, the common key CK of the semiconductor devices 70 and 80 can be changed easily, so that the security level can be easily enhanced.

Note that because the correction data CD that is transmitted from the semiconductor device 90 to the semiconductor devices 70 and 80 is information with a high security level, when transmitting the correction data CD to the semiconductor devices 70 and 80, the correction data CD may be encrypted before transmission using the public key cryptosystem. In this case, the semiconductor device 70 has the secret key of the semiconductor device 70, for example, and the semiconductor device 90 encrypts the correction data CD(1,a) using the public key of the semiconductor device 70 when transmitting the correction data CD(1,a). Then, the semiconductor device 70 decrypts the encrypted correction data CD(1,a) using the secret key, so that the encrypted correction data can be transmitted from the semiconductor device 90 to the semiconductor device 70.

Figure 11:
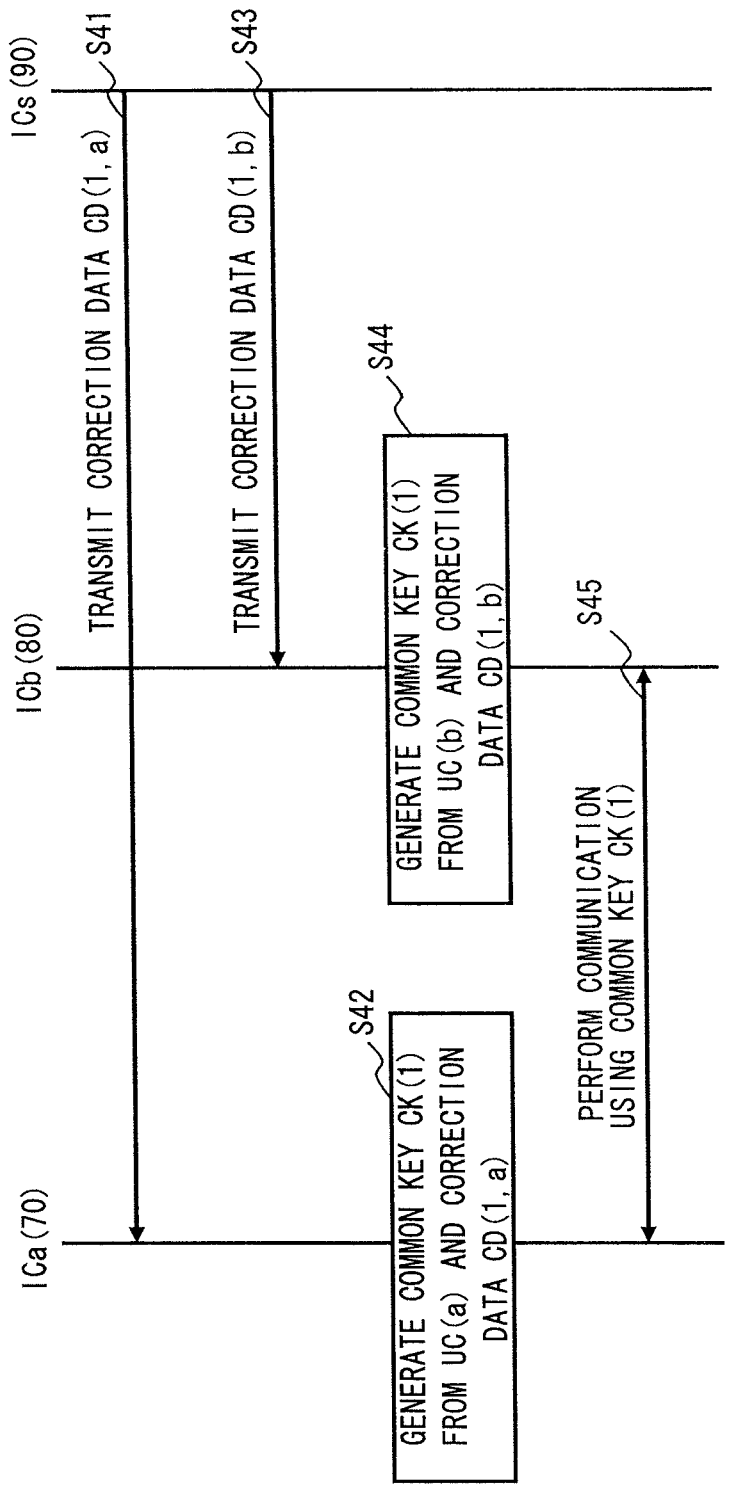
FIG. 11 is a flowchart to explain an operation of the cryptographic communication system according to the fourth embodiment.

An operation of the cryptographic communication system 4 according to this embodiment is described hereinafter with reference to the flowchart of FIG. 11. First, the semiconductor device ICs (90) transmits the correction data CD(1,a) to the semiconductor device ICa (70) (Step S41). Next, the common key generation unit 73 of the semiconductor device 70 generates the common key CK(1) using the unique code UC(a) output from the unique code generation unit 71 and the correction data CD(1,a) transmitted from the semiconductor device 90 (Step S42).

Further, the semiconductor device ICs (90) transmits the correction data CD(1,b) to the semiconductor device ICb (80) (Step S43). Next, the common key generation unit 83 of the semiconductor device 80 generates the common key CK(1) using the unique code UC(b) output from the unique code generation unit 81 and the correction data CD(1,b) transmitted from the semiconductor device 90 (Step S44). In this process, both of the semiconductor device 70 and the semiconductor device 80 can have the common key CK(1). Thus, the semiconductor device 70 and the semiconductor device 80 can perform cryptographic communication using the common key CK(1) (Step S45). Note that the sequence of the above steps can be changed as appropriate as long as it is consistent.

Note that, when transmitting the correction data CD from the semiconductor device 90 to the semiconductor device 70 or 80, the correction data CD may be transmitted from the semiconductor device 90 to the semiconductor device 70 or 80 at regular intervals. Alternatively, the correction data CD may be transmitted from the semiconductor device 90 to the semiconductor device 70 or 80 at the timing when a request for transmission of the correction data CD is made from the semiconductor device 70 or 80.

The semiconductor device 90 and the semiconductor devices and 80 may be connected to each other via wired or wireless. Further, the semiconductor device 90 and the semiconductor devices 70 and 80 may be configured to be connected to each other only at the time of transmitting and receiving the correction data CD. Furthermore, the semiconductor device 90 may transmit the correction data CD to the semiconductor devices 70 and 80 through the Internet. In this case, it is preferred to encrypt the correction data CD using the above method for the sake of security.

Further, the system may be configured in such a way that a plurality of sets of semiconductor devices communicate with each other using different common keys CK. For example, the semiconductor devices ICd, ICe and ICf may be configured to communicate with one another using the common key CK(2), and the semiconductor devices ICg, ICh and ICi may be configured to communicate with one another using the common key CK(3). In this case, the correction data CD(2,d), CD(2,e) and CD(2,f) for generating the common key CK(2)

are transmitted from the semiconductor device 90 to the semiconductor devices ICd, ICe and ICf, respectively. Further, the correction data CD(3,g), CD(3,h) and CD(3,i) for generating the common key CK(3) are transmitted from the semiconductor device 90 to the semiconductor devices ICg, ICh and ICi, respectively.

In this manner, in the cryptographic communication system according to this embodiment, the semiconductor device 90 that collectively manages the correction data CD is included. Thus, there is no need to store the correction data CD that is used for generating the common key CK in the semiconductor devices and 80, which enhances the security of the cryptographic communication system. Because the correction data with a high security level is stored in the database 91 of the semiconductor device 90, it is preferred to configure the semiconductor device 90 using the secure microcomputer. On the other hand, information of the common key CK with a high security level is not stored in a nonvolatile memory in the semiconductor devices 70 and 80, the semiconductor devices 70 and 80 can be configured using general-purpose microcomputers. However, secure microcomputers may be used for the semiconductor devices 70 and 80 in order to further enhance the security level of the cryptographic communication system.

Further, in the cryptographic communication system according to this embodiment, because the correction data CD is collectively managed using the database 91, the common key CK of each semiconductor device can be changed easily. It is thus possible to easily change the common key CK of the semiconductor devices 70 and 80 at regular intervals, which further enhances the security of the cryptographic communication system.

<Fifth Embodiment>

Figure 12:
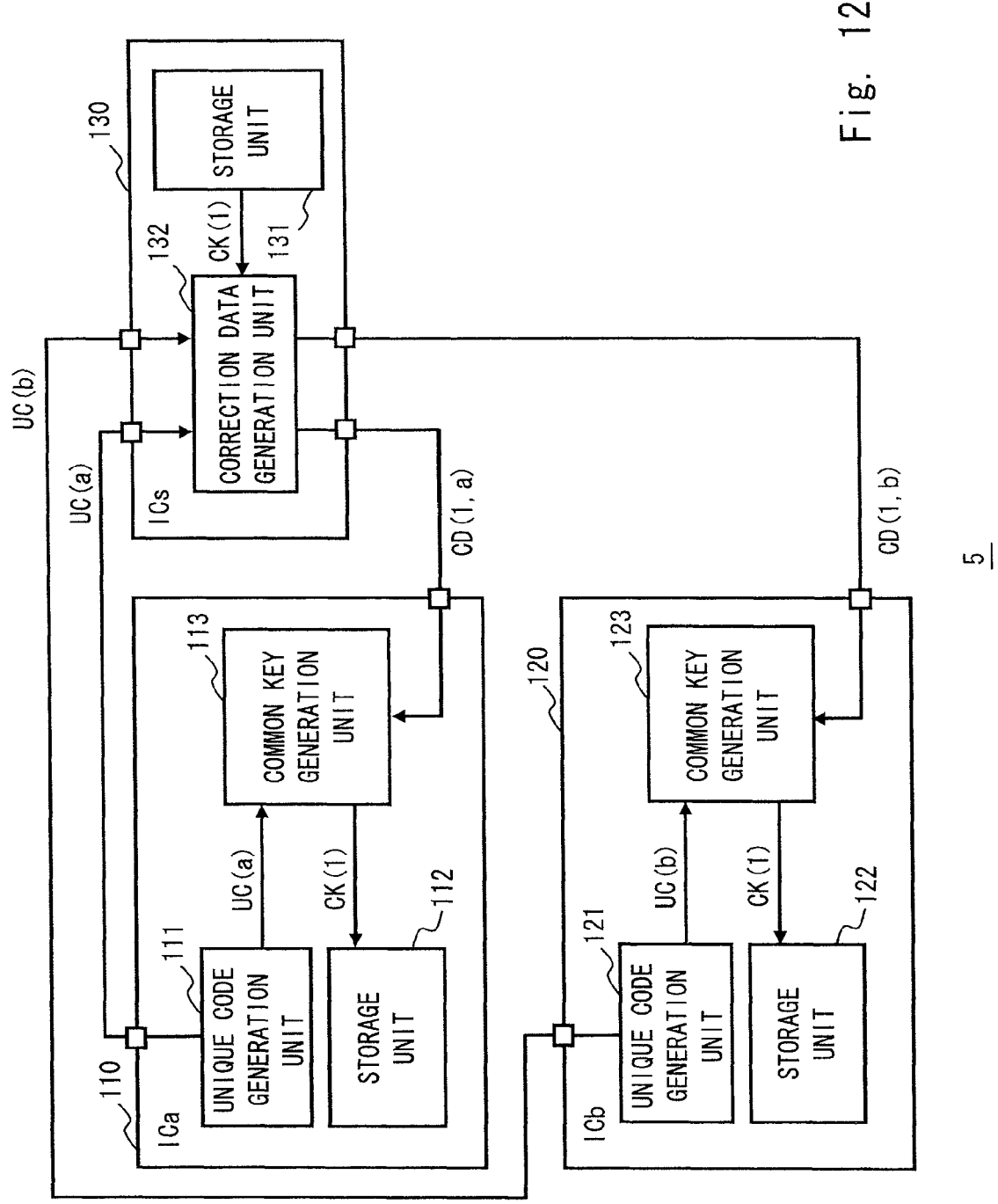
FIG. 12 is a block diagram showing a cryptographic communication system according to a fifth embodiment.

A fifth embodiment of the present invention is described hereinafter. FIG. 12 is a block diagram showing a cryptographic communication system according to this embodiment. Although the correction data is collectively managed in the database 91 in the cryptographic communication system described in the fourth embodiment, correction data to be transmitted to a semiconductor device ICa (110) and a semiconductor device ICb (120) is generated using a correction data generation unit 132 included in a semiconductor device 130. The other configuration is basically the same as that of the cryptographic communication system according to the fourth embodiment. This is described in detail hereinbelow.

A cryptographic communication system 5 shown in FIG. 12 includes semiconductor devices 110, 120 and 130. The semiconductor device 110 includes a unique code generation unit 111, a storage unit 112 and a common key generation unit 113.

The unique code generation unit 111 generates a unique code UC(a) that is unique to the semiconductor device 110 and outputs it to the common key generation unit 113 and the correction data generation unit 132 of the semiconductor device 130. The basic configuration and operation of the unique code generation unit 111 are the same as those of the unique code generation unit 11 described in the first embodiment and redundant explanation thereof is omitted.

The storage unit 112 stores a common key CK(1) generated in the common key generation unit 113 in a volatile memory. The common key CK(1) is erased when the semiconductor device 110 is powered off. Note that the common key CK(1) may be stored in a nonvolatile memory according to need after taking security measures such as encryption, and measures such as erasing data by writing at power-off of the semiconductor device 110 may be done on the common key CK(1) stored in the nonvolatile memory.

The common key generation unit 113 generates the common key CK(1) using the unique code UC(a) output from the unique code generation unit 111 and correction data CD(1,a) supplied from the semiconductor device 130. The common key generation unit 113 functions as a unique code correction unit. The basic configuration and operation of the common key generation unit 113 are the same as those of the common key generation unit 13 described in the first embodiment and redundant explanation thereof is omitted.

The semiconductor device 120 includes a unique code generation unit 121, a storage unit 122 and a common key generation unit 123.

The unique code generation unit 121 generates a unique code UC(b) that is unique to the semiconductor device 120 and outputs it to the common key generation unit 123 and the correction data generation unit 132 of the semiconductor device 130. The basic configuration and operation of the unique code generation unit 121 are the same as those of the unique code generation unit 11 described in the first embodiment and redundant explanation thereof is omitted.

The storage unit 122 stores a common key CK(1) generated in the common key generation unit 123 in a volatile memory. The common key CK(1) is erased when the semiconductor device 120 is powered off. Note that the common key CK(1) may be stored in a nonvolatile memory according to need after taking security measures such as encryption, and measures such as erasing data by writing at power-off of the semiconductor device 120 may be done on the common key CK(1) stored in the nonvolatile memory.

The common key generation unit 123 generates the common key CK(1) using the unique code UC(b) output from the unique code generation unit 121 and correction data CD(1,b) supplied from the semiconductor device 130. The common key generation unit 123 functions as a unique code correction unit. The basic configuration and operation of the common key generation unit 123 are the same as those of the common key generation unit 13 described in the first embodiment and redundant explanation thereof is omitted.

The semiconductor device 130 includes a storage unit 131 and a correction data generation unit 132. The storage unit 131 stores the common key CK(1) in a nonvolatile memory. The information of the common key CK(1) is not erased even when the semiconductor device 130 is powered off. Thus, it is preferred to configure the semiconductor device 130 using the secure microcomputer in order to prevent leakage of the information of the common key CK(1) to a third party by unauthorized analysis of the semiconductor device. Note that the semiconductor devices 110 and 120 may be configured using general-purpose microcomputers as in the case of the fourth embodiment.

The correction data generation unit 132 generates the correction data CD(1,a) using the unique code UC(a) of the semiconductor device 110 and the common key CK(1) stored in the storage unit 131. Further, the correction data generation unit 132 generates the correction data CD(1,b) using the unique code UC(b) of the semiconductor device 120 and the common key CK(1) stored in the storage unit 131.

Figure 14:
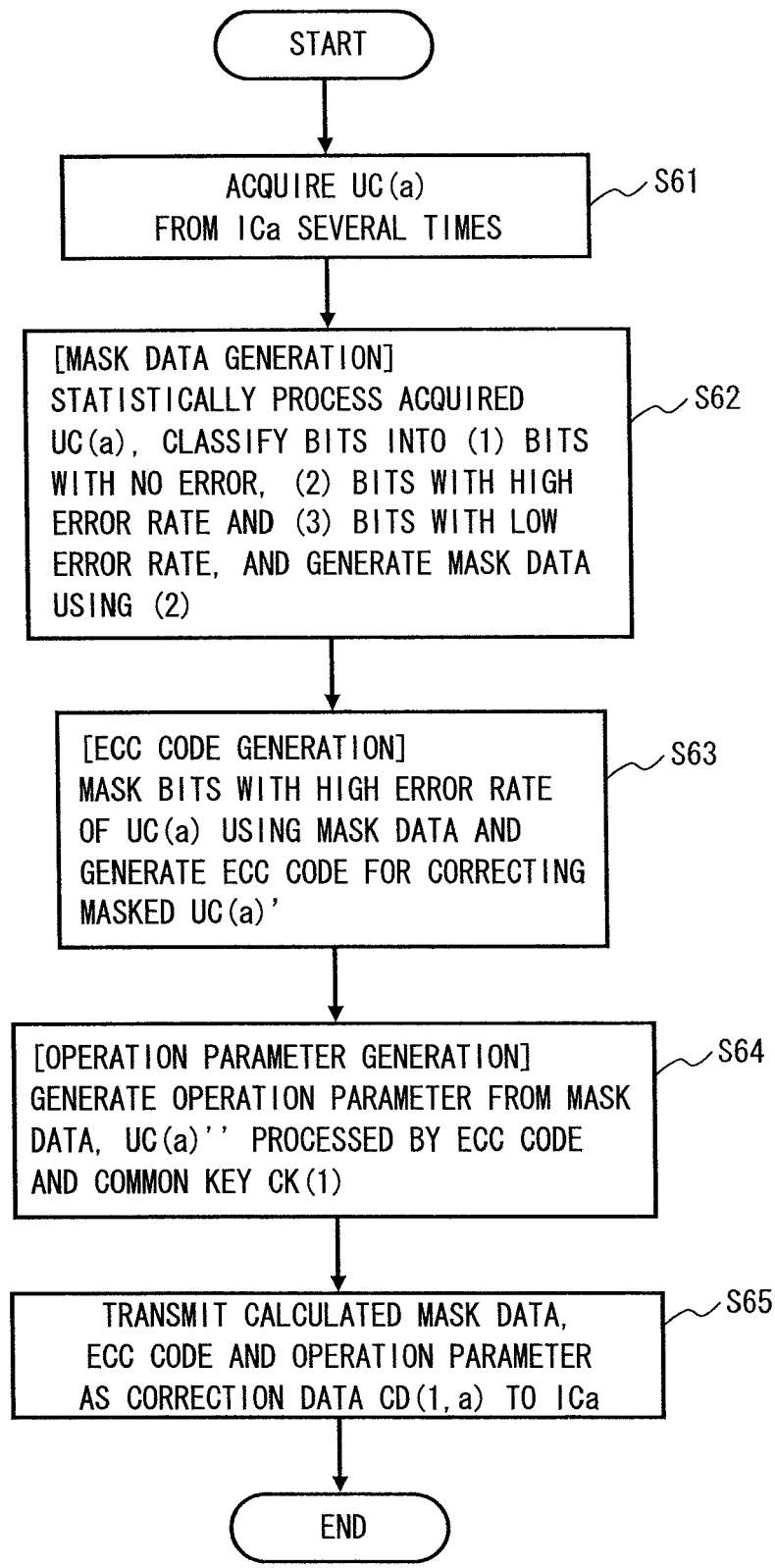
FIG. 14 is a flowchart to explain an operation of a correction data generation unit.

An operation when the correction data generation unit 132 generates the correction data is described hereinafter in detail with reference to FIG. 14. Although the case where the correction data generation unit 132 generates the correction data CD(1,a) is described below, the same applies to the case where the correction data generation unit 132 generates the correction data CD(1,b).

First, the correction data generation unit 132 acquires the unique code UC(a) a plurality of times from the semiconductor device ICa (110) (Step S61). Next, the correction data generation unit 132 statistically processes the unique code UC(a) acquired in Step S61, and classifies the respective bits of the unique code UC(a) into (1) bits with a stable value, (2) bits with high variability (i.e. bits with a relatively large variation in value) and (3) bits with low variability (i.e. bits with a relatively small variation in value). Then, the correction data generation unit 132 generates mask data using the (2) bits with high variability (Step S62). At this time, information indicating the position of the bit that varies with higher probability than a specified threshold among the bits of the unique code UC(a) is set as the mask data. For example, in the mask data shown in FIG. 4, the position of the bit with high variability (i.e. the position to be masked) is indicated by "0".

Next, the correction data generation unit 132 masks the unique code UC(a) using the mask data generated in Step S62 and eliminates the bit with high variability. It then generates an ECC code for correcting the error of the masked unique code UC(a)' (i.e. the unique code containing bits with a stable value and bits with low variability) (Step S63). The ECC code is BCH code or Reed-Solomon code, for example.

Then, the correction data generation unit 132 generates an operation parameter using the unique code UC(a)" processed using the mask data generated in Step S62 and the ECC code generated in Step S63 (which is the unique code containing bits with a stable value) and the common key CK(1) stored in the storage unit 131 (Step S64). The operation parameter is a parameter required to generate the common key CK(1) from the corrected unique code UC(a)".

Finally, the correction data generation unit 132 transmits the mask data, the ECC code and the operation parameter generated by the above process as the correction data CD(1,a) to the semiconductor device ICa (110) (Step S65).

Figure 13:
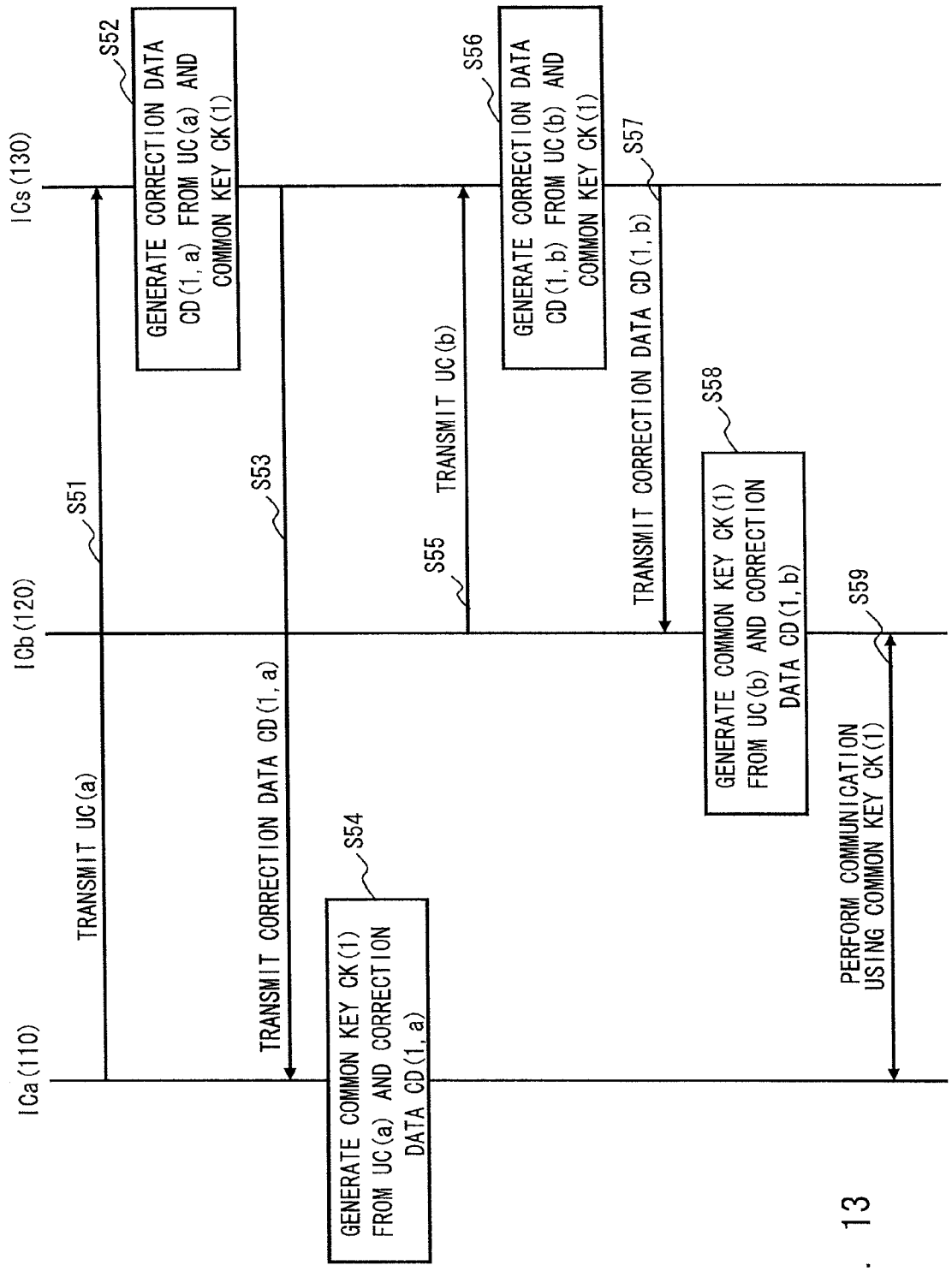
FIG. 13 is a flowchart to explain an operation of the cryptographic communication system according to the fifth embodiment.

An operation of the cryptographic communication system 5 according to this embodiment is described hereinafter with reference to the flowchart of FIG. 13. First, the semiconductor device ICa (110) transmits the unique code UC(a) to the correction data generation unit 132 of the semiconductor device ICs (130) (Step S51). Next, the correction data generation unit 132 of the semiconductor device 130 generates the correction data CD(1,a) using the transmitted unique code UC(a) and the common key CK(1) (Step S52). For the correction data generation unit 132 to generate the correction data CD(1,a), it is necessary to acquire the unique code UC(a) a plurality of times. Thus, Step S51 is repeated to acquire the unique code UC(a) a plurality of times. The generated correction data CD(1,a) is transmitted to the semiconductor device 110 (Step S53). The common key generation unit 113 of the semiconductor device 110 generates the common key CK(1) using the unique code UC(a) output from the unique code generation unit 111 and the correction data CD(1,a) transmitted from the semiconductor device 130 (Step S54).

Further, the semiconductor device ICb (120) transmits the unique code UC(b) to the correction data generation unit 132 of the semiconductor device ICs (130) (Step S55). Next, the correction data generation unit 132 of the semiconductor device 130 generates the correction data CD(1,b) using the transmitted unique code UC(b) and the common key CK(1) (Step S56). For the correction data generation unit 132 to generate the correction data CD(1,b), it is necessary to acquire the unique code UC(b) a plurality of times. Thus, Step S55 is repeated to acquire the unique code UC(b) a plurality of times. The generated correction data CD(1,b) is transmitted to the semiconductor device 120 (Step S57). The common key generation unit 123 of the semiconductor device 120 generates the common key CK(1) using the unique code UC(b) output from the unique code generation unit 121 and the correction data CD(1,b) transmitted from the semiconductor device 130 (Step S58).

By the above process, both of the semiconductor device 110 and the semiconductor device 120 can have the common key CK(1). Thus, the semiconductor device 110 and the semiconductor device 120 can perform cryptographic communication using the common key CK(1) (Step S59). Note that the sequence of the above steps can be changed as appropriate as long as it is consistent. For example, Steps S51 to S54 and Steps S55 to S58 may be performed in parallel.

As described above, in the cryptographic communication system according to this embodiment also, the semiconductor device 130 that collectively manages the correction data is included. Thus, there is no need to store the correction data that is used for generating the common key in the semiconductor devices 110 and 120, which enhances the security of the cryptographic communication system. Because the correction data with a high security level is stored in the database 131 of the semiconductor device 130, it is preferred to configure the semiconductor device 130 using the secure microcomputer. On the other hand, information of the common key CK with a high security level is not stored in a nonvolatile memory in the semiconductor devices 110 and 120, the semiconductor devices 110 and 120 can be configured using general-purpose microcomputers. However, secure microcomputers may be used for the semiconductor devices 110 and 120 in order to further enhance the security level of the cryptographic communication system.

<Sixth Embodiment>

Figure 15:
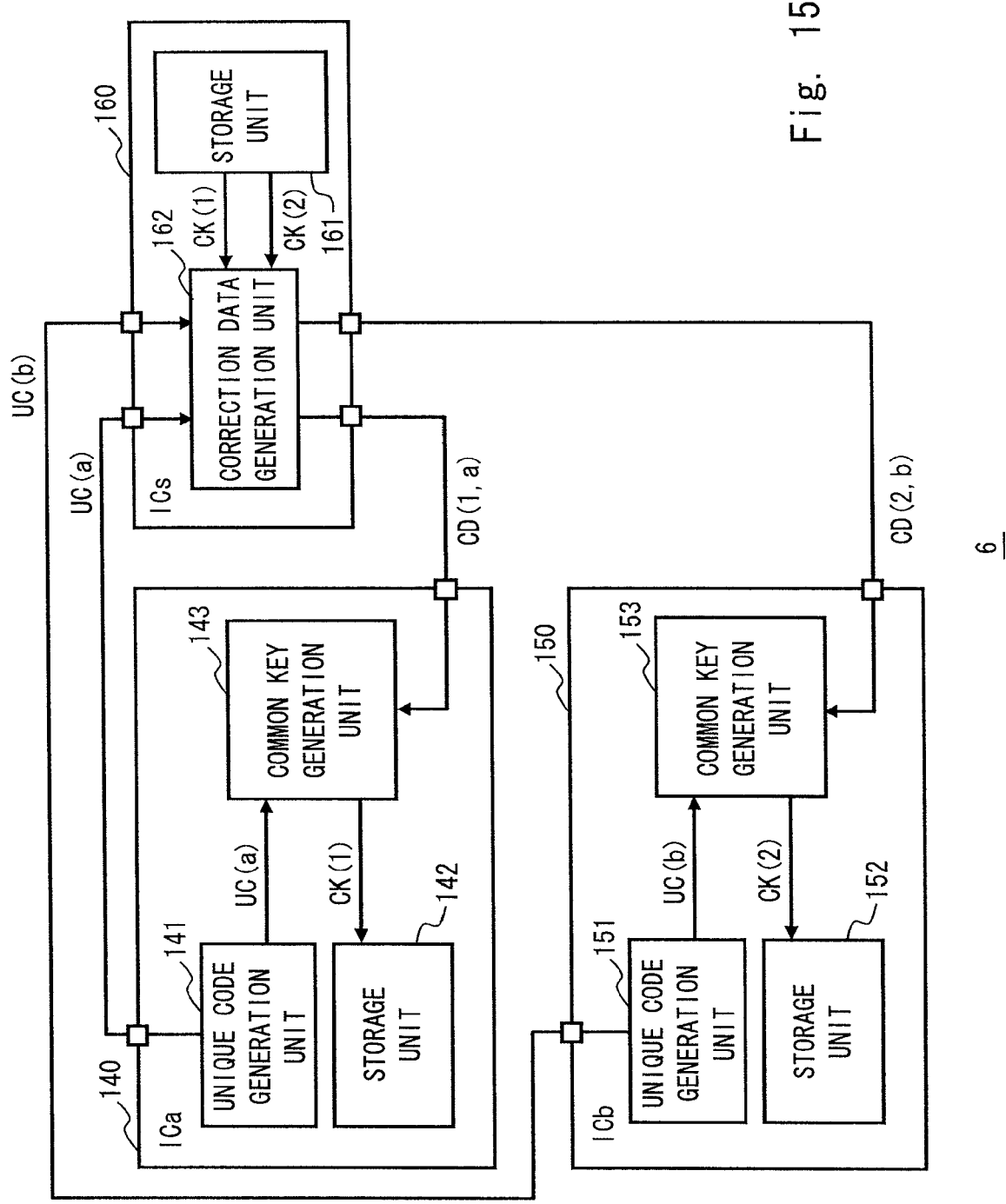
FIG. 15 is a block diagram showing a cryptographic communication system according to a sixth embodiment.

A sixth embodiment of the present invention is described hereinafter. FIG. 15 is a block diagram showing a cryptographic communication system according to this embodiment. In the cryptographic communication system according to the fifth embodiment, the case where the semiconductor device ICa (110) and the semiconductor device ICb (120) have the same common key CK(1) is described. In the cryptographic communication system according to this embodiment, a semiconductor device ICa (140) and a semiconductor device ICb (150) have different common keys and communicate with each other through a semiconductor device ICs (160). The other configuration is basically the same as that of the cryptographic communication system according to the fifth embodiment. This is described in detail hereinbelow.

A cryptographic communication system 6 shown in FIG. 15 includes semiconductor devices 140, 150 and 160. The semiconductor device 140 includes a unique code generation unit 141, a storage unit 142 and a common key generation unit 143.

The unique code generation unit 141 generates a unique code UC(a) that is unique to the semiconductor device 140 and outputs it to the common key generation unit 143 and the correction data generation unit 162 of the semiconductor device 160. The basic configuration and operation of the unique code generation unit 141 are the same as those of the unique code generation unit 11 described in the first embodiment and redundant explanation thereof is omitted.

The storage unit 142 stores a common key (first common key) CK(1) generated in the common key generation unit 143 in a volatile memory. The common key CK(1) is erased when the semiconductor device 140 is powered off.

The common key generation unit 143 generates the common key CK(1) using the unique code UC(a) output from the unique code generation unit 141 and correction data CD(1,a) supplied from the semiconductor device 160. The common key generation unit 143 functions as a unique code correction unit. The basic configuration and operation of the common key generation unit 143 are the same as those of the common key generation unit 13 described in the first embodiment and redundant explanation thereof is omitted.

The semiconductor device 150 includes a unique code generation unit 151, a storage unit 152 and a common key generation unit 153.

The unique code generation unit 151 generates a unique code UC(b) that is unique to the semiconductor device 150 and outputs it to the common key generation unit 153 and the correction data generation unit 162 of the semiconductor device 160. The basic configuration and operation of the unique code generation unit 151 are the same as those of the unique code generation unit 11 described in the first embodiment and redundant explanation thereof is omitted.

The storage unit 152 stores a common key (second common key) CK(2) generated in the common key generation unit 153 in a volatile memory. The common key CK(2) is erased when the semiconductor device 150 is powered off.

The common key generation unit 153 generates the common key CK(2) using the unique code UC(b) output from the unique code generation unit 151 and correction data CD(2,b) supplied from the semiconductor device 160. The common key generation unit 153 functions as a unique code correction unit. The basic configuration and operation of the common key generation unit 153 are the same as those of the common key generation unit 13 described in the first embodiment and redundant explanation thereof is omitted.

The semiconductor device 160 includes a storage unit 161 and a correction data generation unit 162. The storage unit 161 stores the common key CK(1) and the common key CK(2) in a nonvolatile memory. The information of the common key CK(1) and the common key CK(2) are not erased even when the semiconductor device 160 is powered off. Thus, it is preferred to configure the semiconductor device 160 using the secure microcomputer in order to prevent leakage of the information of the common key CK(1) and the common key CK(2) to a third party by unauthorized analysis of the semiconductor device. Note that the semiconductor devices 140 and 150 may be configured using general-purpose microcomputers as in the case of the fifth embodiment.

The correction data generation unit 162 generates the correction data CD(1,a) using the unique code UC(a) of the semiconductor device 140 and the common key CK(1) stored in the storage unit 161. Further, the correction data generation unit 162 generates the correction data CD(2,b) using the unique code UC(b) of the semiconductor device 150 and the common key CK(2) stored in the storage unit 161.

Figure 16:
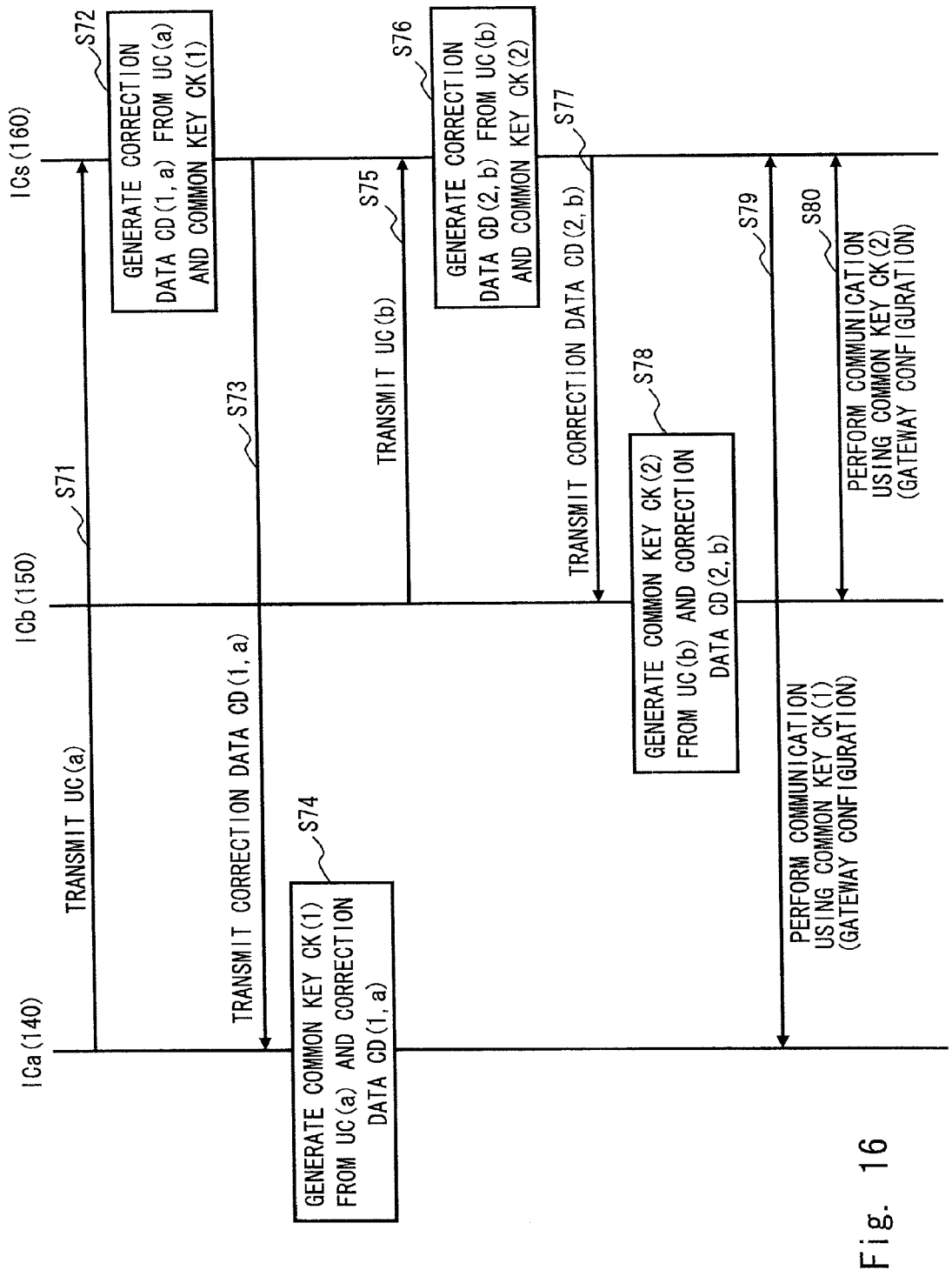
FIG. 16 is a flowchart to explain an operation of the cryptographic communication system according to the sixth embodiment.

An operation of the cryptographic communication system 6 according to this embodiment is described hereinafter with reference to the flowchart of FIG. 16. First, the semiconductor device ICa (140) transmits the unique code UC(a) to the correction data generation unit 162 of the semiconductor device ICs (160) (Step S71). Next, the correction data generation unit 162 of the semiconductor device 160 generates the correction data CD(1,a) using the transmitted unique code UC(a) and the common key CK(1) (Step S72). For the correction data generation unit 162 to generate the correction data CD(1,a), it is necessary to acquire the unique code UC(a) a plurality of times. Thus, Step S71 is repeated to acquire the unique code UC(a) a plurality of times. The generated correction data CD(1,a) is transmitted to the semiconductor device 140 (Step S73). The common key generation unit 143 of the semiconductor device 140 generates the common key CK(1) using the unique code UC(a) output from the unique code generation unit 141 and the correction data CD(1,a) transmitted from the semiconductor device 160 (Step S74).

Further, the semiconductor device ICb (150) transmits the unique code UC(b) to the correction data generation unit 162 of the semiconductor device ICs (160) (Step S75). Next, the correction data generation unit 162 of the semiconductor device 160 generates the correction data CD(2,b) using the transmitted unique code UC(b) and the common key CK(2) (Step S76). For the correction data generation unit 162 to generate the correction data CD(2,b), it is necessary to acquire the unique code UC(b) a plurality of times. Thus, Step S75 is repeated to acquire the unique code UC(b) a plurality of times. The generated correction data CD(2,b) is transmitted to the semiconductor device 150 (Step S77). The common key generation unit 153 of the semiconductor device 150 generates the common key CK(2) using the unique code UC(b) output from the unique code generation unit 151 and the correction data CD(2,b) transmitted from the semiconductor device 160 (Step S78).

By the above process, both of the semiconductor device 140 and the semiconductor device 160 can have the common key CK(1). Thus, the semiconductor device 140 and the semiconductor device 160 can perform cryptographic communication using the common key CK(1) (Step S79). Further, both of the semiconductor device 150 and the semiconductor device 160 can have the common key CK(2). Thus, the semiconductor device 150 and the semiconductor device 160 can perform cryptographic communication using the common key CK(2) (Step S80). Therefore, the semiconductor device 140 and the semiconductor device 150 can communicate through the semiconductor device 160 (gateway configuration). Note that the sequence of the above steps can be changed as appropriate as long as it is consistent. For example, Steps S71 to S74 and Steps S75 to S78 may be performed in parallel.

As described above, in the cryptographic communication system according to this embodiment also, the semiconductor device 160 that collectively manages the correction data is included. Thus, there is no need to store the correction data that is used for generating the common key in the semiconductor devices 140 and 150, which enhances the security of the cryptographic communication system. Because the correction data with a high security level is stored in the database 161 of the semiconductor device 160, it is preferred to configure the semiconductor device 160 using the secure microcomputer. On the other hand, information of the common key CK with a high security level is not stored in a nonvolatile memory in the semiconductor devices 140 and 150, the semiconductor devices 140 and 150 can be configured using general-purpose microcomputers. However, secure microcomputers may be used for the semiconductor devices 140 and 150 in order to further enhance the security level of the cryptographic communication system.

<Seventh Embodiment>

Figure 17:
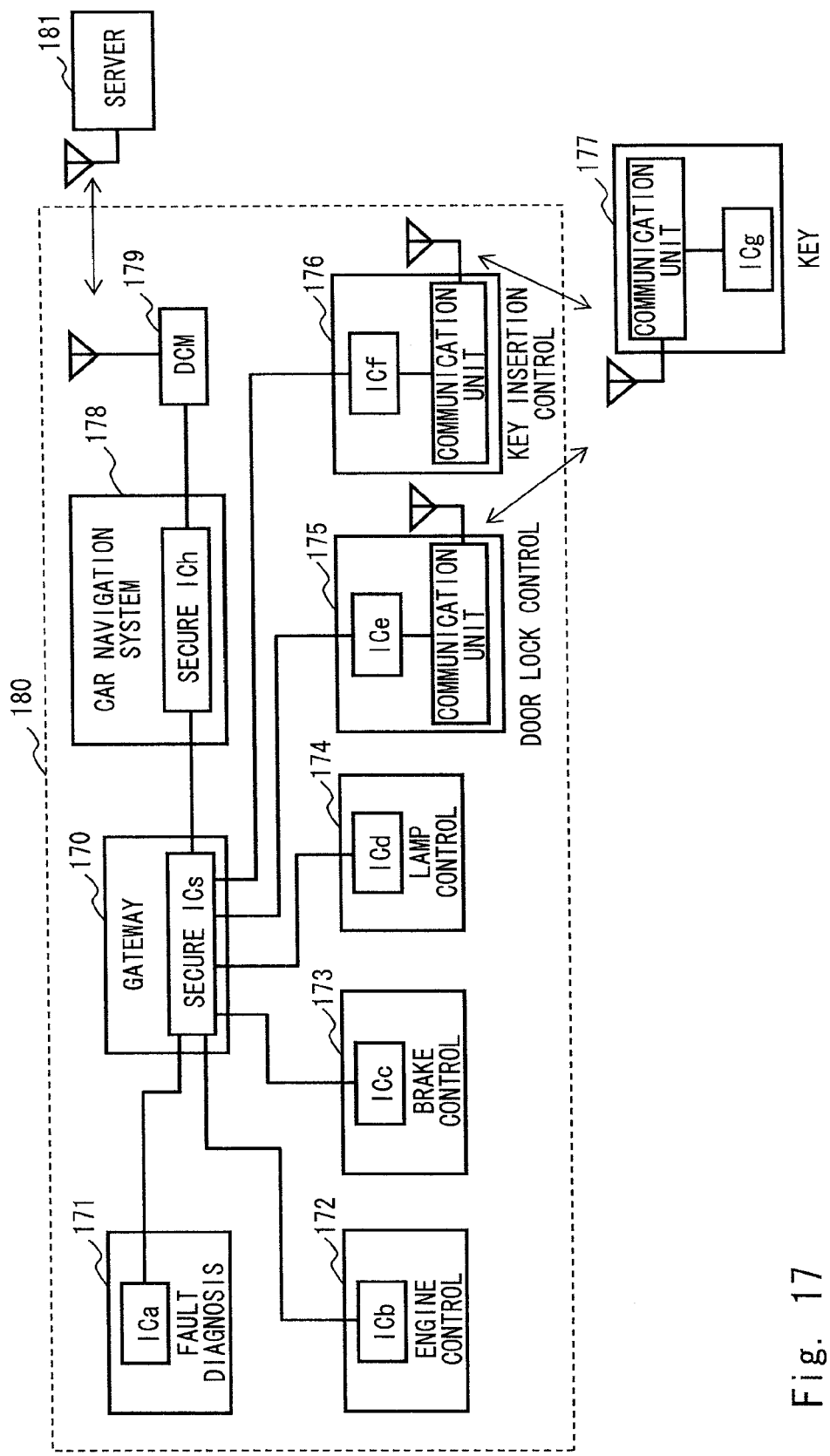
FIG. 17 is a block diagram showing a case where the cryptographic communication system according to the first to sixth embodiment is applied to a vehicle-mounted semiconductor device.

A seventh embodiment of the present invention is described hereinafter. FIG. 17 is a block diagram showing a case where the cryptographic communication system according to the first to sixth embodiment is applied to a vehicle-mounted semiconductor device. As shown in FIG. 17, a vehicle 180 includes a gateway unit 170, a fault diagnostic unit 171, an engine control unit 172, a brake control unit 173, a lamp control unit 174, a door lock control unit 175, a key insertion control unit 176, a car navigation system 178, and a DCM (Data Communication Module) 179.

The gateway unit 170 is equipment for relaying a network composed of the units 171 to 176 and the car navigation system 178. A secure microcomputer ICs is included in the gateway unit 170. The fault diagnostic unit 171 is a unit for making a diagnosis whether the components of the vehicle

180 are at fault. A semiconductor device ICa is included in the fault diagnostic unit 171. The engine control unit 172 is a unit for making electrical control (fuel supply, ignition timing control etc.) of engine operation in a comprehensive manner. A semiconductor device ICb is included in the engine control unit 172. The brake control unit 173 is a unit for controlling a brake such as ABS (Antilock Brake System). A semiconductor device ICc is included in the brake control unit 173. The lamp control unit 174 is a unit for controlling a headlight, winker and the like of the vehicle. A semiconductor device ICd is included in the lamp control unit 174.

The door lock control unit 175 is a unit for controlling door lock. A semiconductor device ICe and a communication unit for radio communication with a key 177 are included in the door lock control unit 175. The key insertion control unit 176 is a unit for determining whether the inserted key 177 is a valid user key or not. A semiconductor device ICf and a communication unit for radio communication with the key 177 are included in the key insertion control unit 176. A semiconductor device ICg and a communication unit for radio communication with the door lock control unit 175 and the key insertion control unit 176 are included in the key 177. General-purpose microcomputers, for example, may be used for the semiconductor devices ICa to ICg that are included in the respective units 171 to 176 and the key 177.

A secure microcomputer ICh is included in the car navigation system 178. The DCM 179 is a communication module for transmitting information acquired from the units 171 to 176 in the vehicle to an external server 181 or acquiring information from the server 181.

The respective units 171 to 176 and the car navigation system 178 are connected to the gateway unit 170, and the units 171 to 176 are configured to be able to communicate with one another through the gateway unit 170. The common key that is used for communication between the respective units 171 to 176 and the gateway unit 170 may differ from unit to unit. For example, the common key CK(1) may be used for communication between the fault diagnostic unit 171 and the gateway unit 170, and the common key CK(2) may be used for communication between the engine control unit 172 and the gateway unit 170. Note that, in this case, the semiconductor device ICa (140) in the cryptographic communication system 6 according to the sixth embodiment shown in FIG. 15 corresponds to the fault diagnostic unit 171, the semiconductor device ICb (150) corresponds to the engine control unit 172, and the semiconductor device ICs (160) corresponds to the gateway unit 170.

The correction data CD that is used to generate the common key to be used for communication between the respective units 171 to 176 and the gateway unit 170 may be stored in the semiconductor device ICs of the gateway unit 170 or the semiconductor device ICh of the car navigation system 178, for example. Further, the correction data CD that is used to generate the common key may be supplied from the server 181. With the correction data CD supplied from the server 181, the common key to be used for communication between the respective units 171 to 176 and the gateway unit 170 can be easily changed. The correction data CD supplied from the server 181 may be stored in the semiconductor device ICs of the gateway unit 170 or the semiconductor device ICh of the car navigation system 178, for example.

Further, the car navigation system 178 may transmit the information (for example, failure information etc.) acquired from the units 171 to 176 to the server 181 through the DCM 179. At this time, communication between the DCM 179 and the server 181 may be encrypted.

In the example of FIG. 17, the configuration in which the units 171 to 176 perform communication through the gateway unit 170 is shown. However, the units 171 to 176 may communicate with one another using the same common key. In this case, the units 171 to 176 are configured to be connected to one another through a common bus, for example. The common key stored in the respective units 171 to 176 may be generated using the method described in the first embodiment (FIG. 1), the fourth embodiment (FIG. 9), and the fifth embodiment (FIG. 12), for example.

<Eighth Embodiment>

Figure 18:
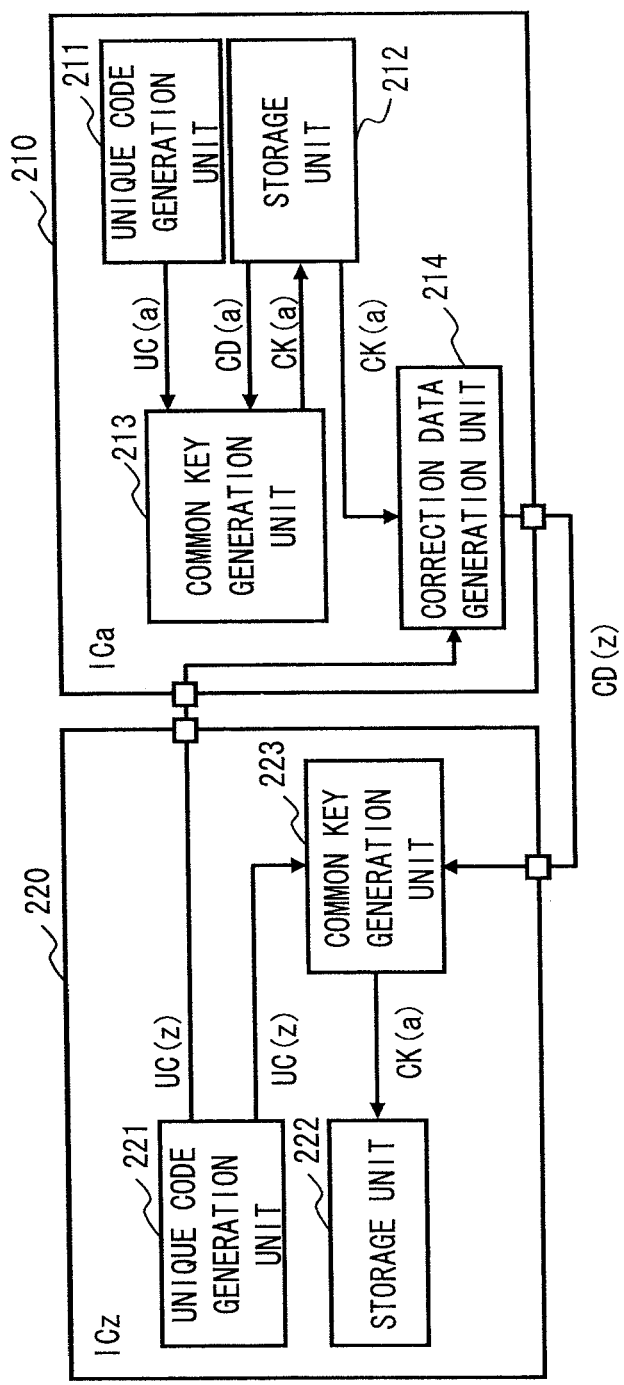
FIG. 18 is a block diagram showing a cryptographic communication system according to an eighth embodiment.

FIG. 18 is a block diagram showing a cryptographic communication system according to an eighth embodiment. A cryptographic communication system 201 according to this embodiment includes a semiconductor device ICa (first semiconductor device) 210 and a semiconductor device ICz (second semiconductor device) 220. The semiconductor device ICa (210) establishes a secure network with another semiconductor device (not shown). In this embodiment, a case where the semiconductor device ICz (220) is added to the secure network including the semiconductor device ICa (210) is described.

The semiconductor device 210 includes a unique code generation unit 211, a storage unit 212, a common key generation unit (first common key generation unit) 213, and a correction data generation unit 214.

The unique code generation unit 211 generates a unique code (first unique code) UC(a) having a value unique to the semiconductor device 210 and containing a random error and outputs it to the common key generation unit 213. The unique code UC(a) is a value determined by physical properties inherent to an element included in the semiconductor device 210. For example, the unique code generation unit 211 may generate the unique code UC(a) using a value at startup of a memory element included in the semiconductor device 210. The unique code is a code generated using the property that actually fabricated ICs vary despite that the design of the ICs is the same. This technique is called PUF (Physical Unclonable Function), and it is a technique that, even when a plurality of ICs having the same circuit are fabricated at a time on one semiconductor wafer by the same fabrication device, generates unique codes for the respective ICs and further makes the ICs unclonable. Use of this technique achieves effective concealment of data without a need for special hardware such as a tamper-resistant chip.

The storage unit 212 can store correction data (first correction data) CD(a), and a common key (first common key) CK(a) generated in the common key generation unit 213. The storage unit 212 includes a volatile memory (for example, SRAM) and a nonvolatile memory (for example, flash memory), for example, and the correction data CD(a) is stored in the nonvolatile memory, and the common key CK(a) is stored in the volatile memory. Thus, although the storage unit 212 temporarily stores the common key CK(a), information of the common key CK(a) is erased when the semiconductor device 210 is powered off. Note that the common key CK(a) may be stored in the nonvolatile memory according to need after taking security measures such as encryption, and measures such as erasing data by writing at power-off of the semiconductor device 210 may be done on the common key CK(a) stored in the nonvolatile memory.

The common key generation unit 213 generates the common key CK(a) using the unique code UC(a) output from the unique code generation unit 211 and the correction data CD(a) stored in the storage unit 212.

The unique code UC(a) generated in the unique code generation unit 211 is data containing bit values that vary depending on external factors during generation of the unique code, such as temperature and voltage, for example. Therefore, the unique code UC(a) generated in the unique code generation unit 211 contains three types of bits: (1) bits with a stable value, (2) bits with high variability (i.e. bits with a relatively large variation in value) and (3) bits with low variability (i.e. bits with a relatively small variation in value). In this manner, the unique code UC(a) generated in the unique code generation unit 211 contains (2) bits with high variability and (3) bits with low variability. Accordingly, the unique code UC(a) has different values each time generated.

The bit with high variability can be found in the fabrication process. Thus, by making each bit decision during the fabrication process, mask data to mask the bit with high variability can be created. By masking the unique code UC(a) generated in the unique code generation unit 211 using the mask data, the bit with high variability contained in the unique code UC(a) can be eliminated. Because the position of the bit with high variability differs from device to device, the mask data is data unique to the semiconductor device.

On the other hand, the bit with low variability varies due to external factors, remaining charges and the like, and it is thus difficult to make estimation. Therefore, for the bit with low variability, an ECC code such as BCH code or Reed-Solomon code, for example, is generated during fabrication, and error correction for eliminating a bit with variability is performed using the ECC code. An operation of the common key generation unit 213 is specifically described hereinafter.

Figure 20:
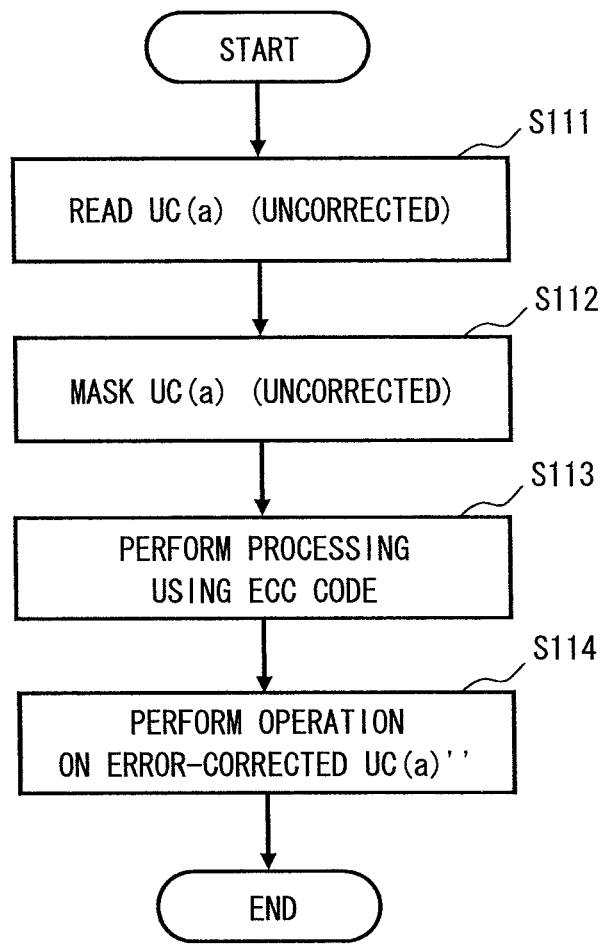
FIG. 20 is a flowchart to explain an operation of a common key generation unit.

FIG. 20 is a flowchart to explain an operation of the common key generation unit 213, and FIG. 21 is a table showing an example of a unique code processed in the common key generation unit 213. First, the common key generation unit 213 reads the unique code UC(a) from the unique code generation unit 211 (Step S111). The unique code UC(a) read in this step is a unique code on which error correction for eliminating a bit with variability is not made.

Next, the common key generation unit 213 masks the read unique code UC(a) using the mask data contained in the correction data CD(a) (Step S112). The mask data is data for masking a bit with a high error rate having a variable bit value among the bits of the unique code UC(a). In the example shown in FIG. 21, because the error rate of the first bit and the sixth bit of the unique code UC(a) is high, the mask data is "0". Because the other bits are bits with a low error rate or bits with a stable value, the mask data is "1". In other words, the mask data for the bit that needs to be masked is "0", and the mask data for the bit that does not need to be masked is "1". By masking the unique code UC(a) using the mask data, masked unique code UC(a)' in which the first bit and the sixth bit of the unique code UC(a) are eliminated can be obtained (the bits eliminated by masking are indicated by "X"). After that, the masked unique code UC(a)' is left-justified.

Then, using the ECC code (error correction code) contained in the correction data CD(a), the common key generation unit 213 corrects the error of the bit with a low degree of variability contained in the masked unique code UC(a)', thereby obtaining a unique code UC(a)" (Step S113). In the example shown in FIG. 21, as a result that the masked unique code UC(a)' is processed using the ECC code, the first bit is corrected from "0" to "1".

Then, the common key generation unit 213 performs a specified operation on the error-corrected unique code UC(a)" using an operation parameter contained in the correction data CD(a) (Step S114). In the example shown in FIG. 21, NOT operation is performed on the error-corrected unique code UC(a)". The unique code UC(a) after this operation is the common key CK(a). Note that the NOT operation is just one example, and any operation may be performed on the error-corrected unique code UC(a)". By changing the operation parameter, it is possible to change the common key CK(a) according to need. Further, by performing a specified operation on the error-corrected unique code UC(a)" using the operation parameter, the common key CK(a) can be generated as a code that is not apparently similar to the unique code UC(a). This further enhances the security level. Furthermore, the operation performed on the error-corrected unique code UC(a)" may be skipped. In this case, the unique code UC(a)" processed using the mask data and the ECC code serves as the common key CK(a). The common key CK(a) generated in this manner is output to the storage unit 212.

As described above, the common key generation unit 213 has the function of generating the common key CK(a) and also has the function of correcting the unique code UC(a) using the correction data CD(a). Thus, the common key generation unit 213 functions also as a unique code correction unit.

Note that the mask code, the ECC code and the operation parameter contained in the correction data CD(a) are generated in advance as unique data of the semiconductor device 210 and stored in the storage unit 212. A method of generating the correction data CD(a) is the same as that of the case where the correction data generation unit 214 generates the correction data CD(z).

Figure 22:
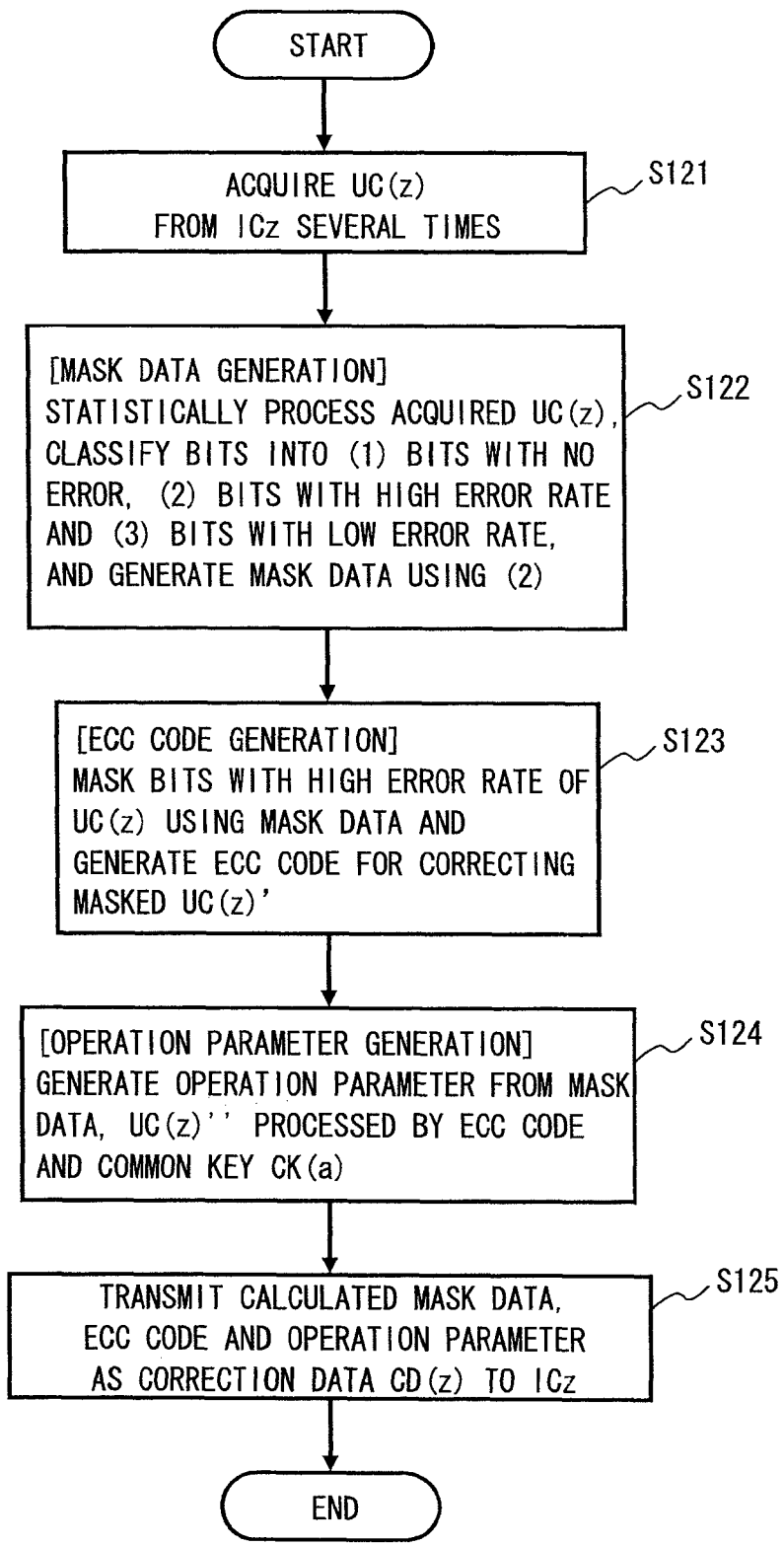
FIG. 22 is a flowchart to explain an operation of a correction data generation unit.

The correction data generation unit 214 generates correction data (second correction data) CD(z) using a unique code (second unique code) UC(z) of the semiconductor device 220 and the common key CK(a). An operation when the correction data generation unit 214 generates the correction data is described hereinafter in detail with reference to FIG. 22.

First, the correction data generation unit 214 acquires the unique code UC(z) a plurality of times from the semiconductor device ICz (220) (Step S121). Next, the correction data generation unit 214 statistically processes the unique code UC(z) acquired in Step S121, and classifies the respective bits of the unique code UC(z) into (1) bits with a stable value, (2) bits with high variability (i.e. bits with a relatively large variation in value) and (3) bits with low variability (i.e. bits with a relatively small variation in value). Then, the correction data generation unit 214 generates mask data using the (2) bits with high variability (Step S122). At this time, information indicating the position of the bit that varies with higher probability than a specified threshold among the bits of the unique code UC(z) is set as the mask data. For example, in the mask data shown in FIG. 21, the position of the bit with high variability (i.e. the position to be masked) is indicated by "0".

Next, the correction data generation unit 214 masks the unique code UC(z) using the mask data generated in Step S122 and eliminates the bit with high variability. It then generates an ECC code for making a correction to remove the bits with variability of the masked unique code UC(a)' (i.e. the unique code containing bits with a stable value and bits with low variability) (Step S123). The ECC code is BCH code or Reed-Solomon code, for example.

Then, the correction data generation unit 214 generates an operation parameter using the unique code UC(a)" processed using the mask data generated in Step S122 and the ECC code generated in Step S123 (which is the unique code containing bits with a stable value) and the common key CK(a) stored in the storage unit 212 (Step S124). The operation parameter is thus a parameter required to generate the common key CK(a) from the corrected unique code UC(z)". Finally, the correction data generation unit 214 transmits the mask data, the ECC code and the operation parameter generated by the above process as the correction data CD(z) to the semiconductor device ICz (220) (Step S125).

Figure 23:
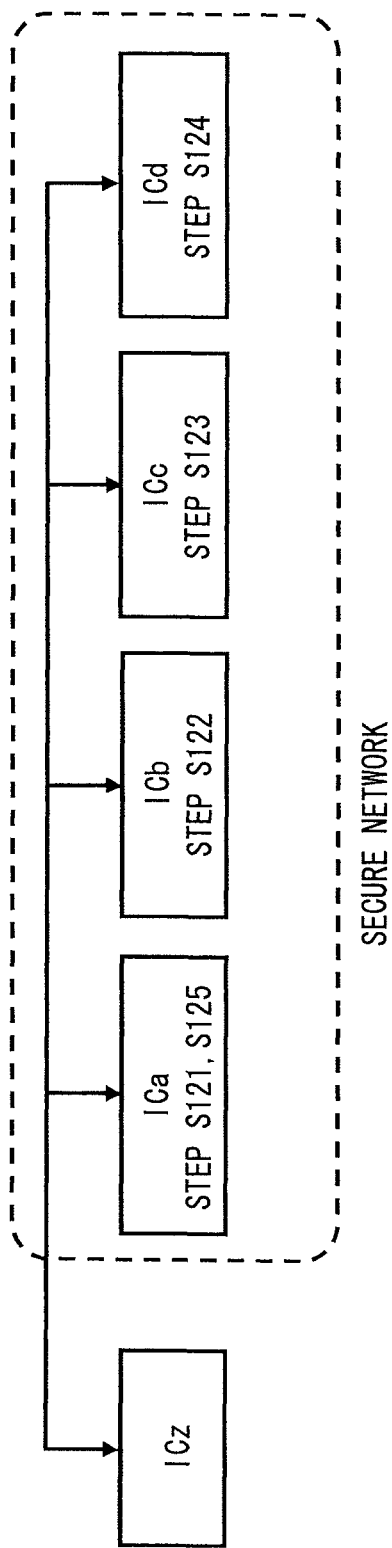
FIG. 23 is a diagram showing a case where correction data is generated using a plurality of semiconductor devices.

Note that the process for generating the correction data CD(z) (Step S121 to S125) may be executed in a distributed manner among a plurality of semiconductor devices. FIG. 23 is a diagram showing a case where the correction data CD(z) is generated using a plurality of semiconductor devices ICa, ICb, ICc and ICd. The semiconductor devices ICa, ICb, ICc and ICd establish a secure network.

In the example shown in FIG. 23, the semiconductor device ICa executes Steps S121 and S125. Thus, the semiconductor device ICa functions as a teller with the semiconductor device ICz. The semiconductor device ICb executes Step S122 (mask data generation). The semiconductor device ICc executes Step S123 (ECC code generation). The semiconductor device ICd executes Step S124 (operation parameter generation). Note that the example shown in FIG. 23 is one example, and the semiconductor devices to execute the respective steps may be assigned arbitrarily. In this manner, by performing the process (Step S121 to S125) for generating the correction data CD(z) in a distributed manner among a plurality of semiconductor devices, it is possible to improve the security level of the cryptographic communication system and avoid the concentration of loads on one semiconductor device.

The semiconductor device 220 shown in FIG. 18 includes a unique code generation unit 221, a storage unit 222, and a common key generation unit (second common key generation unit) 223. The unique code generation unit 221 generates a unique code UC(z) having a value unique to the semiconductor device 220 and containing a random error and outputs it to the correction data generation unit 214 and the common key generation unit 223. Note that the configuration and operation of the unique code generation unit 221 is basically the same as the unique code generation unit 211 described above.

The storage unit 222 can have the common key CK(a) generated in the common key generation unit 223. The storage unit 222 stores the common key CK(a) in a volatile memory. Thus, although the storage unit 222 temporarily stores the common key CK(a), information of the common key CK(a) is erased when the semiconductor device 220 is powered off. Note that the common key CK(a) may be stored in a nonvolatile memory according to need after taking security measures such as encryption, and measures such as erasing data by writing at power-off of the semiconductor device 220 may be done on the common key CK(a) stored in the nonvolatile memory.

The common key generation unit 223 generates the common key (first common key) CK(a) using the unique code UC(z) output from the unique code generation unit 221 and the correction data CD(z) output from the correction data generation unit 214. Note that a method of generating the common key CK(a) in the common key generation unit 223 is basically the same as the method of generating the common key CK(a) in the common key generation unit 213 described above.

Figure 19:
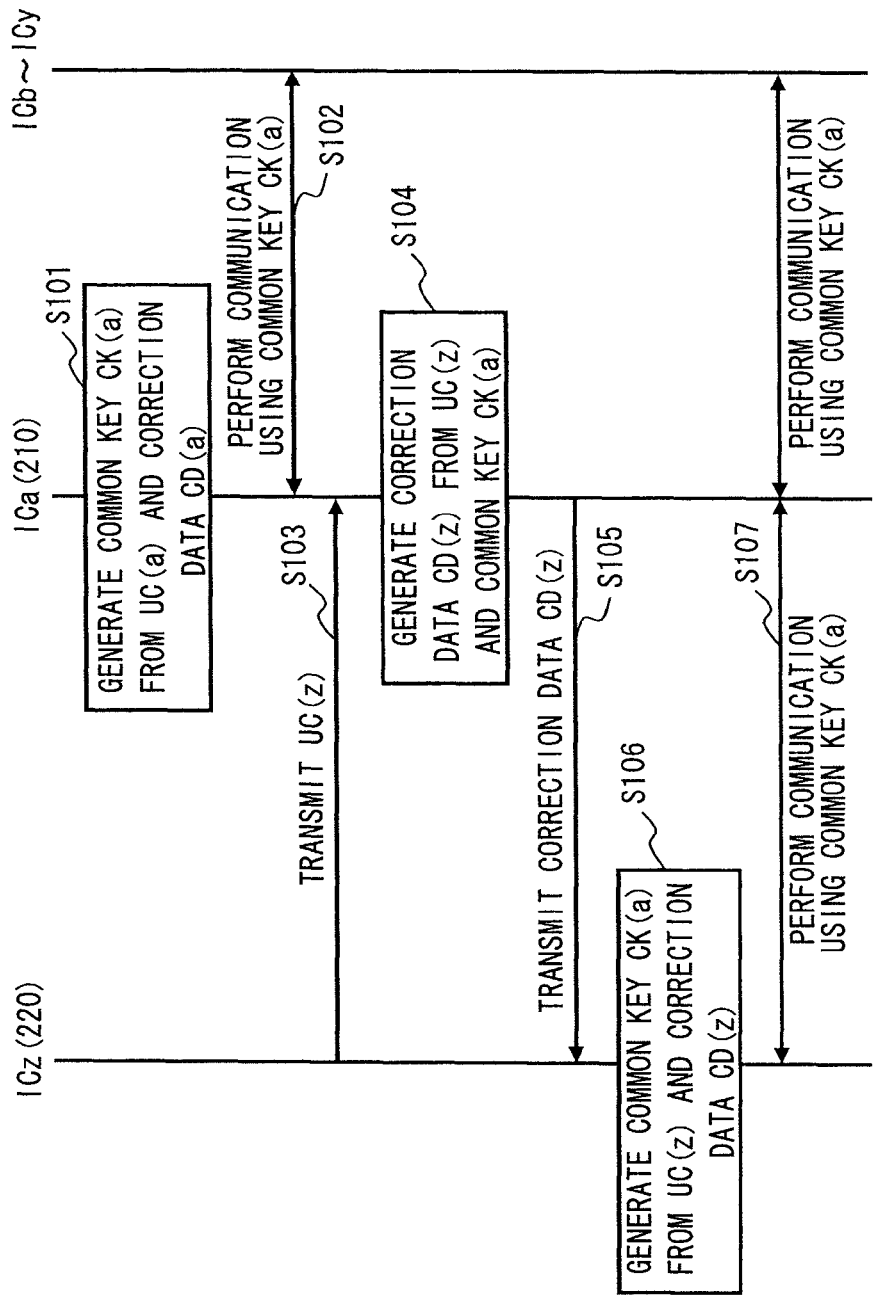
FIG. 19 is a flowchart to explain an operation of the cryptographic communication system according to the eighth embodiment.

An operation of the cryptographic communication system according to this embodiment is described hereinafter with reference to the flowchart of FIG. 19. First, the common key generation unit 213 of the semiconductor device ICa (210) generates the common key CK(a) using the unique code UC(a) output from the unique code generation unit 211 and the correction data CD(a) stored in the storage unit 212 (Step S101). Then, the semiconductor device ICa (210) starts communication with other semiconductor device ICb to ICy (not shown) using the common key CK(a) (Step S102).

The semiconductor device 220 transmits the unique code UC(z) of the semiconductor device 220 to the correction data generation unit 214 of the semiconductor device 210 (Step S103). The correction data generation unit 214 of the semiconductor device 210 generates the correction data CD(z) using the unique code UC(z) of the semiconductor device 220 and the common key CK(a) stored in the storage unit 212 (Step S104). For the correction data generation unit 214 to generate the correction data CD(z), it is necessary to acquire the unique code UC(z) a plurality of times. Thus, Step S103 is repeated to acquire the unique code UC(z) a plurality of times.

The generated correction data CD(z) is transmitted to the common key generation unit 223 of the semiconductor device 220 (Step S105). The common key generation unit 223 of the semiconductor device 220 generates the common key CK(a) using the unique code UC(z) output from the unique code generation unit 221 and the correction data CD(z) output from the correction data generation unit 214 (Step S106). By the above process, the added semiconductor device 220 can have the common key CK(a). Thus, the added semiconductor device (ICz) 220 becomes able to perform cryptographic communication with the semiconductor device (ICa) 210 and the other semiconductor devices ICb to ICy using the common key CK(a) (Step S107). This process is a process of calculating the correction data CD(z) from the transmitted data UC(z) and sending it back as described above. There is a possibility that a malicious attacker repeats this process using a prepared ICz or repeatedly transmits different data UC(z) and thereby analyzes an algorithm of the common key generation unit by CD(z) and the current waveform data during the process. Therefore, it is preferred to impose a limit (for example, about three to five times) to the number of times for the flow shown in FIG. 19.

As described earlier, in the case of adding the semiconductor device ICz to the cryptographic communication system in which secure communication is established, it is necessary to verify whether the semiconductor device ICz to be added is a proper semiconductor device. However, in order to verify whether the semiconductor device ICz to be added is a proper semiconductor device, it is necessary to incorporate an expensive secure server, for example, into the cryptographic communication system. This causes an increase in costs of the cryptographic communication system, On the other hand, in the cryptographic communication system according to this embodiment, the correction data generation unit 214 in the semiconductor device 210 generates the correction data CD(z) for correcting the unique code UC(z) by using the unique code UC(z) having a value unique to the semiconductor device 220 and containing a random error and the common key CK(a), and the common key generation unit 223 in the semiconductor device 220 generates the common key CK(a) using the correction data CD(z) and the unique code UC(z) of the semiconductor device 220. It is thus guaranteed that the semiconductor device ICa (210) and the semiconductor device ICz (220) generate the common key CK(a) based on the same rule, so that the security to add the semiconductor device ICz (220) to the secure network including the semiconductor device ICa (210) is guaranteed.

Therefore, because there is no need to incorporate an expensive secure server into the cryptographic communication system in order to verify whether the semiconductor device ICz to be added is a proper semiconductor device, it is possible to add the semiconductor device easily and at low cost to the cryptographic communication system in which secure communication is performed.

Further, in the cryptographic communication system according to this embodiment, the common key generation unit 213 in the semiconductor device 210 generates the common key CK(a) using the unique code UC(a) having a value unique to the semiconductor device 210 and the correction data CD(a). Further, the common key generation unit 223 in the semiconductor device 220 generates the common key CK(a) using the unique code UC(z) having a value unique to the semiconductor device 220 and the correction data CD(z). Because the common key CK(a), which is important data, is not directly stored in the storage units 212 and 222, leakage of data of the common key CK(a) does not occur even if unauthorized analysis of the semiconductor device is made. Therefore, in the cryptographic communication system according to this embodiment, it is possible to enhance the security and add the semiconductor device easily and at low cost to the cryptographic communication system in which secure communication is performed.

Methods of analyzing a semiconductor device for unauthorized acquisition of data are as follows.

(1) A method that makes modification to the semiconductor device using FIB (Focused Ion Beam) and physically analyzes the semiconductor device using a probe.

(2) Fault tree analysis that makes a CPU run away by applying an electromagnetic wave such as a laser beam to the semiconductor device or inserting noise to a power supply terminal and thereby acquires data in an unauthorized manner.

(3) Leakage analysis that observes the current consumption of the semiconductor device and analyzes key data.

In order to prevent the unauthorized analysis, in the field where a high security level is required, a microcomputer with a high security level (which is referred to hereinafter as a secure microcomputer) is used. The secure microcomputer has a shield to protect a wiring area, a function of detecting light or signal noise, a function of disrupting the current by combining a random number signal with a signal and the like.

In this manner, it is possible to prevent a third party's unauthorized analysis of the semiconductor device by using the secure microcomputer. However, in the case of using the secure microcomputer, although the unauthorized analysis can be prevented, semiconductor device manufacturers cannot carry out failure analysis and breakdown analysis because of its high tamper resistance. Particularly, in a vehicle-mounted microcomputer (ECU etc.) for automobile use, failure analysis and breakdown analysis of a semiconductor device are necessary because high reliability is required. For this reason, a general-purpose microcomputer having a lower security level than the secure microcomputer has been widely used as the vehicle-mounted microcomputer. Thus, a cryptographic communication system that increases the security level of a semiconductor device with use of a general-purpose microcomputer has been required for the vehicle-mounted microcomputer.

In the cryptographic communication system according to this embodiment, because important data such as the common key CK(a) is not directly stored in the storage units 212 and 222, leakage of the important data such as the common key CK(a) does not occur even if unauthorized analysis of the semiconductor device is made. Therefore, even when the semiconductor device 210 and the semiconductor device 220 are configured using general-purpose microcomputers with a relatively low security level, a high security level can be achieved.

Note that the correction data CD(a) that is used to generate the common key CK(a) in the semiconductor device 210 is information with a relatively high security level, though the security level is lower than that of the common key CK(a). Thus, the security microcomputer may be used for the semiconductor device 210 in which the correction data CD(a) is stored in order to prevent leakage of the correction data CD(a) to a third party.

Further, the correction data CD(z) that is transmitted from the semiconductor device 210 to the semiconductor device 220 is information with a relatively high security level because it is related data to the unique code UC(z) and the common key CK(a). Thus, when transmitting the correction data CD(z) from the semiconductor device 210 to the semiconductor device 220, the correction data CD(z) may be encrypted using the public key cryptosystem before transmission. In this case, the semiconductor device 220, for example, has the secret key of the semiconductor device 220, and the semiconductor device 210 encrypts the correction data CD(z) using the public key of the semiconductor device 220 before transmitting the correction data CD(z). Then, the semiconductor device 220 decrypts the encrypted correction data CD(z) using the secret key. The encrypted correction data can be thereby transmitted from the semiconductor device 210 to the semiconductor device 220.

As described above, according to the embodiment of the present invention, it is possible to provide the cryptographic communication system and the cryptographic communication method that can easily add a semiconductor device to the cryptographic communication system in which secure communication is performed.

<Ninth Embodiment>

Figure 24:
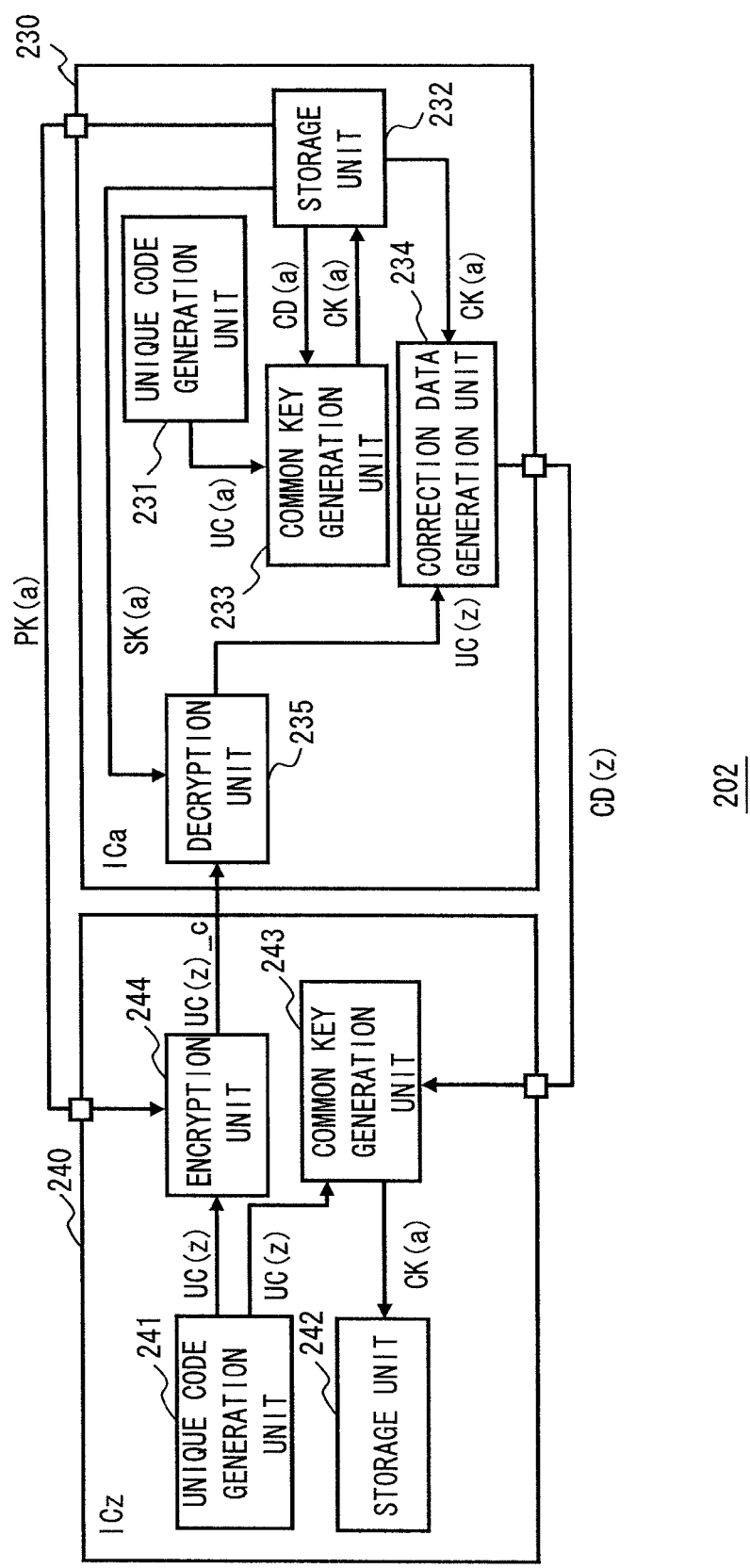
FIG. 24 is a block diagram showing a cryptographic communication system according to a ninth embodiment.

A ninth embodiment of the present invention is described hereinafter. FIG. 24 is a block diagram showing a cryptographic communication system 202 according to this embodiment. A unique code UC(z) that is output from a semiconductor device ICz is information with a relatively low security level because it contains error information for its characteristics. Thus, in the cryptographic communication system according to the eighth embodiment, the unique code UC(z) is not encrypted when transmitting the unique code UC(z) from the semiconductor device ICz to the semiconductor device ICa. However, because the unique code UC(z) is information unique to the semiconductor device ICz, though it contains error information, it is preferred to encrypt the unique code UC(z) before transmission. Thus, in the cryptographic communication system according to this embodiment, the unique code UC(z) is encrypted before transmitting the unique code UC(z) from the semiconductor device ICz to the semiconductor device ICa.

The cryptographic communication system 202 shown in FIG. 24 includes a semiconductor device ICa (230) and a semiconductor device ICz (240). The semiconductor device 230 includes a unique code generation unit 231, a storage unit 232, a common key generation unit 233, a correction data generation unit 234, and a decryption unit 235.

The unique code generation unit 231 generates a unique code UC(a) that is unique to the semiconductor device 230 and outputs it to the common key generation unit 233. The basic configuration and operation of the unique code generation unit 231 are the same as those of the unique code generation unit 211 described in the eighth embodiment and redundant explanation thereof is omitted.

The storage unit 232 can store correction data CD(a), a public key PK(a) and a secret key SK(a) of the semiconductor device 230, and a common key CK(a) generated in the common key generation unit 233. The storage unit 232 includes a volatile memory and a nonvolatile memory, for example, and the correction data CD(a), the public key PK(a) and the secret key SK(a) are stored in the nonvolatile memory, and the common key CK(a) is stored in the volatile memory. Thus, although the storage unit 232 temporarily stores the common key CK(a), information of the common key CK(a) is erased when the semiconductor device 230 is powered off. Note that the common key CK(a) may be stored in the nonvolatile memory according to need after taking security measures such as encryption, and measures such as erasing data by writing at power-off of the semiconductor device 230 may be done on the common key CK(a) stored in the nonvolatile memory.

The common key generation unit 233 generates the common key CK(a) using the unique code UC(a) output from the unique code generation unit 231 and correction data CD(a) stored in the storage unit 232. The common key generation unit 233 functions as a unique code correction unit. The basic configuration and operation of the common key generation unit 233 are the same as those of the common key generation unit 213 described in the eighth embodiment and redundant explanation thereof is omitted.

The correction data generation unit 234 generates correction data (second correction data) CD(z) using a unique code UC(z) of the semiconductor device 240 and the common key CK(a). The basic configuration and operation of the correction data generation unit 234 are the same as those of the correction data generation unit 214 described in the eighth embodiment and redundant explanation thereof is omitted.

The decryption unit 235 decrypts a unique code UC(z)_c encrypted by an encryption unit 244 of the semiconductor device 240 using the secret key SK(a) of the semiconductor device 230 and thereby generates the unique code UC(z).

The semiconductor device 240 includes a unique code generation unit 241, a storage unit 242, a common key generation unit 243, and an encryption unit 244. The unique code generation unit 241 generates a unique code UC(z) that is unique to the semiconductor device 240 and outputs it to the encryption unit 244 and the common key generation unit 243. The basic configuration and operation of the unique code generation unit 241 are the same as those of the unique code generation unit 211 described in the eighth embodiment and redundant explanation thereof is omitted.

The storage unit 242 can have the common key CK(a) generated in the common key generation unit 243. The storage unit 242 stores the common key CK(a) in a volatile memory. Thus, although the storage unit 242 temporarily stores the common key CK(a), information of the common key CK(a) is erased when the semiconductor device 240 is powered off. Note that the common key CK(a) may be stored in the nonvolatile memory according to need after taking security measures such as encryption, and measures such as erasing data by writing at power-off of the semiconductor device 240 may be done on the common key CK(a) stored in the nonvolatile memory.

The common key generation unit 243 generates the common key CK(a) using the unique code UC(z) output from the unique code generation unit 241 and the correction data CD(z) output from the correction data generation unit 234. The common key generation unit 243 functions as a unique code correction unit. The basic configuration and operation of the common key generation unit 243 are the same as those of the common key generation unit 213 described in the eighth embodiment and redundant explanation thereof is omitted.

The encryption unit 244 encrypts the unique code UC(z) generated in the unique code generation unit 241 by using the public key PK(a) of the semiconductor device 230. The public key PK(a) to be used for encryption may be transmitted from the semiconductor device 230 to the semiconductor device 240 in advance and stored in the storage unit 242. Alternatively, the public key PK(a) to be used for encryption may be directly supplied from the semiconductor device 230 to the encryption unit 244 at the time when the encryption unit 244 encrypts the unique code UC(z). The encrypted unique code UC(z)_c is output to the decryption unit 235 of the semiconductor device 230.

Figure 25:
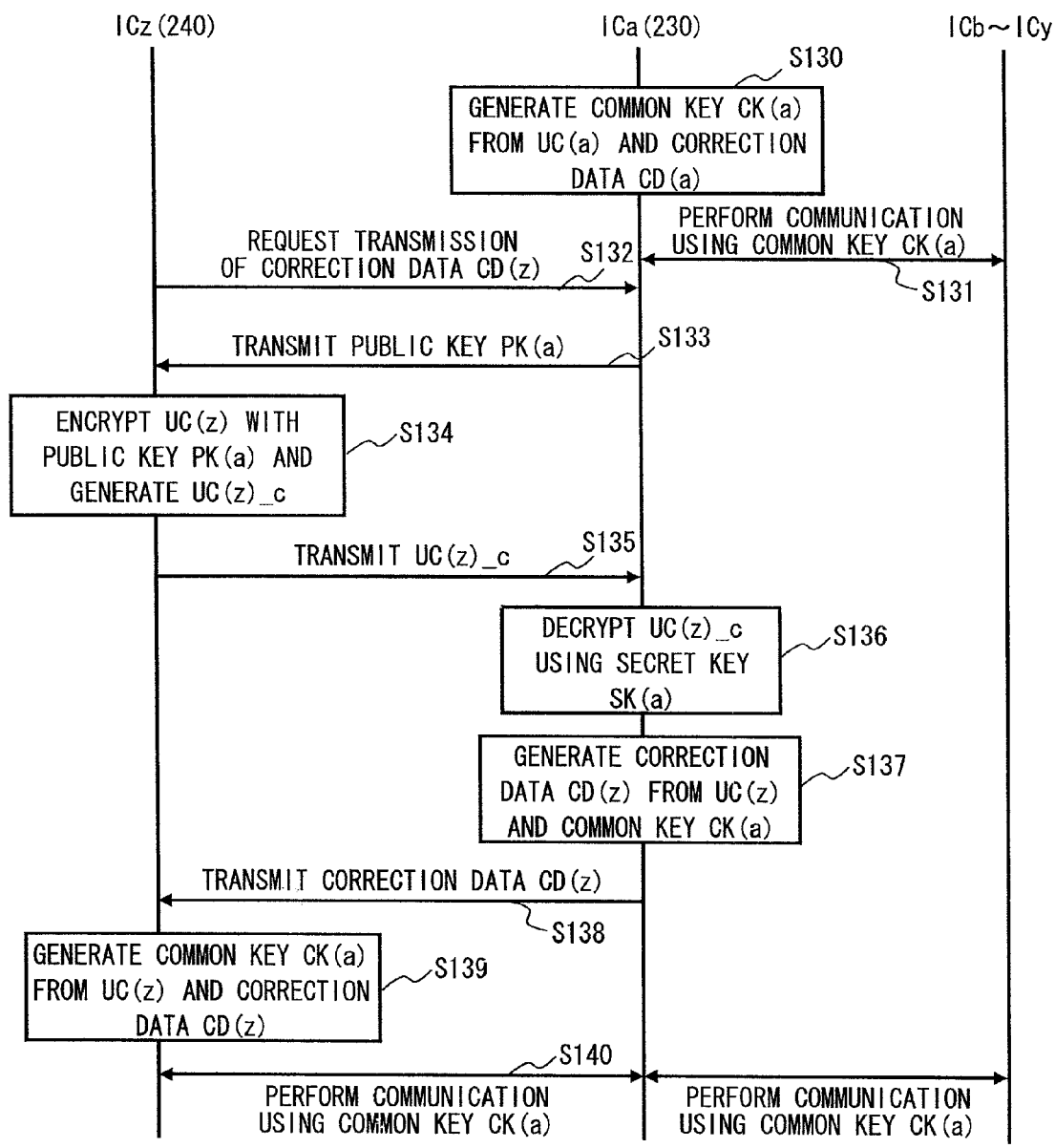
FIG. 25 is a flowchart to explain an operation of the cryptographic communication system according to the ninth embodiment.

An operation of the cryptographic communication system according to this embodiment is described hereinafter with reference to the flowchart of FIG. 25. First, the common key generation unit 233 of the semiconductor device ICa (230) generates the common key CK(a) using the unique code UC(a) output from the unique code generation unit 231 and the correction data CD(a) stored in the storage unit 232 (Step S130). Then, the semiconductor device ICa (230) starts communication with other semiconductor devices ICb to ICy (not shown) using the common key CK(a) (Step S131).

Then, the semiconductor device ICz (240) makes a request for transmission of the correction data CD(z) to the semiconductor device ICa (230) (Step S132). Receiving the request for transmission of the correction data CD(z), the semiconductor device 230 transmits the public key PK(a) of the semiconductor device 230 to the semiconductor device 240 (Step S133). The encryption unit 244 of the semiconductor device 240 encrypts the unique code UC(z) using the public key PK(a) of the semiconductor device 230 (Step S134). Note that the public key PK(a) of the semiconductor device 230 may be prestored in the storage unit 242 of the semiconductor device 240. In this case, Steps S132 and S133 can be skipped.

The semiconductor device 240 transmits the encrypted unique code UC(z)_c to the decryption unit 235 of the semiconductor device 230 (Step S135). The decryption unit 235 of the semiconductor device 230 decrypts the encrypted unique code UC(z)_c by using the secret key SK(a) of the semiconductor device 230 and thereby generates the unique code UC(z) (Step S136).

The correction data generation unit 234 of the semiconductor device 230 generates the correction data CD(z) using the unique code UC(z) of the semiconductor device 240 and the common key CK(a) stored in the storage unit 232 (Step S137). For the correction data generation unit 234 to generate the correction data CD(z), it is necessary to acquire the unique code UC(z) a plurality of times. Thus, Steps S134 to S136 are repeated to acquire the unique code UC(z) a plurality of times.

The generated correction data CD(z) is transmitted to the common key generation unit 243 of the semiconductor device 240 (Step S138). The common key generation unit 243 of the semiconductor device 240 generates the common key CK(a) using the unique code UC(z) output from the unique code generation unit 241 and the correction data CD(z) output from the correction data generation unit 234 (Step S139). By the above process, the added semiconductor device 240 can have the common key CK(a). Thus, the added semiconductor device (ICz) 240 becomes able to perform cryptographic communication with the semiconductor device (ICa) 230 and the other semiconductor devices ICb to ICy using the common key CK(a) (Step S140).

As described above, in the cryptographic communication system according to this embodiment, the correction data generation unit 234 of the semiconductor device 230 generates the correction data CD(z) using the unique code UC(z) unique to the semiconductor device 240 and the common key CK(a), and the common key generation unit 243 of the semiconductor device 240 generates the common key CK(a) using the correction data CD(z) and the unique code UC(z) of the semiconductor device 240. There is thus no need to incorporate an expensive secure server into the cryptographic communication system in order to verify whether the semiconductor device ICz to be added is a proper semiconductor device, and it is possible to add the semiconductor device easily and at low cost to the cryptographic communication system in which secure communication is performed.

Further, in the cryptographic communication system according to this embodiment, because important data such as the common key CK(a) is not directly stored in the storage units 232 and 242, leakage of the important data such as the common key CK(a) does not occur even if unauthorized analysis of the semiconductor device is made. Therefore, even when the semiconductor device 230 and the semiconductor device 240 are configured using general-purpose microcomputers with a relatively low security level, a high security level can be achieved.

Note that the correction data CD(a) used to generate the common key CK(a) in the semiconductor device 230 and the secret key SK(a) of the semiconductor device 230 are information with a relatively high security level, though the security level is lower than that of the common key CK(a). Thus, the security microcomputer may be used for the semiconductor device 230 in which the correction data CD(a) and the secret key SK(a) are stored in order to prevent leakage of the correction data CD(a) and the secret key SK(a) to a third party.

Further, the correction data CD(z) that is transmitted from the semiconductor device 230 to the semiconductor device 240 is information with a relatively high security level because it is related data to the unique code UC(z) and the common key CK(a). Thus, when transmitting the correction data CD(z) from the semiconductor device 230 to the semiconductor device 240, the correction data CD(z) may be encrypted before transmission using the public key cryptosystem.

As described above, according to the embodiment of the present invention, it is possible to provide the cryptographic communication system and the cryptographic communication method that can easily add a semiconductor device to the cryptographic communication system in which secure communication is performed. Particularly, in the cryptographic communication system according to this embodiment, the unique code UC(z) of the semiconductor device 240 is encrypted and transmitted to the semiconductor device 230, which further enhances the security of the cryptographic communication system.

<Tenth Embodiment>

Figure 26:
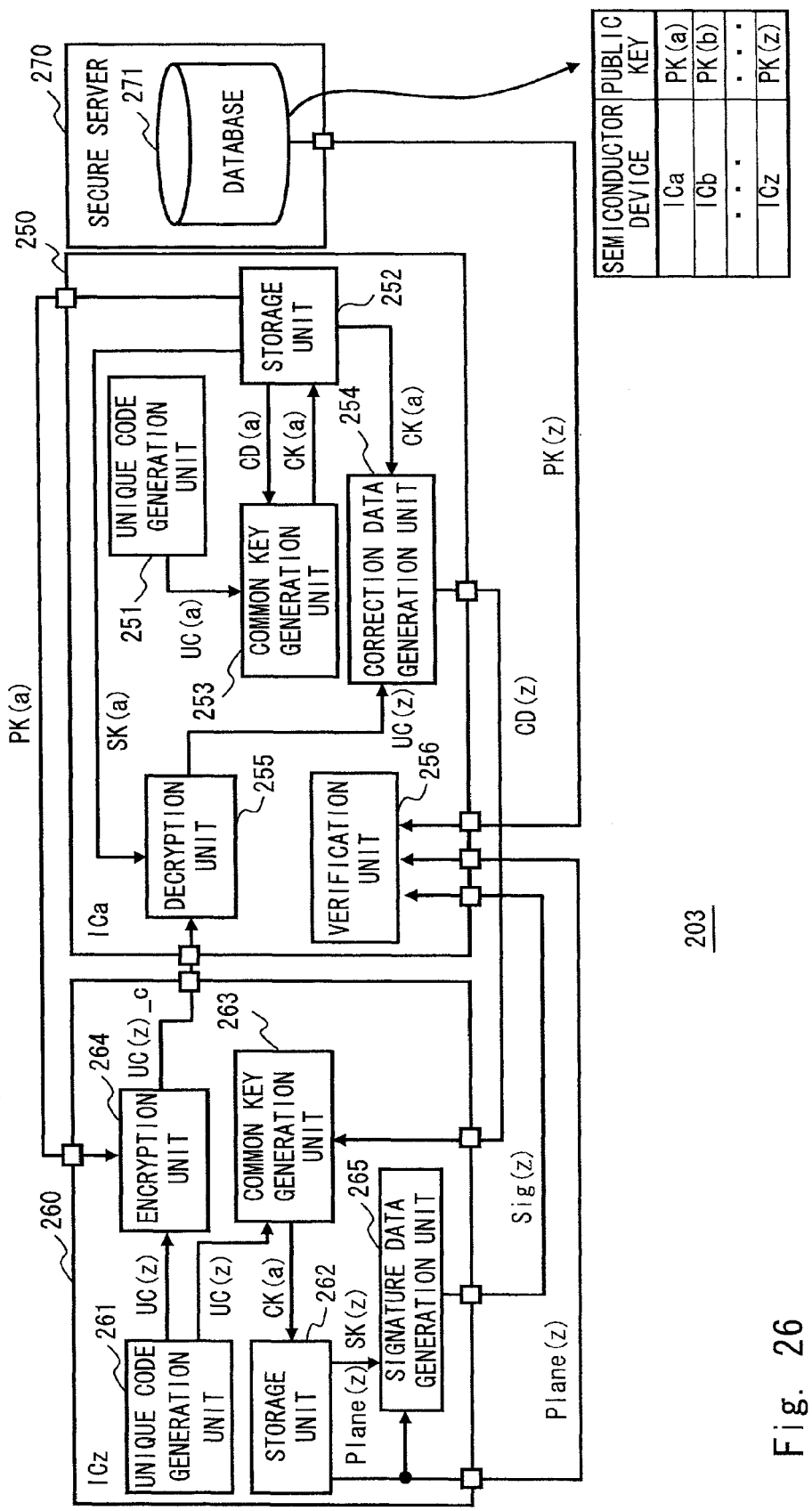
FIG. 26 is a block diagram showing a cryptographic communication system according to a tenth embodiment.

A tenth embodiment of the present invention is described hereinafter. FIG. 26 is a block diagram showing a cryptographic communication system 203 according to this embodiment. In this embodiment, the cryptographic communication system is applied to a digital signature system. The cryptographic communication system 203 according to this embodiment includes a semiconductor device ICa (250), a semiconductor device ICz (260), and a secure server 270.

The semiconductor device 250 includes a unique code generation unit 251, a storage unit 252, a common key generation unit 253, a correction data generation unit 254, a decryption unit 255, and a verification unit 256.

The unique code generation unit 251 generates a unique code UC(a) that is unique to the semiconductor device 250 and outputs it to the common key generation unit 253. The basic configuration and operation of the unique code generation unit 251 are the same as those of the unique code generation unit 211 described in the eighth embodiment and redundant explanation thereof is omitted.

The storage unit 252 can store correction data CD(a), a public key PK(a) and a secret key SK(a) of the semiconductor device 250, and a common key CK(a) generated in the common key generation unit 253. The storage unit 235 includes a volatile memory and a nonvolatile memory, for example, and the correction data CD(a), the public key PK(a) and the secret key SK(a) are stored in the nonvolatile memory, and the common key CK(a) is stored in the volatile memory. Thus, although the storage unit 252 temporarily stores the common key CK(a), information of the common key CK(a) is erased when the semiconductor device 250 is powered off.

The common key generation unit 253 generates the common key CK(a) using the unique code UC(a) output from the unique code generation unit 251 and correction data CD(a) stored in the storage unit 252. The common key generation unit 253 functions as a unique code correction unit. The basic configuration and operation of the common key generation unit 253 are the same as those of the common key generation unit 213 described in the eighth embodiment and redundant explanation thereof is omitted.

The correction data generation unit 254 generates correction data CD(z) using a unique code UC(z) of the semiconductor device 260 and the common key CK(a). The basic configuration and operation of the correction data generation unit 254 are the same as those of the correction data generation unit 214 described in the eighth embodiment and redundant explanation thereof is omitted.

The decryption unit 255 decrypts the unique code UC(z)_c encrypted by an encryption unit 264 of the semiconductor device 260 using the secret key SK(a) of the semiconductor device 250 and thereby generates the unique code UC(z).

The verification unit 256 executes a verification algorithm in the digital signature scheme. Specifically, the verification unit 256 generates verification data using signature data Sig(a) and a public key PK(z) of the semiconductor device 260 and compares the verification data with plain text Plane(a).

The semiconductor device 260 includes a unique code generation unit 261, a storage unit 262, a common key generation unit 263, an encryption unit 264, and a signature data generation unit 265. The unique code generation unit 261 generates a unique code UC(z) that is unique to the semiconductor device 260 and outputs it to the encryption unit 264 and the common key generation unit 263. The basic configuration and operation of the unique code generation unit 261 are the same as those of the unique code generation unit 211 described in the eighth embodiment and redundant explanation thereof is omitted.

The storage unit 262 can store a common key CK(a) generated in the common key generation unit 263, a secret key SK(z) of the semiconductor device 260, and a plain text Plane(z). The storage unit 262 includes a volatile memory and a nonvolatile memory, for example, and the secret key SK(z) of the semiconductor device 260 and the plain text Plane(z) are stored in the nonvolatile memory, and the common key CK(a) is stored in the volatile memory. Thus, although the storage unit 262 temporarily stores the common key CK(a), information of the common key CK(a) is erased when the semiconductor device 260 is powered off. Note that the common key CK(a) may be stored in the nonvolatile memory according to need after taking security measures such as encryption, and measures such as erasing data by writing at power-off of the semiconductor device 260 may be done on the common key CK(a) stored in the nonvolatile memory.

The common key generation unit 263 generates the common key CK(a) using the unique code UC(z) output from the unique code generation unit 261 and the correction data CD(z) output from the correction data generation unit 254. The common key generation unit 263 functions as a unique code correction unit. The basic configuration and operation of the common key generation unit 263 are the same as those of the common key generation unit 213 described in the eighth embodiment and redundant explanation thereof is omitted.

The encryption unit 264 encrypts the unique code UC(z) generated in the unique code generation unit 261 by using the public key PK(a) of the semiconductor device 260. The public key PK(a) to be used for encryption may be transmitted from the semiconductor device 250 to the semiconductor device 260 in advance and stored in the storage unit 262. Alternatively, the public key PK(a) to be used for encryption may be directly supplied from the semiconductor device 250 to the encryption unit 264 at the time when the encryption unit 264 encrypts the unique code UC(z). Further alternatively, the public key PK(a) may be supplied from the secure server 270. The encrypted unique code UC(z)_c is output to the decryption unit 255 of the semiconductor device 250.

The signature data generation unit 265 generates signature data Sig(z) using the secret key SK(z) of the semiconductor device 260 and the plain text Plane(z). In other words, the signature data generation unit 265 executes a signature generation algorithm in the digital signature scheme.

The secure server 270 includes a database 271 that stores public keys PK(a), PK(b), . . . , PK(z) of semiconductor devices ICa, ICb, ICz in association with the semiconductor devices ICa, ICb, ICz. In this embodiment, because the public key information stored in the database 271 is information with a high security level, it is preferred to use a security microcomputer for the secure server 270. The public key information stored in the secure server 270 is transmitted to each semiconductor device in response to a request.

Figure 27:
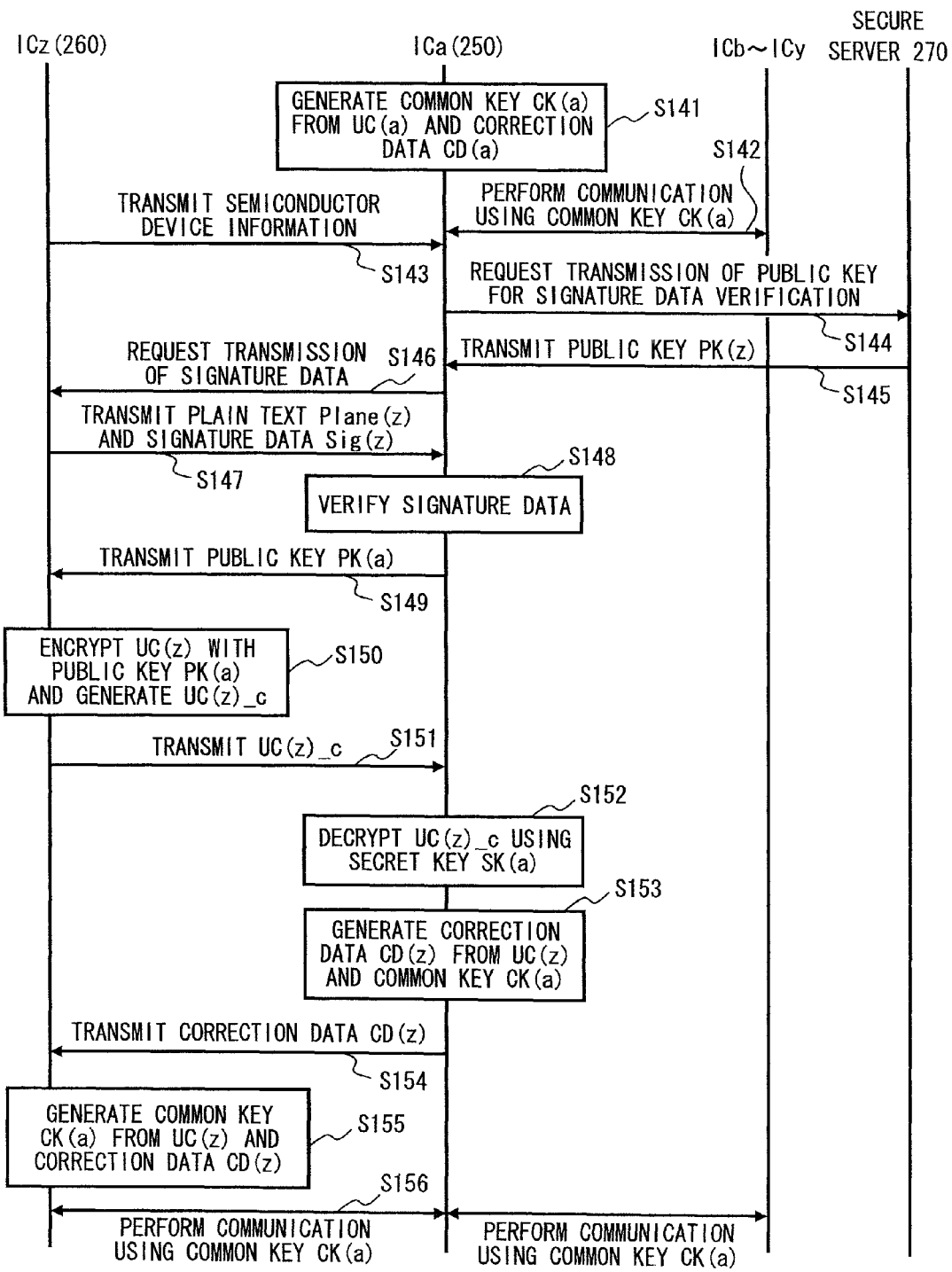
FIG. 27 is a flowchart to explain an operation of the cryptographic communication system according to the tenth embodiment.

An operation of the cryptographic communication system according to this embodiment is described hereinafter with reference to the flowchart of FIG. 27. First, the common key generation unit 253 of the semiconductor device ICa (250) generates the common key CK(a) using the unique code UC(a) output from the unique code generation unit 251 and the correction data CD(a) stored in the storage unit 252 (Step S141). Then, the semiconductor device ICa (250) starts communication with other semiconductor devices ICb to ICy (not shown) using the common key CK(a) (Step S142).

Next, the semiconductor device ICz (260) transmits semiconductor device information (for example, a unique ID etc.) of the semiconductor device ICz (260) to the semiconductor device ICa (250) (Step S143). Receiving the semiconductor device information of the semiconductor device 260, the semiconductor device 250 makes a request for transmission of a public key of the semiconductor device 260 to the secure server 270 (Step S144). The public key of the semiconductor device 260 is used when the verification unit 256 of the semiconductor device 250 verifies signature data. The secure server 270 transmits the public key PK(z) of the semiconductor device 260 to the verification unit 256 of the semiconductor device 250 (Step S145).

Then, the semiconductor device 250 makes a request for transmission of signature data to the semiconductor device 260 (Step S146). Receiving the request for transmission of signature data, the semiconductor device 260 generates signature data Sig(z) using the secret key SK(z) and the plain text Plane(z) in the signature data generation unit 265. The plain text Plane(z) and the generated signature data Sig(z) are transmitted to the verification unit 256 of the semiconductor device 250 (Step S147).

The verification unit 256 of the semiconductor device 250 executes a verification algorithm in the digital signature scheme (Step S148). Specifically, the verification unit 256 generates verification data using the public key PK(z) of the semiconductor device 260 supplied from the secure server 270 and the signature data Sig(z), and compares the verification data with the plain text Plane(z). The signature data Sig(z) is data generated by encrypting the plain text Plane(z) using the secret key SK(z) of the semiconductor device 260. Thus, the verification data obtained by decrypting the signature data Sig(z) using the public key PK(z) of the semiconductor device 260 is data corresponding to the plain text Plane(z) transmitted from the semiconductor device 260. Therefore, the verification unit 256 compares the verification data with the plain text Plane(z) and, when the verification data and the plain text Plane(z) match, it can be determined that the semiconductor device 260 has the secret key SK(z).

Thus, when the verification data and the plain text Plane(z) match (when the verification algorithm accepts the signature data Sig(z)), the verification unit 256 determines that the signature data Sig(z) created by the semiconductor device 260 is valid. Thus, it is determined that the semiconductor device 260 has the secret key SK(z). On the other hand, when the verification data and the plain text Plane(z) do not match (when the verification algorithm rejects the signature data Sig(z)), the verification unit 256 determines that the signature data Sig(z) created by the semiconductor device 260 is invalid.

When the semiconductor device 260 is determined as a proper semiconductor device, the semiconductor device 250 transmits the public key PK(a) of the semiconductor device 250 to the semiconductor device 260 (Step S149). The encryption unit 264 of the semiconductor device 260 encrypts the unique code UC(z) by using the public key PK(a) of the semiconductor device 250 (Step S150). Note that the public key PK(a) of the semiconductor device 250 may be transmitted from the secure server 270 to the semiconductor device 260 by an instruction from the semiconductor device 250.

The semiconductor device 260 transmits the encrypted unique code UC(z)_c to the decryption unit 255 of the semiconductor device 250 (Step S151). The decryption unit 255 of the semiconductor device 250 decrypts the encrypted unique code UC(z)_c by using the secret key SK(a) of the semiconductor device 250 and thereby generates the unique code UC(z) (Step S152).

The correction data generation unit 254 of the semiconductor device 250 generates the correction data CD(z) using the unique code UC(z) of the semiconductor device 260 and the common key CK(a) (Step S153). For the correction data generation unit 254 to generate the correction data CD(z), it is necessary to acquire the unique code UC(z) a plurality of times. Thus, Steps S150 to S152 are repeated to acquire the unique code UC(z) a plurality of times.

The generated correction data CD(z) is transmitted to the common key generation unit 263 of the semiconductor device 260 (Step S154). The common key generation unit 263 of the semiconductor device 260 generates the common key CK(a) using the unique code UC(z) output from the unique code generation unit 261 and the correction data CD(z) output from the correction data generation unit 254 (Step S155). By the above process, the added semiconductor device 260 can be verified using the digital signature scheme. Then, when the added semiconductor device 260 is a proper semiconductor device, the semiconductor device 260 can have the common key CK(a). Thus, the added semiconductor device (ICz) 260 becomes able to perform cryptographic communication with the semiconductor device (ICa) 240 and the other semiconductor devices ICb to ICy using the common key CK(a) (Step S156).

As described above, in the cryptographic communication system according to this embodiment, the correction data generation unit 254 of the semiconductor device 250 generates the correction data CD(z) using the unique code UC(z) unique to the semiconductor device 260 and the common key CK(a), and the common key generation unit 263 of the semiconductor device 260 generates the common key CK(a) using the correction data CD(z) and the unique code UC(z) of the semiconductor device 260. There is thus no need to incorporate an expensive secure server into the cryptographic communication system in order to verify whether the semiconductor device ICz to be added is a proper semiconductor device, and it is possible to add the semiconductor device easily and at low cost to the cryptographic communication system in which secure communication is performed.

Further, in the cryptographic communication system according to this embodiment, because important data such as the common key CK(a) is not directly stored in the storage units 252 and 262, leakage of the important data such as the common key CK(a) does not occur even if unauthorized analysis of the semiconductor device is made. Therefore, even when the semiconductor device 250 and the semiconductor device 260 are configured using general-purpose microcomputers with a relatively low security level, a high security level can be achieved.

On the other hand, in this embodiment, the public key information stored in the database 271 of the secure server 270 is information with a high security level. It is thus preferred to use a security microcomputer for the secure server 270.

Note that the correction data CD(a) used to generate the common key CK(a) and the secret key SK(z) of the semiconductor device 260 are information with a relatively high security level, though the security level is lower than that of the common key CK(a). Thus, the security microcomputer may be used for the semiconductor devices 250 and 260 in which the correction data CD(a) and the secret key SK(z) are stored in order to prevent leakage of the correction data CD(a) and the secret key SK(z) to a third party.

Further, the correction data CD(z) that is transmitted from the semiconductor device 250 to the semiconductor device 260 is information with a relatively high security level because it is related data to the unique code UC(z) and the common key CK(a). Thus, when transmitting the correction data CD(z) from the semiconductor device 250 to the semiconductor device 260, the correction data CD(z) may be encrypted before transmission using the public key cryptosystem.

Further, in this embodiment, the encryption unit 264 is included in the semiconductor device 260 and the decryption unit 255 is included in the semiconductor device 250 in order to transmit the unique code UC(z) after encryption. However, in this embodiment, the encryption unit 264 and the decryption unit 255 may be omitted and the unique code UC(z) may be transmitted without encryption as in the eighth embodiment.

As described above, according to the embodiment of the present invention, it is possible to provide the cryptographic communication system and the cryptographic communication method that can easily add a semiconductor device to the cryptographic communication system in which secure communication is performed.

Particularly, in the cryptographic communication system according to this embodiment, the public key information is collectively managed using the secure server 270. The public key information is information that is used when verifying a semiconductor device to be added using the digital signature scheme, and it is information with a high security level. By collectively managing the information with a high security level using the secure server 270, the need to store the information with a high security level in the semiconductor devices 250 and 260 can be eliminated, so that the semiconductor devices 250 and 260 can be configured using general-purpose microcomputers. It is thus possible to reduce the cost to construct the cryptographic communication system.

<Eleventh Embodiment>

Figure 28:
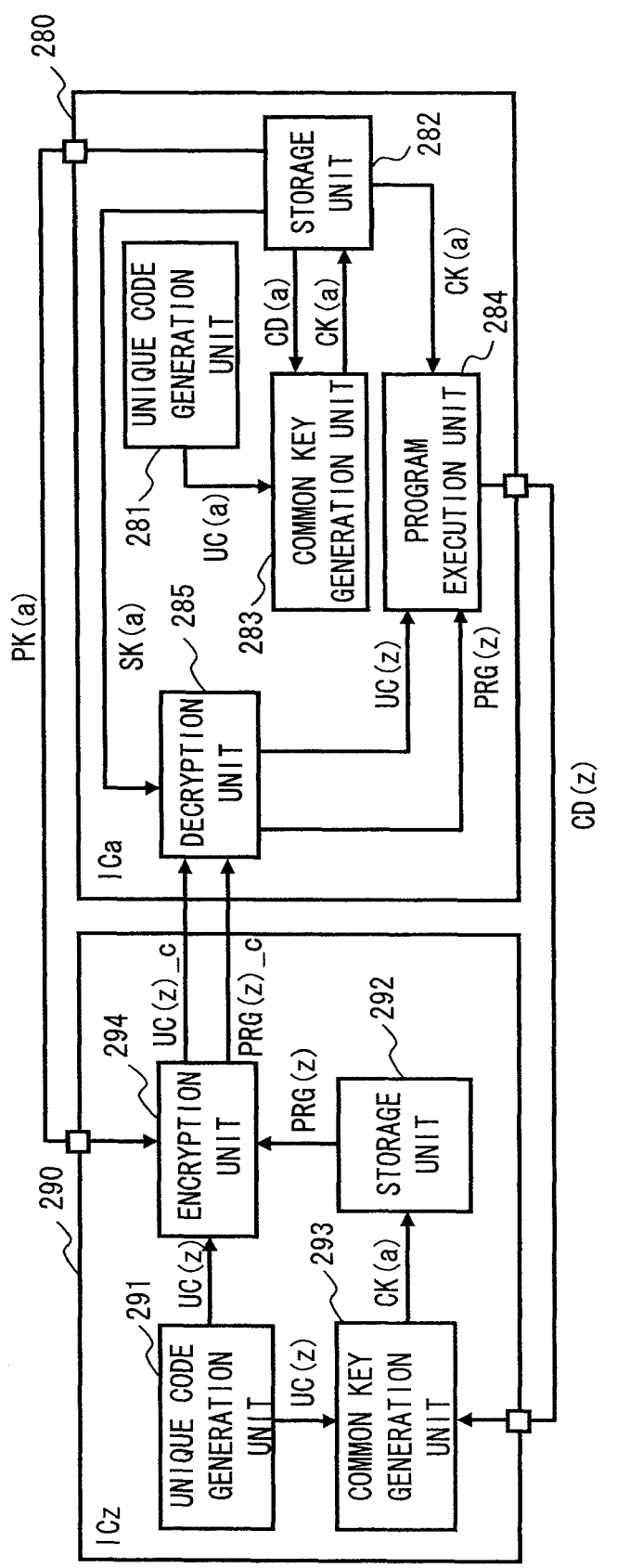
FIG. 28 is a block diagram showing a cryptographic communication system according to an eleventh embodiment.

An eleventh embodiment of the present invention is described hereinafter. FIG. 28 is a block diagram showing a cryptographic communication system 204 according to this embodiment. In the cryptographic communication system 204 according to this embodiment, a correction data generation program PRG(z) is transmitted from a semiconductor device ICz (290), which is a device to be added, to a semiconductor device ICa (280) rather than including a correction data generation unit for generating correction data CD(z). The correction data generation program PRG(z) is then executed in the semiconductor device ICa (280) to thereby generate the correction data CD(z).

The cryptographic communication system 204 shown in FIG. 28 includes a semiconductor device ICa (280) and a semiconductor device ICz (290). The semiconductor device 280 includes a unique code generation unit 281, a storage unit 282, a common key generation unit 283, a program execution unit 284, and a decryption unit 285.

The unique code generation unit 281 generates a unique code UC(a) that is unique to the semiconductor device 280 and outputs it to the common key generation unit 283. The basic configuration and operation of the unique code generation unit 281 are the same as those of the unique code generation unit 211 described in the eighth embodiment and redundant explanation thereof is omitted.

The storage unit 282 can store correction data CD(a), a public key PK(a) and a secret key SK(a) of the semiconductor device 280, and a common key CK(a) generated in the common key generation unit 283. The storage unit 282 includes a volatile memory and a nonvolatile memory, for example, and the correction data CD(a), the public key PK(a) and the secret key SK(a) are stored in the nonvolatile memory, and the common key CK(a) is stored in the volatile memory. Thus, although the storage unit 282 temporarily stores the common key CK(a), information of the common key CK(a) is erased when the semiconductor device 280 is powered off.

The common key generation unit 283 generates the common key CK(a) using the unique code UC(a) output from the unique code generation unit 281 and correction data CD(a) stored in the storage unit 282. The common key generation unit 283 functions as a unique code correction unit. The basic configuration and operation of the common key generation unit 283 are the same as those of the common key generation unit 213 described in the eighth embodiment and redundant explanation thereof is omitted.

The program execution unit 284 executes the correction data generation program PRG(z) transmitted from the semiconductor device 290. By executing the correction data generation program PRG(z), the correction data CD(z) can be generated using the unique code UC(z) of the semiconductor device 290 and the common key CK(a). The program execution unit 284 is typically a processor such as a CPU. The correction data generation program PRG(z) may be a program that can run only on the semiconductor device 280, for example. Alternatively, the correction data generation program PRG(z) may be a program such as JAVA (registered trademark) that does not depend on the architecture of a semiconductor device on which it runs. Some semiconductor devices constituting the cryptographic communication system have different CPU core architectures. Thus, by using a program such as JAVA that is not dependent on the architecture of a semiconductor device on which it runs, it is possible to improve the convenience of the cryptographic communication system and reduce the cost of the cryptographic communication system.

Note that a process of generating the correction data CD(z) using the correction data generation program PRG(z) is the same as the process in the correction data generation unit 214 described in the eighth embodiment and redundant explanation thereof is omitted.

The decryption unit 285 decrypts the unique code UC(z)_c encrypted by an encryption unit 294 of the semiconductor device 290 using the secret key SK(a) of the semiconductor device 280 and thereby generates the unique code UC(z).

The semiconductor device 290 includes a unique code generation unit 291, a storage unit 292, a common key generation unit 293, and an encryption unit 249. The unique code generation unit 291 generates a unique code UC(z) unique to the semiconductor device 290 and outputs it to the encryption unit 294 and the common key generation unit 293. The basic configuration and operation of the unique code generation unit 291 are the same as those of the unique code generation unit 211 described in the eighth embodiment and redundant explanation thereof is omitted.

The storage unit 292 can have the common key CK(a) generated in the common key generation unit 293 and the correction data generation program PRG(z). The storage unit 292 includes a volatile memory and a nonvolatile memory, for example, and the correction data generation program PRG(z) is stored in the nonvolatile memory, and the common key CK(a) is stored in the volatile memory. Thus, although the storage unit 292 temporarily stores the common key CK(a), information of the common key CK(a) is erased when the semiconductor device 290 is powered off. Note that the common key CK(a) may be stored in the nonvolatile memory according to need after taking security measures such as encryption, and measures such as erasing data by writing at power-off of the semiconductor device 290 may be done on the common key CK(a) stored in the nonvolatile memory.

The common key generation unit 293 generates the common key CK(a) using the unique code UC(z) output from the unique code generation unit 291 and the correction data CD(z) output from the program execution unit 284. The common key generation unit 293 functions as a unique code correction unit. The basic configuration and operation of the common key generation unit 293 are the same as those of the common key generation unit 213 described in the eighth embodiment and redundant explanation thereof is omitted.

The encryption unit 294 encrypts the unique code UC(z) and the correction data generation program PRG(z) by using the public key PK(a) of the semiconductor device 280. The public key PK(a) to be used for encryption may be transmitted from the semiconductor device 280 to the semiconductor device 290 in advance and stored in the storage unit 292. Alternatively, the public key PK(a) to be used for encryption may be directly supplied from the semiconductor device 280 to the encryption unit 294 at the time when the encryption unit 294 encrypts the unique code UC(z) and the correction data generation program PRG(z). The encrypted unique code UC(z) —c and correction data generation program PRG(z) are output to the decryption unit 285 of the semiconductor device 280.

Figure 29:
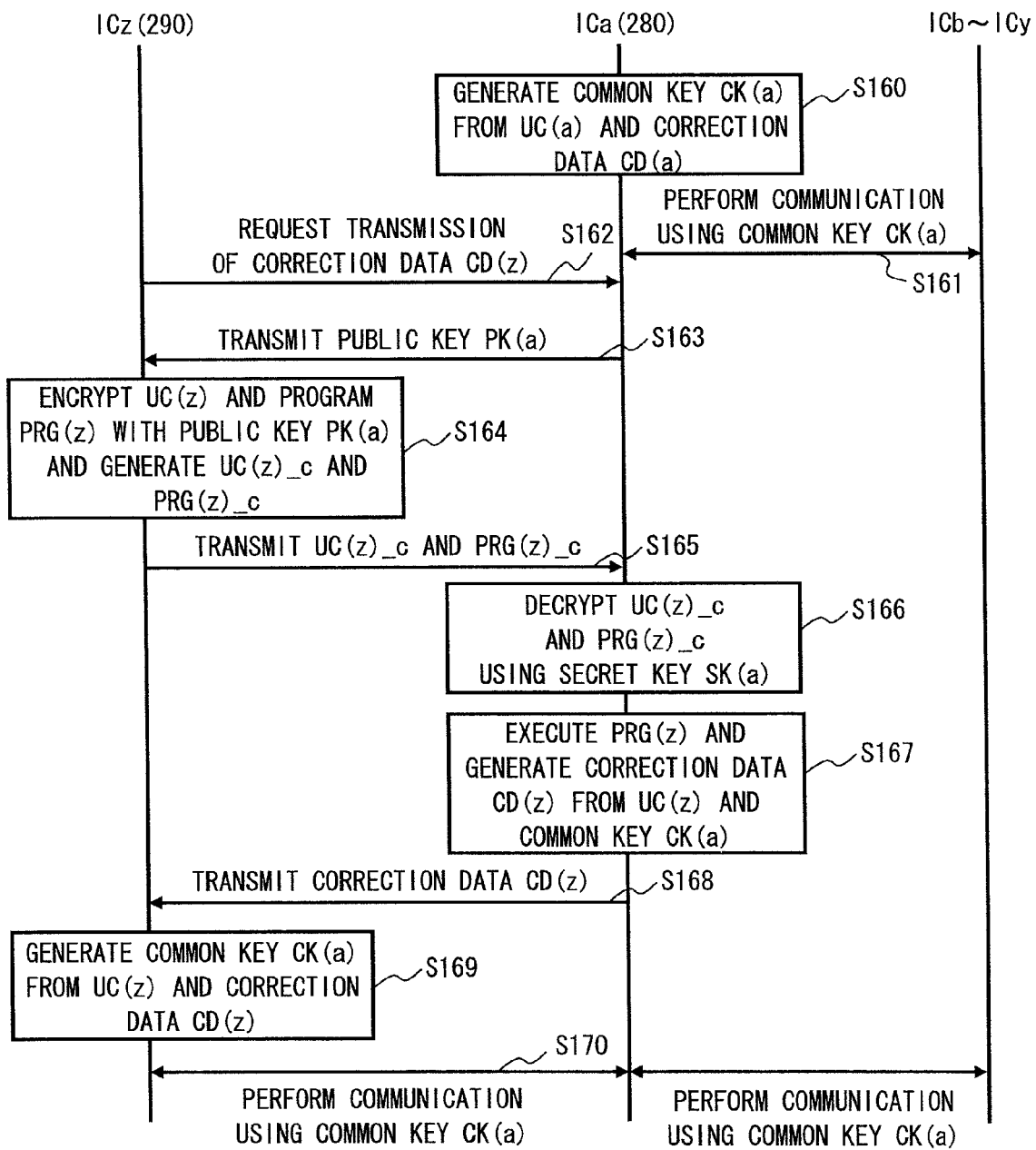
FIG. 29 is a flowchart to explain an operation of the cryptographic communication system according to the eleventh embodiment.

An operation of the cryptographic communication system according to this embodiment is described hereinafter with reference to the flowchart of FIG. 29. First, the common key generation unit 283 of the semiconductor device ICa (280) generates the common key CK(a) using the unique code UC(a) output from the unique code generation unit 281 and the correction data CD(a) stored in the storage unit 282 (Step S160). Then, the semiconductor device ICa (280) starts communication with other semiconductor devices ICb to ICy (not shown) using the common key CK(a) (Step S161).

Then, the semiconductor device ICz (290) makes a request for transmission of the correction data CD(z) to the semiconductor device ICa (280) (Step S162). Receiving the request for transmission of the correction data CD(z), the semiconductor device 280 transmits the public key PK(a) of the semiconductor device 280 to the semiconductor device 290 (Step S163). The encryption unit 294 of the semiconductor device 290 encrypts the unique code UC(z) and the correction data generation program PRG(z) using the public key PK(a) of the semiconductor device 280 (Step S164). Note that the public key PK(a) of the semiconductor device 280 may be prestored in the storage unit 292 of the semiconductor device 290. In this case, Steps S162 and S163 can be skipped.

The semiconductor device 290 transmits the encrypted unique code UC(z) —c and correction data generation program PRG(z) —c to the decryption unit 285 of the semiconductor device 280 (Step S165). The decryption unit 285 of the semiconductor device 280 decrypts the encrypted unique code UC(z)_c and correction data generation program PRG (z)_c by using the secret key SK(a) of the semiconductor device 280 and thereby generates the unique code UC(z) and the correction data generation program PRG(z) (Step S166).

The program execution unit 284 of the semiconductor device 280 executes the correction data generation program PRG(z) decrypted in the decryption unit 285. By executing the correction data generation program PRG(z), the correction data CD(z) can be generated using the unique code UC(z) of the semiconductor device 290 and the common key CK(a) (Step S167). For the correction data generation program PRG (z) to generate the correction data CD(z), it is necessary to acquire the unique code UC(z) a plurality of times. Thus, Steps S164 to S166 (excluding transmission of the correction data generation program PRG(z)) are repeated to acquire the unique code UC(z) a plurality of times. Further, the correction data generation program PRG(z) may be deleted after the correction data CD(z) is generated.

The generated correction data CD(z) is transmitted to the common key generation unit 293 of the semiconductor device 290 (Step S168). The common key generation unit 293 of the semiconductor device 290 generates the common key CK(a) using the unique code UC(z) output from the unique code generation unit 291 and the correction data CD(z) output from the program execution unit 284 (Step S169). By the above process, the added semiconductor device 290 can have the common key CK(a). Thus, the added semiconductor device (ICz) 290 becomes able to perform cryptographic communication with the semiconductor device (ICa) 280 and the other semiconductor devices ICb to ICy using the common key CK(a) (Step S170).

As described above, in the cryptographic communication system according to this embodiment, the program execution unit 284 of the semiconductor device 280 generates the correction data CD(z) using the unique code UC(z) unique to the semiconductor device 290 and the common key CK(a), and the common key generation unit 293 of the semiconductor device 290 generates the common key CK(a) using the correction data CD(z) and the unique code UC(z) of the semiconductor device 290. There is thus no need to incorporate an expensive secure server into the cryptographic communication system in order to verify whether the semiconductor device ICz to be added is a proper semiconductor device, and it is possible to add the semiconductor device easily and at low cost to the cryptographic communication system in which secure communication is performed.

Further, in the cryptographic communication system according to this embodiment, because important data such as the common key CK(a) is not directly stored in the storage units 282 and 292, leakage of the important data such as the common key CK(a) does not occur even if unauthorized analysis of the semiconductor device is made. Therefore, even when the semiconductor device 280 and the semiconductor device 290 are configured using general-purpose microcomputers with a relatively low security level, a high security level can be achieved.

Note that the correction data CD(a) used to generate the common key CK(a) in the semiconductor device 280 and the secret key SK(a) of the semiconductor device 280 are information with a relatively high security level, though the security level is lower than that of the common key CK(a). Thus, the security microcomputer may be used for the semiconductor device 280 in which the correction data CD(a) and the secret key SK(a) are stored in order to prevent leakage of the correction data CD(a) and the secret key SK(a) to a third party.

Further, the correction data CD(z) that is transmitted from the semiconductor device 280 to the semiconductor device 290 is information with a relatively high security level because it is related data to the unique code UC(z) and the common key CK(a). Thus, when transmitting the correction data CD(z) from the semiconductor device 280 to the semiconductor device 290, the correction data CD(z) may be encrypted before transmission using the public key cryptosystem.

Further, in this embodiment, the encryption unit 294 is included in the semiconductor device 290 and the decryption unit 285 is included in the semiconductor device 280 in order to transmit the unique code UC(z) and the correction data generation program PRG(z) after encryption. However, in this embodiment, the encryption unit 294 and the decryption unit 285 may be omitted, and the unique code UC(z) and the correction data generation program PRG(z) may be transmitted without encryption as in the eighth embodiment.

In the above example, the case where the correction data generation program PRG(z) is transmitted to the semiconductor device 280 from the semiconductor device 290 to be added is described. However, the correction data generation program PRG(z) may be transmitted to the semiconductor device 280 from a server, for example.

As described above, according to the embodiment of the present invention, it is possible to provide the cryptographic communication system and the cryptographic communication method that can easily add a semiconductor device to the cryptographic communication system in which secure communication is performed.

Particularly, in the cryptographic communication system according to this embodiment, even when the correction data generation unit is not included in advance in the semiconductor device 280, the unique code UC(z) can be generated by storing the correction data generation program PRG(z) into the semiconductor device 290 to be added and executing the correction data generation program PRG(z) in the semiconductor device 280. The correction data generation program PRG(z) may be stored before shipping of the semiconductor device 290 or may be downloaded from a server after shipping according to need. Further, if the correction data generation program PRG(z) is a program such as JAVA that is not dependent on the architecture of a semiconductor device on which it runs, it is possible to improve the convenience of the cryptographic communication system and reduce the cost of the cryptographic communication system.

<Twelfth Embodiment>

Figure 30:
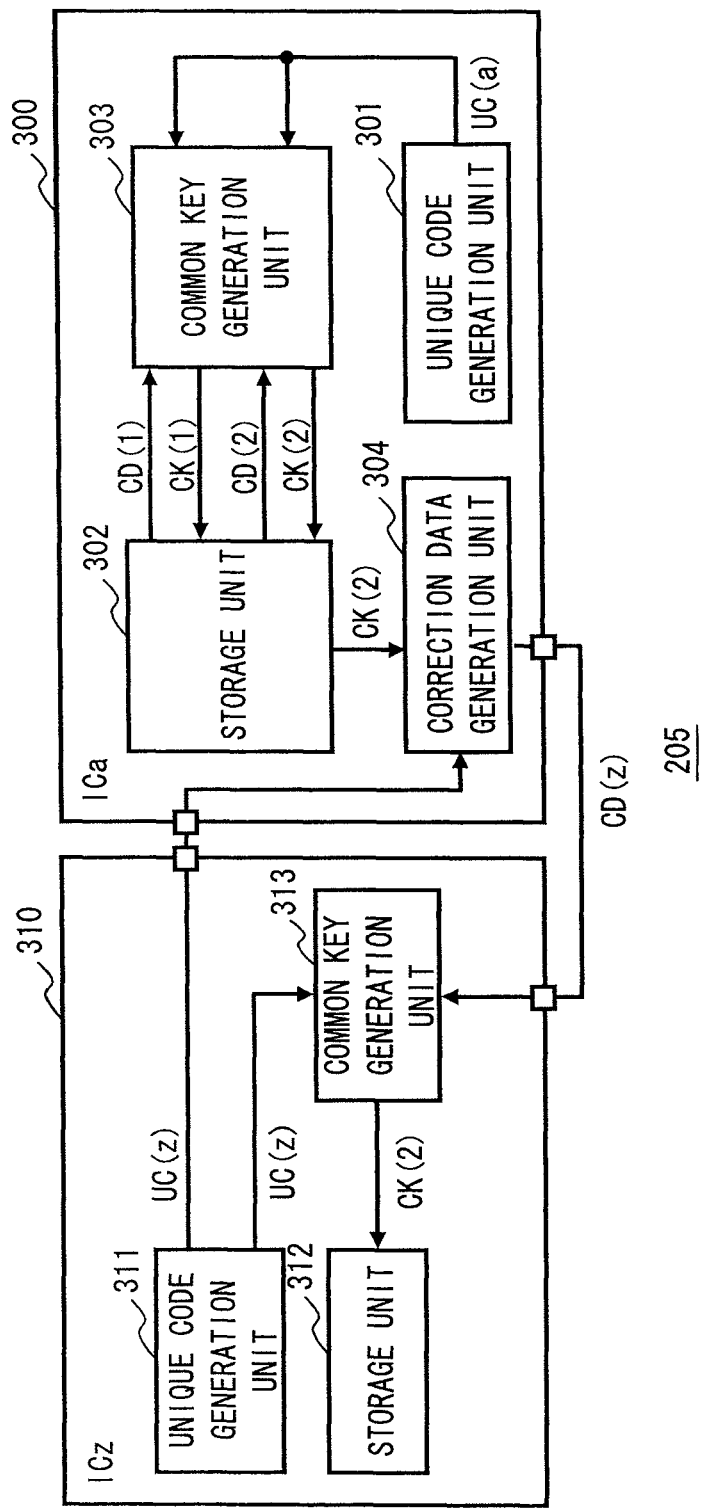
FIG. 30 is a block diagram showing a cryptographic communication system according to a twelfth embodiment.

A twelfth embodiment of the present invention is described hereinafter. FIG. 30 is a block diagram showing a cryptographic communication system 205 according to this embodiment. In the cryptographic communication system 205 according to this embodiment, a plurality of common keys CK(1) and CK(2) are generated in a common key generation unit 303 of a semiconductor device ICa (300). Then, the semiconductor device ICa (300) and a semiconductor device ICz (310) communicate using the common key CK(2), and the semiconductor device ICa (300) and semiconductor devices ICb to ICy communicate using the common key CK(1). Thus, the semiconductor device ICa (300) functions as a router.

The cryptographic communication system 205 shown in FIG. 30 includes the semiconductor device ICa (300) and the semiconductor device ICz (310). The semiconductor device 300 includes a unique code generation unit 301, a storage unit 302, a common key generation unit 303, and a correction data generation unit 304.

The unique code generation unit 301 generates a unique code UC(a) unique to the semiconductor device 300 and outputs it to the common key generation unit 303. The basic configuration and operation of the unique code generation unit 301 are the same as those of the unique code generation unit 211 described in the eighth embodiment and redundant explanation thereof is omitted.

The storage unit 302 can store correction data CD(1) and CD(2) and common keys CK(1) and CK(2) generated in the common key generation unit 303. The storage unit 302 includes a volatile memory and a nonvolatile memory, for example, and the correction data CD(1) and CD(2) are stored in the nonvolatile memory, and the common keys CK(1) and CK(2) are stored in the volatile memory. Thus, although the storage unit 302 temporarily stores the common keys CK(1) and CK(2), information of the common keys CK(1) and CK(2) is erased when the semiconductor device 300 is powered off. Note that the common keys CK(1) and CK(2) may be stored in the nonvolatile memory according to need after taking security measures such as encryption, and measures such as erasing data by writing at power-off of the semiconductor device 300 may be done on the common keys CK(1) and CK(2) stored in the nonvolatile memory.

The common key generation unit 303 generates the common key (second common key) CK(1) using the unique code UC(a) output from the unique code generation unit 301 and correction data (third correction data) CD(1) stored in the storage unit 302. Further, the common key generation unit 303 generates the common key (first common key) CK(2) using the unique code UC(a) output from the unique code generation unit 301 and correction data (first correction data) CD(2) stored in the storage unit 302. The common key generation unit 303 functions as a unique code correction unit. The basic configuration and operation of the common key generation unit 303 are the same as those of the common key generation unit 213 described in the eighth embodiment and redundant explanation thereof is omitted.

The correction data generation unit 304 generates correction data (second correction data) CD(z) using the unique code UC(z) of the semiconductor device 310 and the common key CK(2). The basic configuration and operation of the correction data generation unit 304 are the same as those of the correction data generation unit 214 described in the eighth embodiment and redundant explanation thereof is omitted.

The semiconductor device 310 includes a unique code generation unit 311, a storage unit 312, and a common key generation unit 313. The unique code generation unit 311 generates a unique code UC(a) unique to the semiconductor device 310 and outputs it to the correction data generation unit 304 of the semiconductor device 300. The basic configuration and operation of the unique code generation unit 311 are the same as those of the unique code generation unit 211 described in the eighth embodiment and redundant explanation thereof is omitted.

The storage unit 312 can have the common key CK(2) generated in the common key generation unit 313. The storage unit 312 stores the common key CK(2) in a volatile memory. Thus, although the storage unit 312 temporarily stores the common key CK(2), information of the common key CK(2) is erased when the semiconductor device 310 is powered off. Note that the common key CK(2) may be stored in a nonvolatile memory according to need after taking security measures such as encryption, and measures such as erasing data by writing at power-off of the semiconductor device 310 may be done on the common key CK(2) stored in the nonvolatile memory.

The common key generation unit 313 generates the common key CK(2) using the unique code UC(z) output from the unique code generation unit 311 and the correction data CD(z) output from the correction data generation unit 304. The common key generation unit 313 functions as a unique code correction unit. The basic configuration and operation of the common key generation unit 313 are the same as those of the common key generation unit 213 described in the eighth embodiment and redundant explanation thereof is omitted.

Figure 31:
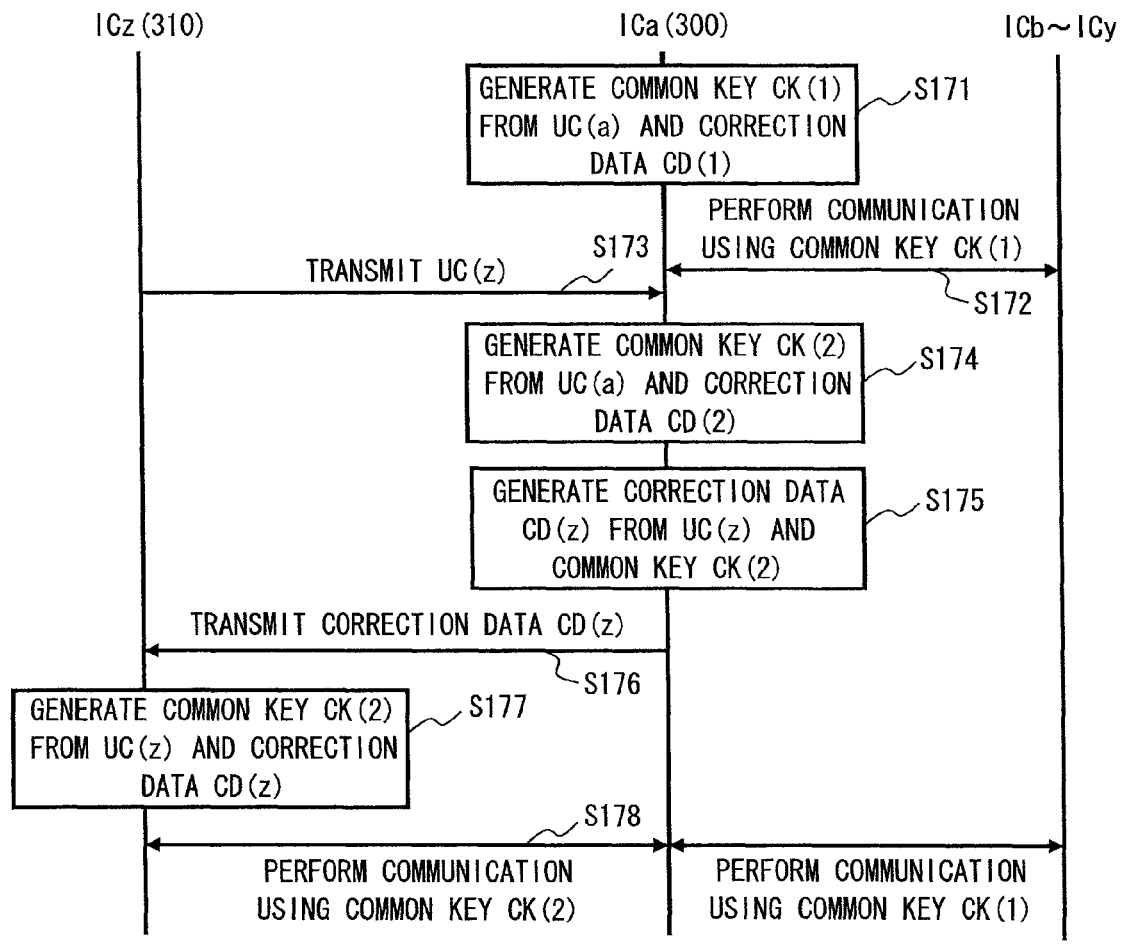
FIG. 31 is a flowchart to explain an operation of the cryptographic communication system according to the twelfth embodiment.

An operation of the cryptographic communication system according to this embodiment is described hereinafter with reference to the flowchart of FIG. 31. First, the common key generation unit 303 of the semiconductor device ICa (300) generates the common key CK(1) using the unique code UC(a) output from the unique code generation unit 301 and the correction data CD(1) stored in the storage unit 302 (Step S171). Then, the semiconductor device ICa (300) starts communication with other semiconductor devices ICb to ICy (third semiconductor device) using the common key CK(1) (Step S172).

The semiconductor device 310 transmits the unique code UC(z) of the semiconductor device 310 to the correction data generation unit 304 of the semiconductor device 300 (Step S173). The common key generation unit 303 of the semiconductor device 300 generates the common key CK(2) using the unique code UC(a) output from the unique code generation unit 301 and the correction data CD(2) stored in the storage unit 302 (Step S174). Then, the correction data generation unit 304 of the semiconductor device 300 generates the correction data CD(z) using the unique code UC(z) of the semiconductor device 310 and the common key CK(2) (Step S175). For the correction data generation unit 304 to generate the correction data CD(z), it is necessary to acquire the unique code UC(z) a plurality of times. Thus, Step S173 is repeated to acquire the unique code UC(z) a plurality of times.

The generated correction data CD(z) is transmitted to the common key generation unit 313 of the semiconductor device 310 (Step S176). The common key generation unit 313 of the semiconductor device 310 generates the common key CK(2) using the unique code UC(z) output from the unique code generation unit 311 and the correction data CD(z) output from the correction data generation unit 304 (Step S177). By the above process, both of the semiconductor device 300 and the semiconductor device 310 can have the common key CK(2). Thus, the added semiconductor device 310 becomes able to perform cryptographic communication with the semiconductor device 300 using the common key CK(2) (Step S178). On the other hand, the semiconductor device 300 and the semiconductor devices ICb to ICy peform communication using the common key CK(1).

Figure 32:
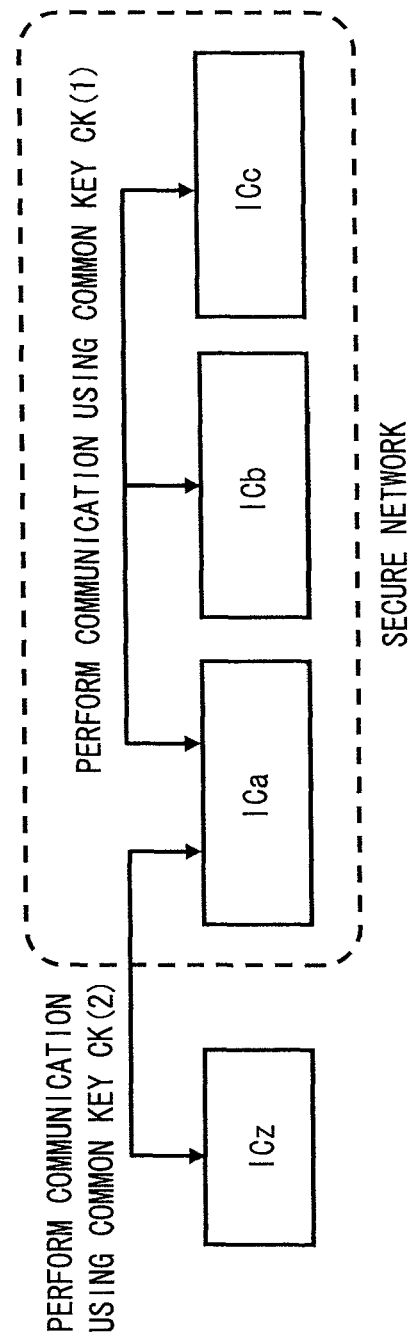
FIG. 32 is a block diagram showing a configuration of the cryptographic communication system according to the twelfth embodiment.

FIG. 32 is a block diagram showing an example of a configuration of the cryptographic communication system according to this embodiment. As shown in FIG. 32, the semiconductor device ICa and the semiconductor devices ICb and ICc communicate using the common key CK(1) and establish a secure network. Further, the added semiconductor device ICz communicates with the semiconductor device ICa using the common key CK(2). Thus, the semiconductor device ICa functions as a router, so that the added semiconductor device ICz can perform cryptographic communication with the semiconductor devices ICb and ICc through the semiconductor device ICa.

As described above, in the cryptographic communication system according to this embodiment, the correction data generation unit 304 of the semiconductor device 400 generates the correction data CD(z) using the unique code UC(z) unique to the semiconductor device 310 and the common key CK(2), and the common key generation unit 313 of the semiconductor device 310 generates the common key CK(2) using the correction data CD(z) and the unique code UC(z) of the semiconductor device 310. There is thus no need to incorporate an expensive secure server into the cryptographic communication system in order to verify whether the semiconductor device ICz to be added is a proper semiconductor device, and it is possible to add the semiconductor device easily and at low cost to the cryptographic communication system in which secure communication is performed.

Further, in the cryptographic communication system according to this embodiment, because important data such as the common keys CK(1) and CK(2) is not directly stored in the storage units 302 and 312, leakage of the important data such as the common keys CK(1) and CK(2) does not occur even if unauthorized analysis of the semiconductor device is made. Therefore, even when the semiconductor device 300 and the semiconductor device 310 are configured using general-purpose microcomputers with a relatively low security level, a high security level can be achieved.

Note that the correction data CD(1) and CD(2) used to generate the common keys CK(1) and CK(2) are information with a relatively high security level, though the security level is lower than that of the common keys CK(1) and CK(2). Thus, the security microcomputer may be used for the semiconductor device 300 in which the correction data CD(1) and CD(2) are stored in order to prevent leakage of the correction data CD(1) and CD(2) to a third party.

Further, the correction data CD(z) that is transmitted from the semiconductor device 300 to the semiconductor device 310 is information with a relatively high security level because it is related data to the unique code UC(z) and the common key CK(2). Thus, when transmitting the correction data CD(z) from the semiconductor device 300 to the semiconductor device 310, the correction data CD(z) may be encrypted before transmission using the public key cryptosystem.

As described above, according to the embodiment of the present invention, it is possible to provide the cryptographic communication system and the cryptographic communication method that can easily add a semiconductor device to the cryptographic communication system in which secure communication is performed.

<Thirteenth Embodiment>

Figure 33:
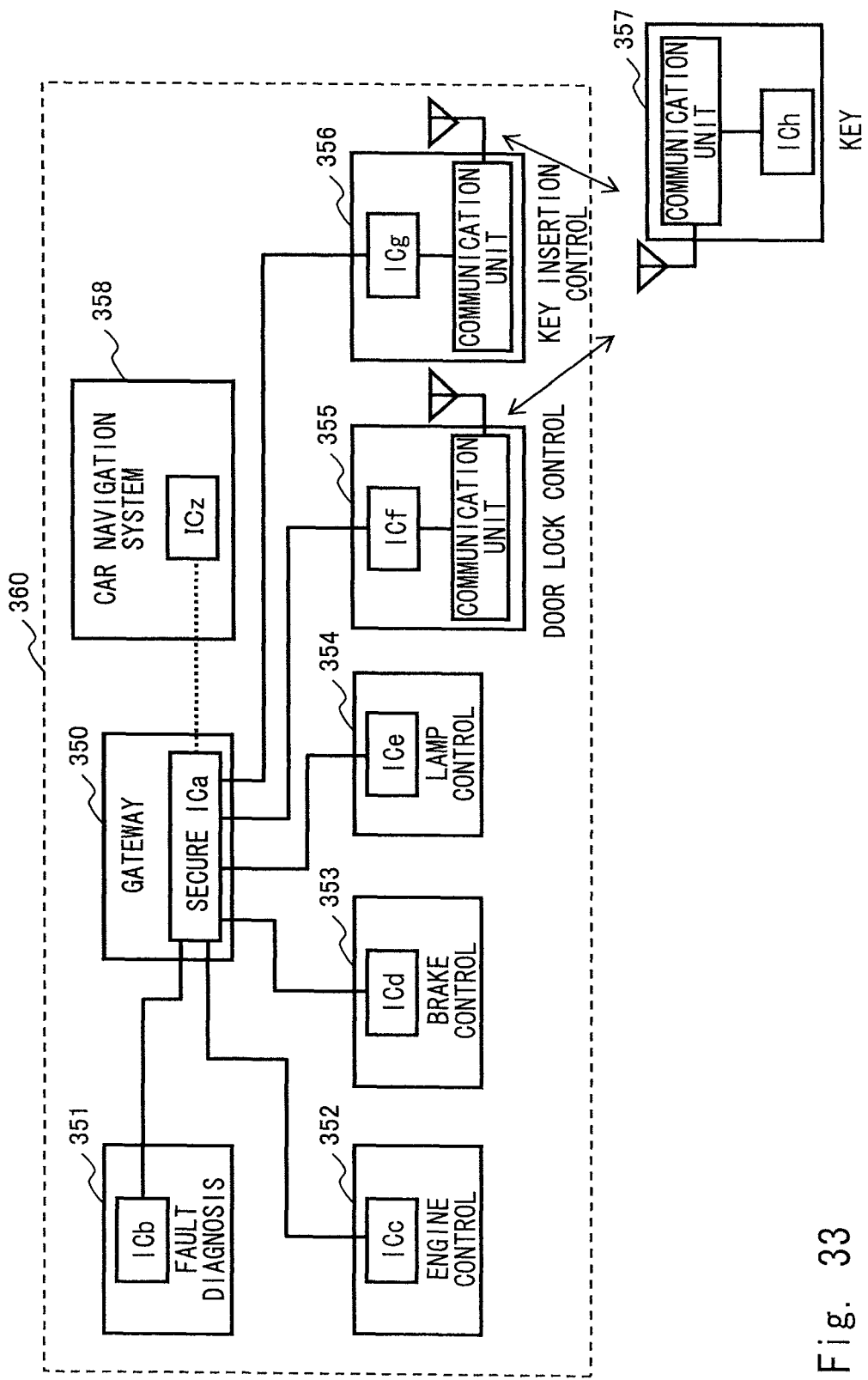
FIG. 33 is a block diagram showing a case where the cryptographic communication system according to the eighth to twelfth embodiment is applied to a vehicle-mounted semiconductor device.

A thirteenth embodiment of the present invention is described hereinafter. FIG. 33 is a block diagram showing a case where the cryptographic communication system according to the eighth to twelfth embodiment is applied to a vehicle-mounted semiconductor device. As shown in FIG. 33, a vehicle 360 includes a gateway unit 350, a fault diagnostic unit 351, an engine control unit 352, a brake control unit 353, a lamp control unit 354, a door lock control unit 355, and a key insertion control unit 356.

The gateway unit 350 is equipment for relaying a network composed of the units 351 to 356. A secure microcomputer ICa is included in the gateway unit 350. The fault diagnostic unit 351 is a unit for making a diagnosis whether the components of the vehicle 360 are at fault. A semiconductor device ICb is included in the fault diagnostic unit 351. The engine control unit 352 is a unit for making electrical control (fuel supply, ignition timing control etc.) of engine operation in a comprehensive manner. A semiconductor device ICc is included in the engine control unit 352. The brake control unit 353 is a unit for controlling a brake such as ABS (Antilock Brake System). A semiconductor device ICd is included in the brake control unit 353. The lamp control unit 354 is a unit for controlling a headlight, winker and the like of the vehicle. A semiconductor device ICe is included in the lamp control unit 354.

The door lock control unit 355 is a unit for controlling door lock. A semiconductor device ICf and a communication unit for radio communication with a key 357 are included in the door lock control unit 355. The key insertion control unit 356 is a unit for determining whether the inserted key is a valid user key or not. A semiconductor device ICg and a communication unit for radio communication with the key 357 are included in the key insertion control unit 356. A semiconductor device ICh and a communication unit are included in the key 357. General-purpose microcomputers, for example, may be used for the semiconductor devices ICb to ICh that are included in the respective units 351 to 356 and the key 357.

The fault diagnostic unit 351, the engine control unit 352, the brake control unit 353, the lamp control unit 354, the door lock control unit 355 and the key insertion control unit 356 are connected to the gateway unit 350, and the respective units 351 to 356 are configured to be able to communicate with one another through the gateway unit 350. The common key that is used for communication between the respective units 351 to 356 and the gateway unit 350 may differ from unit to unit. For example, a common key A may be used for communication between the fault diagnostic unit 351 and the gateway unit 350, and a common key B may be used for communication between the engine control unit 352 and the gateway unit 350.

The gateway unit (ICa) 350 and the respective units (ICb to ICg) 351 to 356 establish a secure network. When adding a car navigation system 358 that includes a semiconductor device ICz to the secure network, use of the method described in the eighth to twelfth embodiments allows the car navigation system (ICz) 358 to be added to the secure network easily and at low cost.

In the example shown in FIG. 33, the configuration in which the units 351 to 356 and the car navigation system 358 perform communication through the gateway unit 350 is shown. However, the units 351 to 356 and the car navigation system 358 may communicate with one another using the same common key. In this case, the units 351 to 356 and the car navigation system 358 are configured to be connected to one another through a common bus, for example. It is further applicable to communication between various units different from the units shown in FIG. 33.

It should be noted that the case where the cryptographic communication system according to the first to sixth embodiments and the eighth to twelfth embodiments is applied to a vehicle-mounted semiconductor device is described in this embodiment. However, the cryptographic communication system according to the first to sixth embodiments and the eighth to twelfth embodiments may be applied also to a typical LAN, smart meter, smart grid, contactless IC card and the like, not limited to a vehicle-mounted semiconductor device. The semiconductor devices that constitute the cryptographic communication system may communicate with one another via wired or wireless connections. Further, the first to thirteenth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A cryptographic communication system including a first semiconductor device and a second semiconductor device,
   the first semiconductor device comprising:
      a common key generation processor unit configured to generate a common key based on a first unique code having a value unique to the first semiconductor device and first correction data for correcting the first unique code, the first unique code including one or more bits with a high error rate and one or more bits with a low error rate, the first correction data including a bit mask for masking the high error rate bits and an error correction code for correcting the low error rate bits, the common key generation unit being further configured to:
         mask the first unique code using the bit mask,
         eliminate the masked bits from the masked first unique code,
         error-correct the masked first unique code using the error correction code, and
         create the common key from the error-corrected first unique code; and
      an encryption processor unit configured to encrypt the common key generated in the common key generation unit by using a public key of the second semiconductor device, and
   the second semiconductor device comprising:
      a secret key generation processor unit configured to generate a secret key of the second semiconductor device based on a second unique code having a value unique to the second semiconductor device and second correction data for correcting the second unique code; and
      a decryption processor unit configured to decrypt the common key encrypted in the encryption unit by using the secret key,
   wherein the first and second semiconductor devices are vehicle-mounted microcomputers, and
   one of the first and second semiconductor devices is a car navigation system.

2. The cryptographic communication system according to claim 1, wherein the first semiconductor device and the second semiconductor device communicate using the common key.

3. The cryptographic communication system according to claim 1, wherein the first correction data further includes an operation parameter for performing a specified operation on the error-corrected first unique code.

4. The cryptographic communication system according to claim 3, wherein the common key generation processor unit is further configured to perform the specified operation on the error-corrected first unique code.

5. The cryptographic communication system according to claim 4, wherein the specified operation is a NOT operation.

6. The cryptographic communication system according to claim 1, wherein the first and second semiconductor devices are configured using secure microcomputers.

7. The cryptographic communication system according to claim 1, wherein the first and second semiconductor devices are configured using general-purpose microcomputers.

8. The cryptographic communication system according to claim 1, wherein one of the first and second semiconductor devices is a fault diagnostic unit.

9. The cryptographic communication system according to claim 1, wherein the common key generation processor unit is further configured to left-justify the masked first unique code after the masked bits have been eliminated and before the masked first unique code is error-corrected.

10. The cryptographic communication system according to claim 1,
wherein the second unique code includes one or more bits with a high error rate and one or more bits with a low error rate,
wherein the second correction data includes a bit mask for masking the high error rate bits and an error correction code for correcting the low error rate bits, and
wherein the secret key generation processor unit is further configured to:
mask the second unique code using the bit mask from the second correction data,
eliminate the masked bits from the masked second unique code,
error-correct the masked second unique code using the error correction code from the second correction data, and
create the secret key from the error-corrected second unique code.

11. The cryptographic communication system according to claim 10, wherein the secret key generation processor unit is further configured to left-justify the masked second unique code after the masked bits have been eliminated and before the masked second unique code is error-corrected.

12. The cryptographic communication system according to claim 10, wherein the second correction data further includes an operation parameter for performing a specified operation on the error-corrected second unique code.

13. The cryptographic communication system according to claim 12, wherein the secret key generation processor unit is further configured to perform the specified operation on the error-corrected second unique code.

14. The cryptographic communication system according to claim 13, wherein the specified operation is a NOT operation.

15. A cryptographic communication method using a first semiconductor device and a second semiconductor device, comprising:
in the first semiconductor device,
generating a common key based on a first unique code having a value unique to the first semiconductor device and first correction data for correcting the first unique code, the first unique code including one or more bits with a high error rate and one or more bits with a low error rate, the first correction data including a bit mask for masking the high error rate bits and an error correction code for correcting the low error rate bits, said generating including:
masking the first unique code using the bit mask,
eliminating the masked bits from the masked first unique code,
error-correcting the masked first unique code using the error correction code, and
creating the common key from the error-corrected first unique code;
encrypting the common key by using a public key of the second semiconductor device; and in the second semiconductor device,
generating a secret key of the second semiconductor device based on a second unique code having a value unique to the second semiconductor device and second correction data for correcting the second unique code; and
decrypting the encrypted common key by using the secret key
wherein the first and second semiconductor devices are vehicle-mounted microcomputers, and
one of the first and second semiconductor devices is a car navigation system.

16. The cryptographic communication method according to claim 15, further comprising:
communicating, between the first semiconductor device and the second semiconductor device, using the common key.

17. The cryptographic communication method according to claim 15, wherein the first correction data further includes an operation parameter for performing a specified operation on the error-corrected first unique code.

18. The cryptographic communication method according to claim 17, further comprising performing the specified operation on the error-corrected first unique code.

* * * * *